(12) United States Patent
Narayana et al.

(10) Patent No.: US 12,444,139 B2
(45) Date of Patent: Oct. 14, 2025

(54) AUTOMATED GENERATION AND PRESENTATION OF VISUAL DATA ENHANCEMENTS ON CAMERA VIEW IMAGES CAPTURED IN A BUILDING

(71) Applicant: MFTB Holdco, Inc., Seattle, WA (US)

(72) Inventors: Manjunath Narayana, Chino Hills, CA (US); Eric M. Penner, Centennial, CO (US); Ivaylo Boyadzhiev, Seattle, WA (US); Sing Bing Kang, Redmond, WA (US)

(73) Assignee: MFTB Holdco, Inc., Seattle, WA (US)

( * ) Notice: Subject to any disclaimer, the term of this patent is extended or adjusted under 35 U.S.C. 154(b) by 267 days.

(21) Appl. No.: 17/950,865

(22) Filed: Sep. 22, 2022

(65) Prior Publication Data

US 2024/0104851 A1   Mar. 28, 2024

(51) Int. Cl.
*G06T 19/00* (2011.01)
*G06F 3/04842* (2022.01)
(Continued)

(52) U.S. Cl.
CPC ........ *G06T 19/003* (2013.01); *G06F 3/04842* (2013.01); *G06F 16/587* (2019.01); *G06T 19/006* (2013.01); *G06V 20/20* (2022.01)

(58) Field of Classification Search
None
See application file for complete search history.

(56) References Cited

U.S. PATENT DOCUMENTS

| 5,140,352 A | 8/1992 | Moore et al. |
| 6,031,540 A | 2/2000 | Golin et al. |

(Continued)

FOREIGN PATENT DOCUMENTS

| EP | 2413097 A2 | 2/2012 |
| EP | 2505961 A2 | 10/2012 |

(Continued)

OTHER PUBLICATIONS

CubiCasa | From video to floor plan in under 5 minutes, retrieved on Mar. 26, 2019, from https://www.cubi.casa/, 6 pages.

(Continued)

*Primary Examiner* — Michael J Cobb
(74) *Attorney, Agent, or Firm* — VLP Law Group LLP; James A. D. White

(57) ABSTRACT

Techniques are described for using computing devices to perform automated operations for using generated building information to further generate and present visual data enhancements on images that are captured by and displayed on a mobile device in the building (e.g., concurrent with capture of the images by a camera of the mobile device, such as in a real-time or near-real-time manner with respect to image capture), such as using descriptive information about a building that is generated from analysis of acquired building images and optionally other building information (e.g., floor plans), and such as to improve navigation of the building (e.g., for autonomous vehicles) and provide other functionality as the mobile device moves through the building. The descriptive building information may include structural elements and other objects identified in the building and other determined attributes of the building, and automatically generated textual descriptions of the objects and other attributes.

30 Claims, 28 Drawing Sheets

(10 of 28 Drawing Sheet(s) Filed in Color)

(51) Int. Cl.
  *G06F 16/587* (2019.01)
  *G06V 20/20* (2022.01)

(56) References Cited

U.S. PATENT DOCUMENTS

| | | | |
|---|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B2 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,809,066 B2 | 10/2020 | Colburn et al. |
| 10,825,247 B1 | 11/2020 | Vincent et al. |
| 10,834,317 B2 | 11/2020 | Shan et al. |
| 11,055,531 B1 | 7/2021 | Maestas |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,200,421 B1 | 12/2021 | Chavez et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 11,790,648 B2 | 10/2023 | Stoeva et al. |
| 11,836,973 B2 | 12/2023 | Wixson et al. |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0109338 A1 | 4/2015 | McKinnon et al. |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |

(56) References Cited

U.S. PATENT DOCUMENTS

| | | |
|---|---|---|
| 2016/0286119 A1 | 9/2016 | Rondinelli |
| 2016/0300385 A1 | 10/2016 | Bell et al. |
| 2016/0335731 A1* | 11/2016 | Hall .................. G06Q 10/067 |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0243400 A1* | 8/2017 | Skidmore ............ G06F 3/0346 |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0037134 A1 | 1/2019 | Merati et al. |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0044760 A1 | 2/2021 | Dawson et al. |
| 2021/0065271 A1 | 3/2021 | Benkreira et al. |
| 2021/0279957 A1 | 9/2021 | Eder et al. |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0076491 A1 | 3/2022 | Zellner et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |
| 2022/0269885 A1* | 8/2022 | Wixson ................. G06T 7/0002 |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019058266 A1 | 3/2019 |
| WO | 2019083832 A1 | 5/2019 |
| WO | 2019104049 A1 | 5/2019 |
| WO | 2019118599 A2 | 6/2019 |
| WO | 2020068177 A1 | 4/2020 |
| WO | 2021191162 A1 | 9/2021 |
| WO | 2022053888 A1 | 3/2022 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGUIDE: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The Ar 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

(56) References Cited

OTHER PUBLICATIONS

Magicplan—Android Apps on Go . . . , retrieved from https://play.google.com/store/apps/details?id=com.sensopia.magicplan, on Feb. 21, 2018, 5 pages.
Pintore et al., "AtlantaNet: Inferring the 3D Indoor Layout from a Single 360 Image beyond the Manhattan World Assumption", ECCV 2020, 16 pages.
Cowles, Jeremy, "Differentiable Rendering", Aug. 19, 2018, accessed Dec. 7, 2020 at https://towardsdatascience.com/differentiable-rendering-d00a4b0f14be, 3 pages.
Yang et al., "DuLa-Net: A Dual-Projection Network for Estimating Room Layouts from a Single RGB Panorama", in arXiv:1811.11977[cs.v2], submitted Apr. 2, 2019, 14 pages.
Sun et al., "HoHoNet: 360 Indoor Holistic Understanding with Latent Horizontal Features", in arXiv:2011.11498[cs.v2], submitted Nov. 24, 2020, 15 pages.
Nguyen-Phuoc et al., "RenderNet: A deep convolutional network for differentiable rendering from 3D shapes", in arXiv:1806.06575[cs.v3], submitted Apr. 1, 2019, 17 pages.
Convolutional neural network, Wikipedia, retrieved from https://en.wikipedia.org/wiki/Convolutional_neural_network, on Dec. 7, 2020, 25 pages.
Hamilton et al., "Inductive Representation Learning on Large Graphs", in 31st Conference on Neural Information Processing Systems (NIPS 2017), 2017, 19 pages.
Kipf et al., "Variational Graph Auto-Encoders", in arXiv:1611.07308v1 [stat.ML], submitted Nov. 21, 2016, 3 pages.
Cao et al., "MolGAN: An Implicit Generative Model for Small Molecular Graphs", in arXiv:1805.11973v1 [stat.ML], submitted May 30, 2018, 11 pages.
Chen et al., "Intelligent Home 3D: Automatic 3D-House Design from Linguistic Descriptions Only", in arXiv:2003.00397v1 [cs.CV], submitted Mar. 1, 2020, 14 pages.
Cucurull et al., "Context-Aware Visual Compatibility Prediction", in arXiv:1902.03646v2 [cs.CV], submitted Feb. 12, 2019, 10 pages.
Fan et al., "Labeled Graph Generative Adversarial Networks", in arXiv:1906.03220v1 [cs.LG], submitted Jun. 7, 2019, 14 pages.
Gong et al., "Exploiting Edge Features in Graph Neural Networks", in arXiv:1809.02709v2 [cs.LG], submitted Jan. 28, 2019, 10 pages.
Genghis Goodman, "A Machine Learning Approach to Artificial Floorplan Generation", University of Kentucky Theses and Dissertations-Computer Science, 2019, accessible at https://uknowledge.uky.edu/cs_etds/89, 40 pages.
Grover et al., "node2vec: Scalable Feature Learning for Networks", in arXiv:1607.00653v1 [cs.SI], submitted Jul. 3, 2016, 10 pages.
Nauata et al., "House-GAN: Relational Generative Adversarial Networks for Graph-constrained House Layout Generation", in arXiv:2003.06988v1 [cs.CV], submitted Mar. 16, 2020, 17 pages.
Kang et al., "A Review of Techniques for 3D Reconstruction of Indoor Environments", in ISPRS International Journal of Geo-Information 2020, May 19, 2020, 31 pages.
Kipf et al., "Semi-Supervised Classification With Graph Convolutional Networks", in arXiv:1609.02907v4 [cs.LG], submitted Feb. 22, 2017, 14 pages.
Li et al., "Graph Matching Networks for Learning the Similarity of Graph Structured Objects", in Proceedings of the 36th International Conference on Machine Learning (PMLR 97), 2019, 18 pages.
Liu et al., "Hyperbolic Graph Neural Networks", in 33rd Conference on Neural Information Processing Systems (NeurIPS 2019), 2019, 12 pages.
Merrell et al., "Computer-Generated Residential Building Layouts", in ACM Transactions on Graphics, Dec. 2010, 13 pages.
ARConnect—Made For Matterport, retrieved from https://captur3d.io/ar-connect-digital-twin-solution#, on Jun. 3, 2022, 6 pages.
Bringing Virtual Staging Into The Real World With ARCore by Google, CAPTUR3D Editorial Team, retrieved from https://captur3d.io/blogs/bringing-virtual-staging-into-the-real-world-with-arcore-by-google, on Jun. 3, 2022, 4 pages.
Colburn et al., "Image-Based Remodeling", IEEE Transactions on Visualization and Computer Graphics 19:1, Jan. 2013, retrieved from https://www.academia.ed/17413385/Image_Based_Remodeling, on Jun. 3, 2022, 13 pages.
Google Lens, Wikipedia, retrieved from https://en.wikipedia.org/wiki/Google_Lens, on Sep. 8, 2022, 3 pages.

* cited by examiner

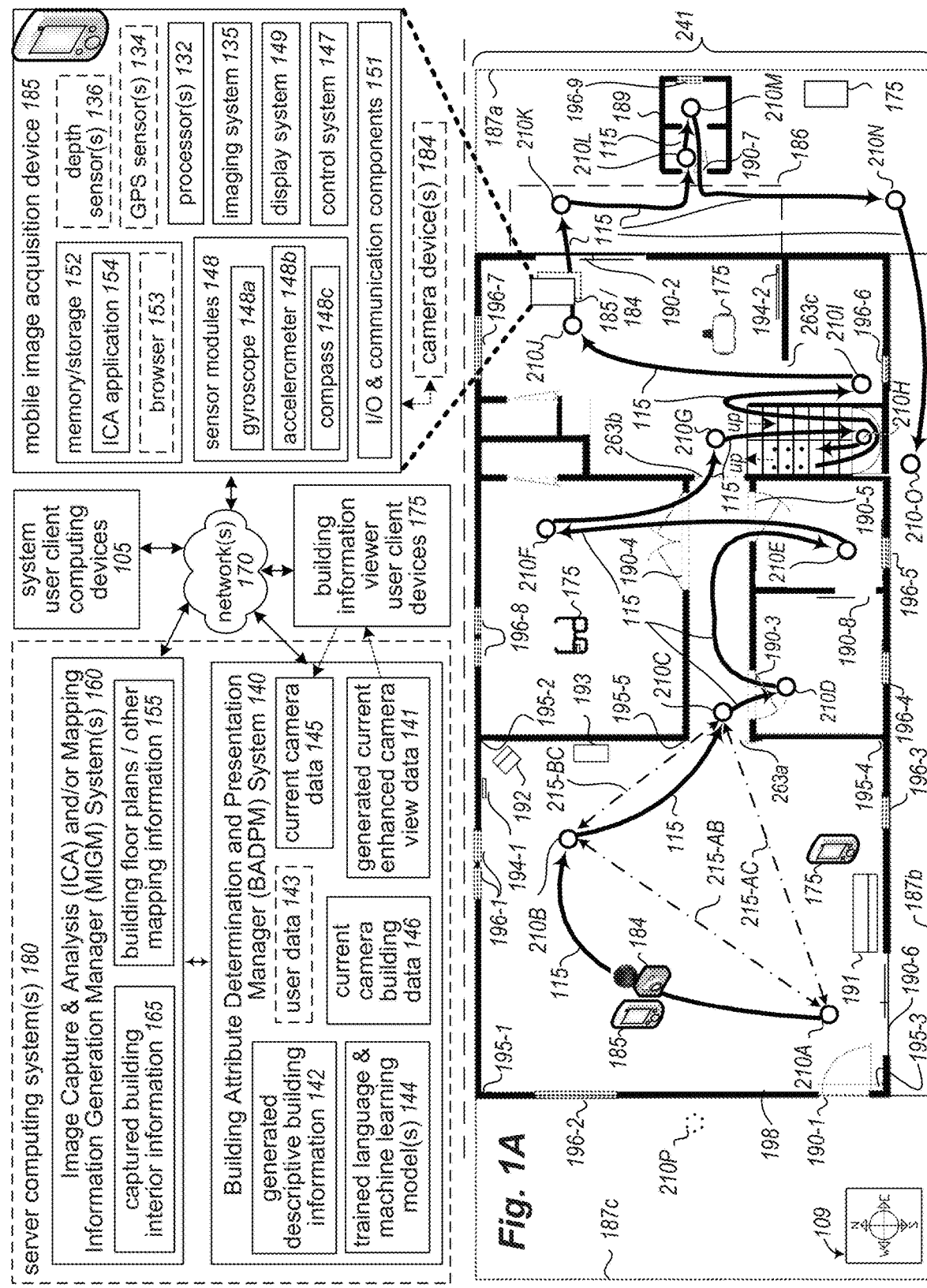

House 198 Overview Description

This is a beautiful 2-story craftsmen home, with a recently updated kitchen and territorial views. It is near ...

House 198 Attributes

Overview
Detached construction; built in 1982; Total interior livable area: 1,456 sq. ft.; Forced air, natural gas; ...

...

Further Details - Interior
Bedrooms: 4; Bathrooms: 2; Full bathrooms: 2
Primary Bedroom: Area 400 sq. ft., Dimensions 20 x 20
Bedroom 1 ...
Flooring: Laminate (kitchen and bathrooms); Carpet (other)
Appliances included: Disposal, Microwave, Refrigerator, Electric Stove

...

Further Details - Property
Parking spaces: 3; Garage spaces: 2
Stories: 2
Exterior features: Deck

...

*Kitchen countertops: marble*
*Living room walls: paint, gray*
*Living room ceiling style: vaulted*
*Accessibility (wheelchair): good (1st story)*
*Open floor plan: yes*
*Modern style: 6 of 10 (10 being most)*

*Fig. 1B*

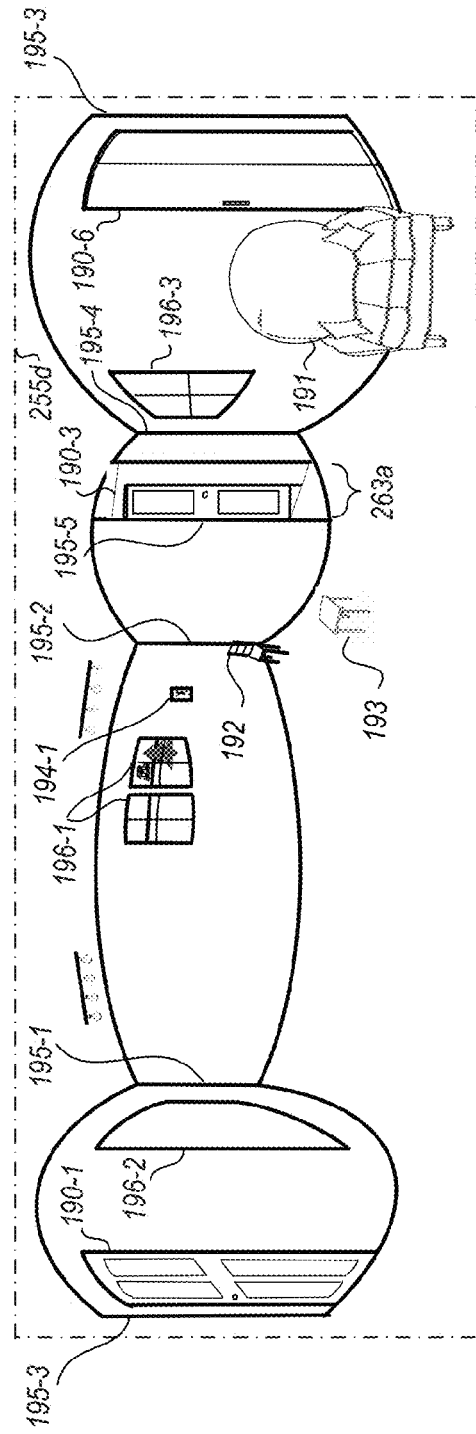
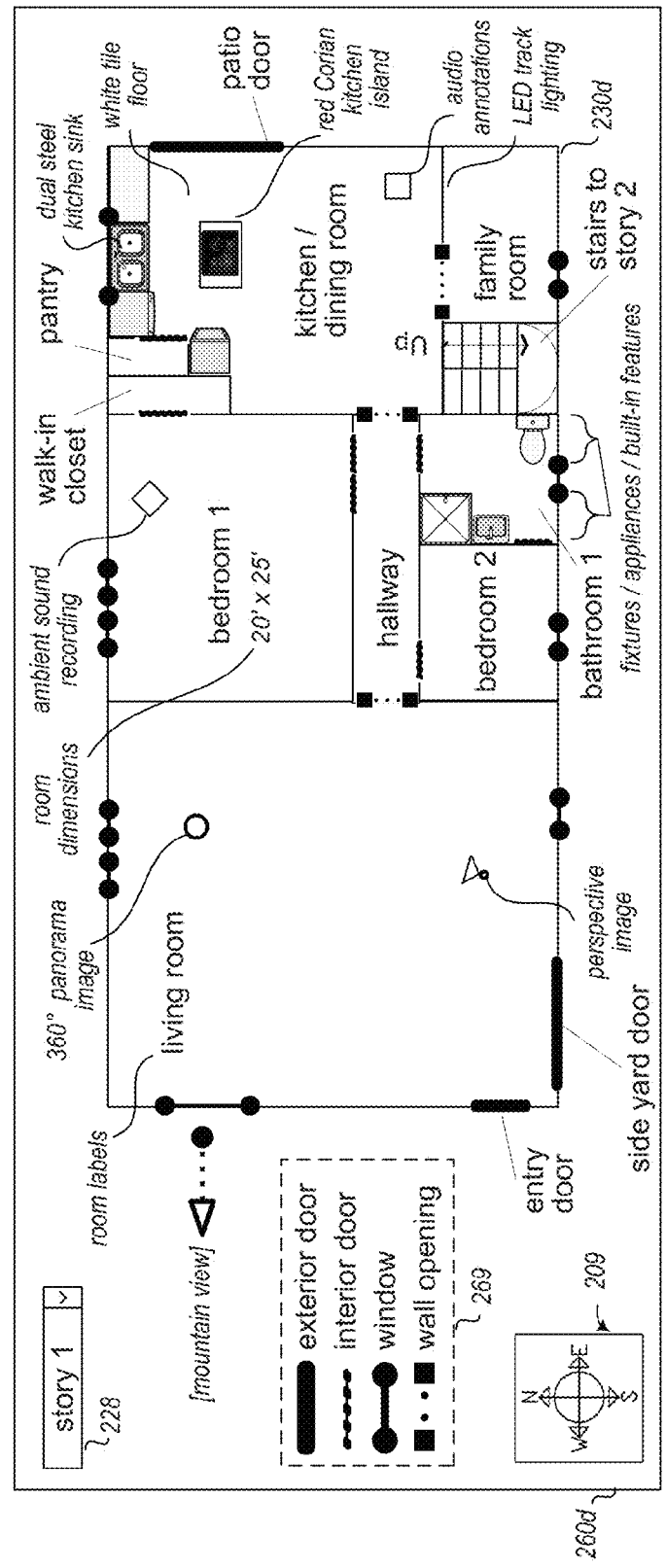
Fig. 2D

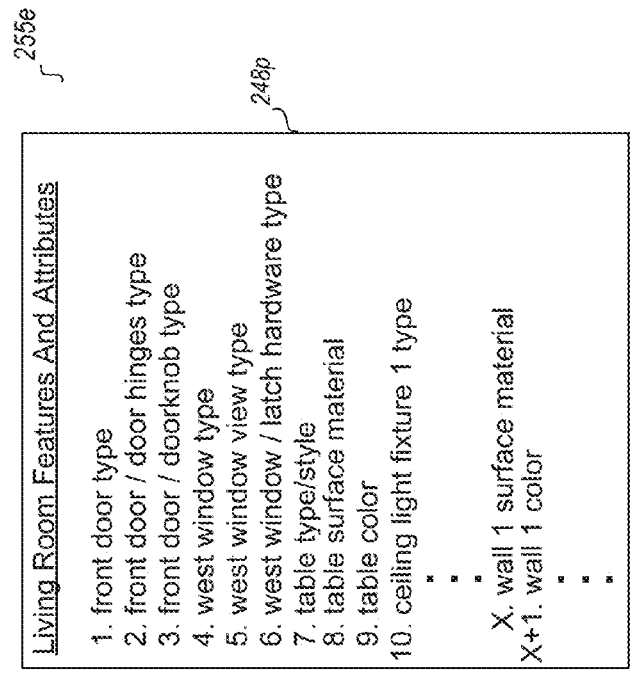
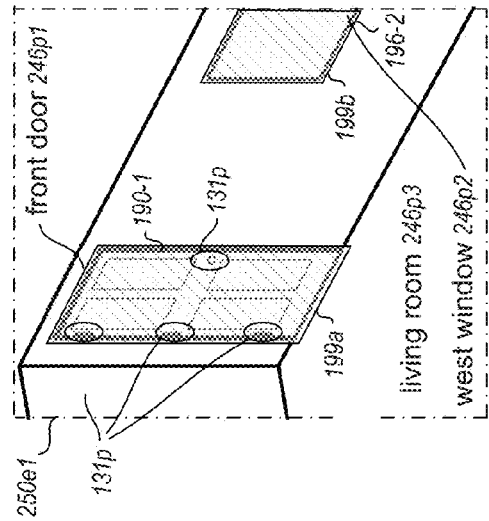
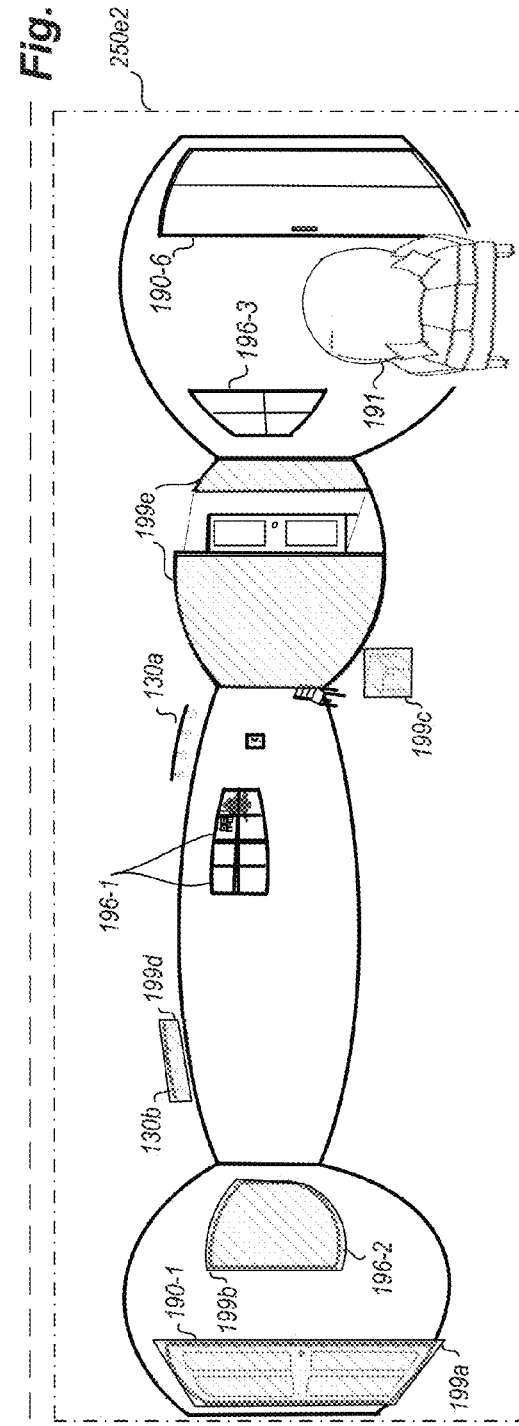
Fig. 2E

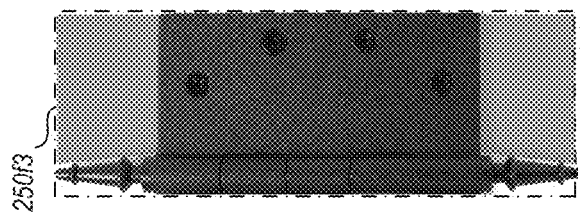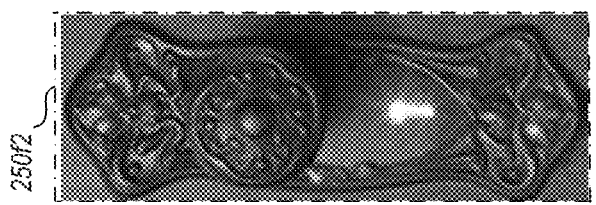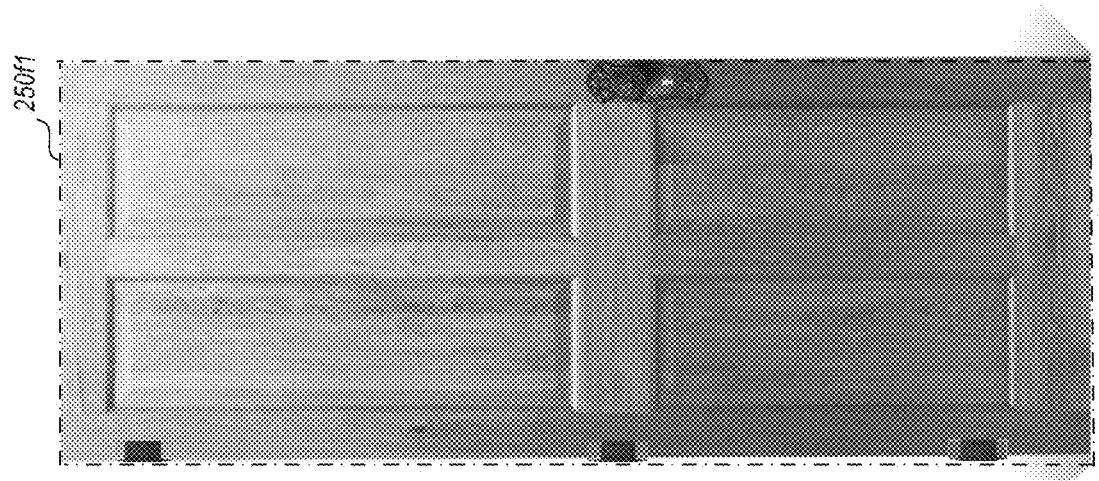
Fig. 2F

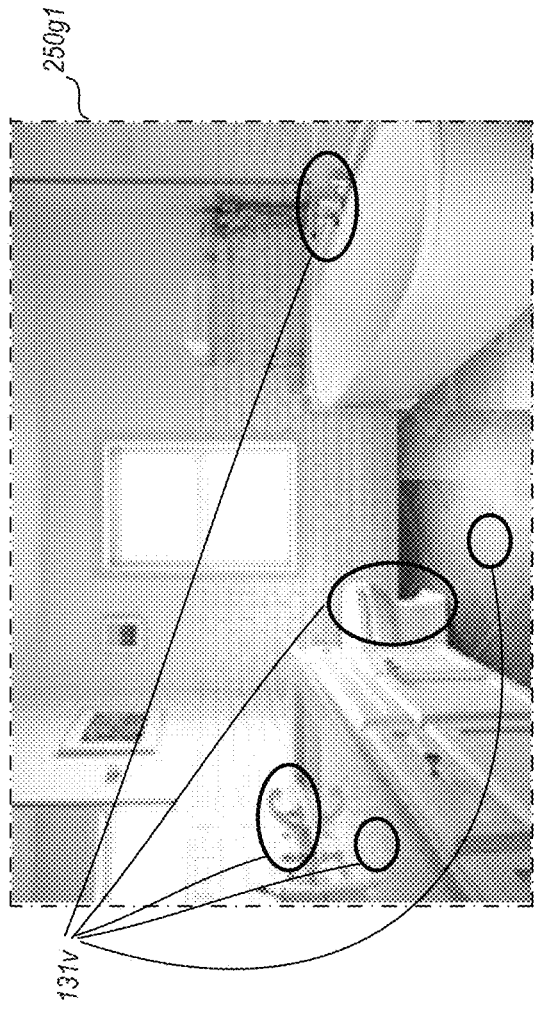
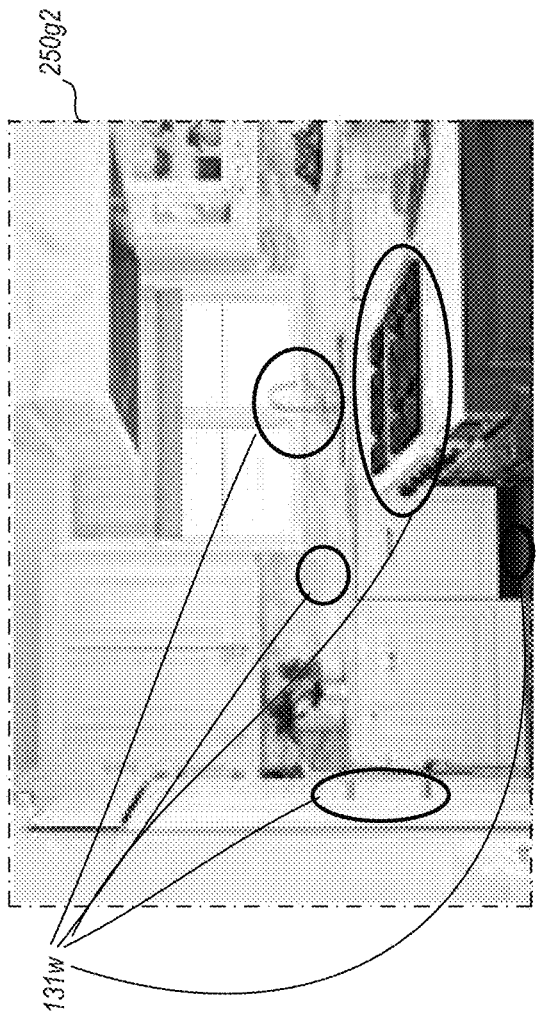
Fig. 2G

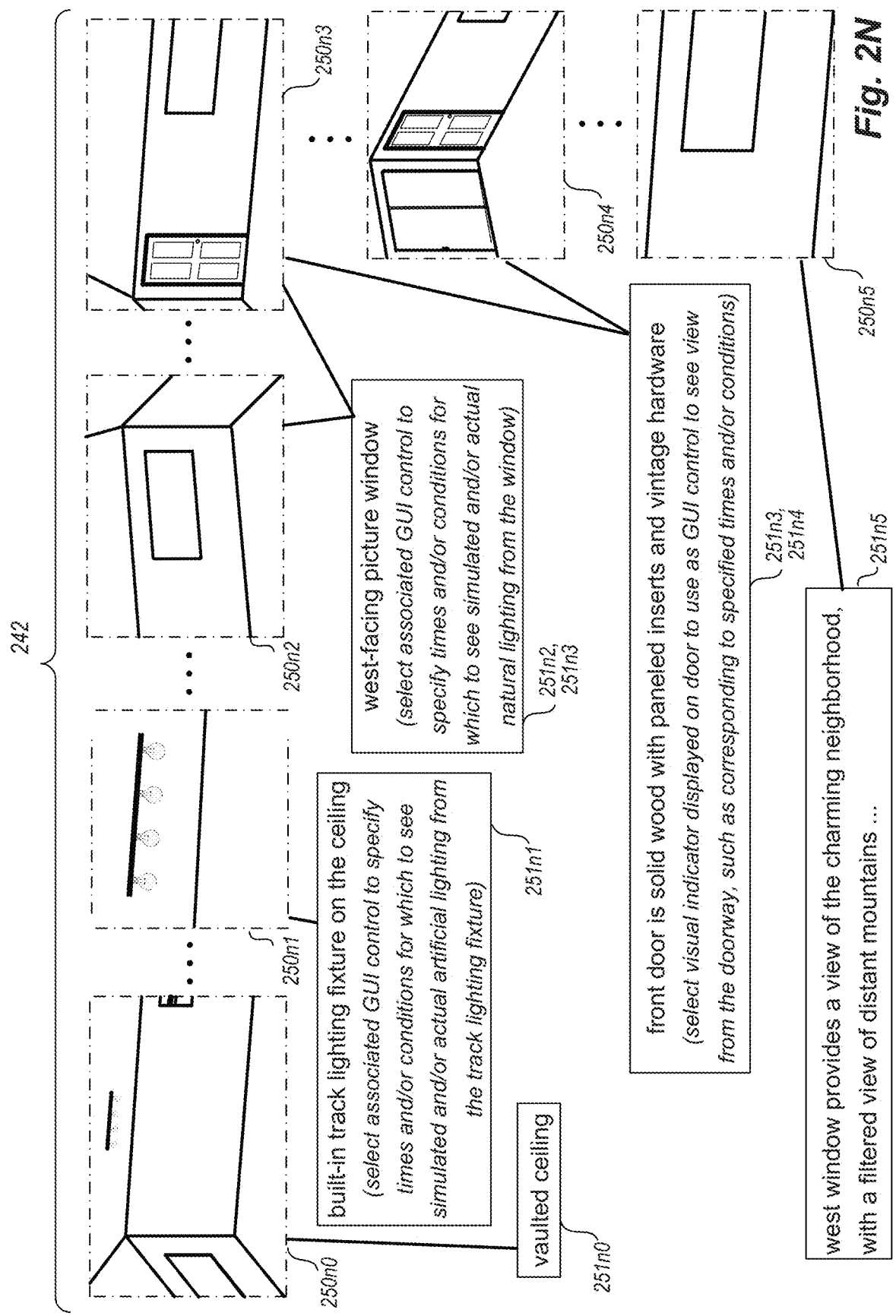

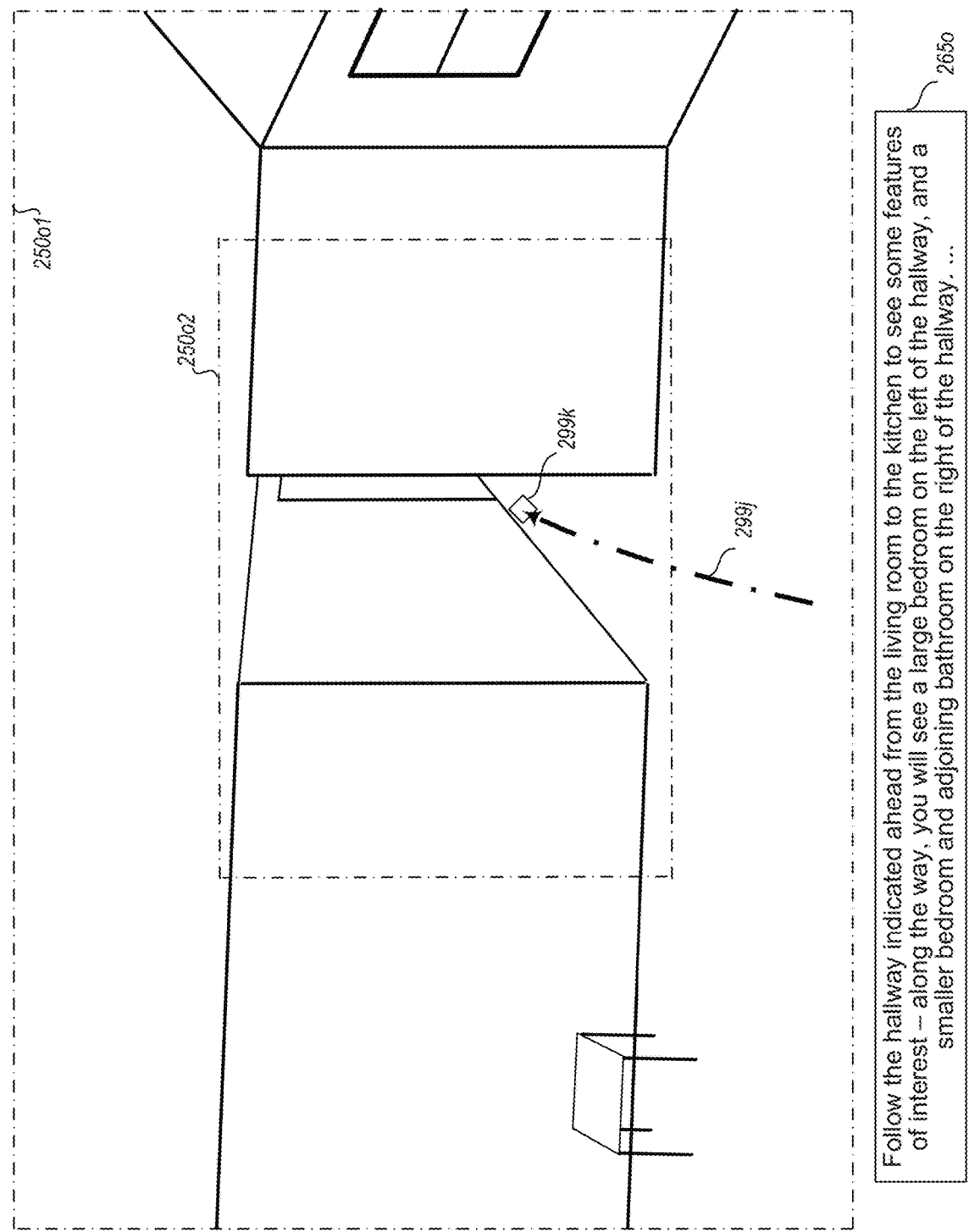
Fig. 2-O

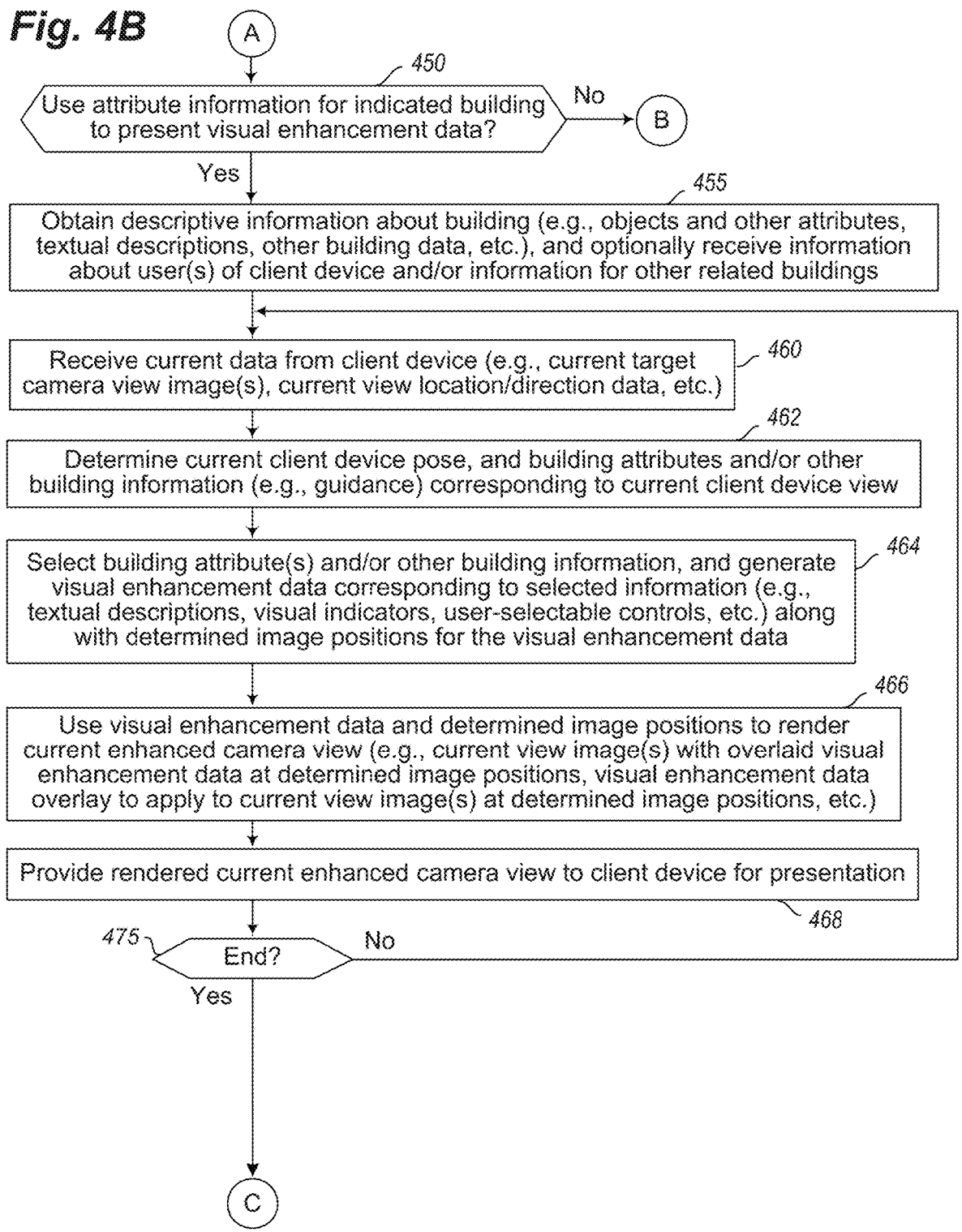

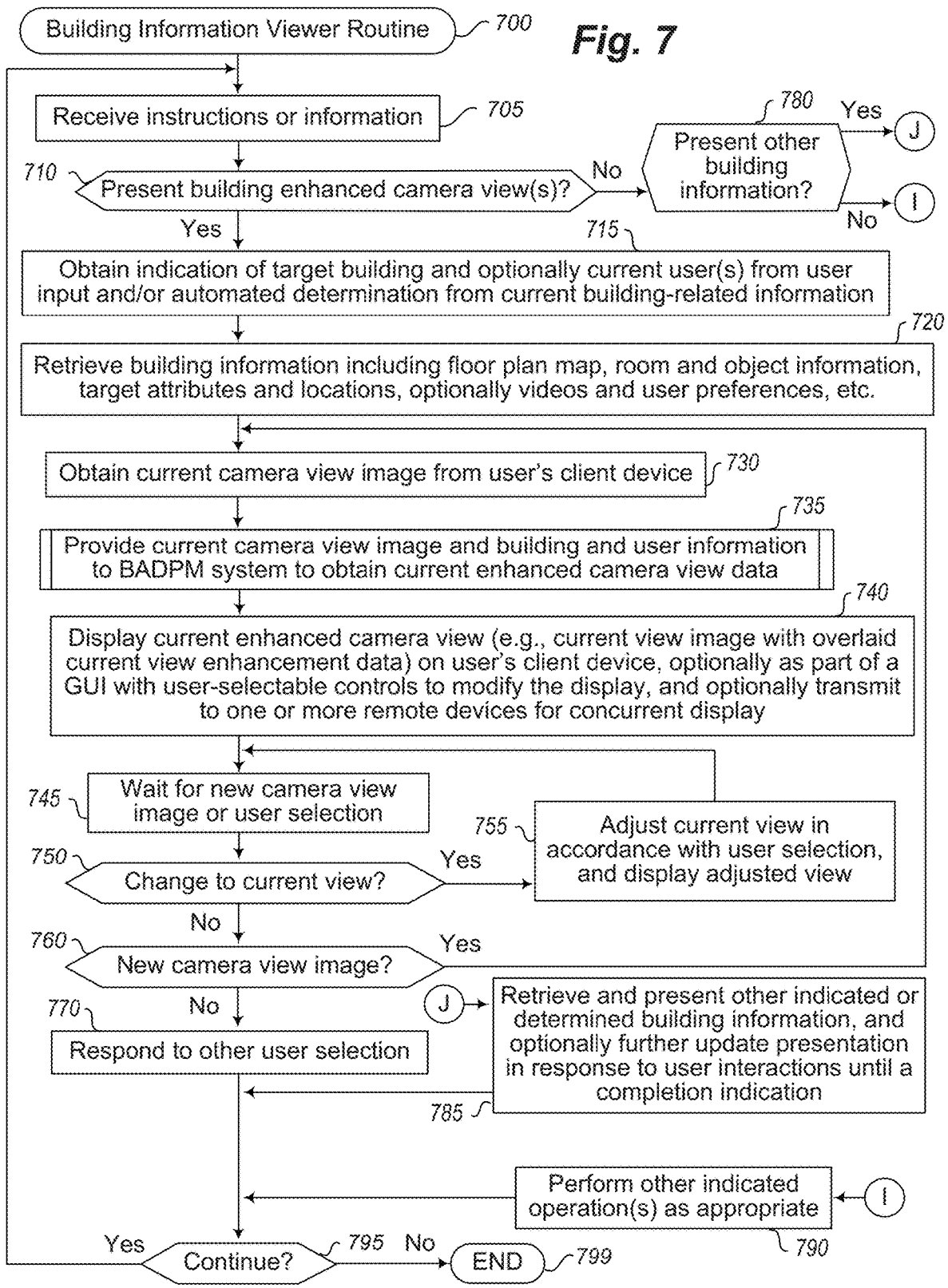

US 12,444,139 B2

AUTOMATED GENERATION AND PRESENTATION OF VISUAL DATA ENHANCEMENTS ON CAMERA VIEW IMAGES CAPTURED IN A BUILDING

TECHNICAL FIELD

The following disclosure relates generally to techniques for automatically using descriptive information about a building as part of generating and presenting visual data enhancements on camera view images displayed on a mobile device in the building, such as to provide improved navigation of buildings and other benefits by generating and presenting augmented camera views with visual data enhancements about structural details and other attributes of the building that are not otherwise visible in the non-augmented camera views and that are generated from automated analysis of acquired building information.

BACKGROUND

In various circumstances, such as architectural analysis, property inspection, real estate acquisition and development, general contracting, improvement cost estimation, etc., it may be desirable to know the interior of a house or other building without physically traveling to and entering the building. However, it can be difficult to effectively capture, represent and use such building interior information, including to identify buildings that satisfy one or more defined criteria of interest, and to display visual information captured within building interiors to users at remote locations (e.g., to enable a user to understand the layout and other details of the interior, including to control the display in user-selected manners). Moreover, even if a user is present at a building, it can be difficult to effectively navigate the building and determine information about the building that is not readily apparent. Also, while a floor plan of a building may provide some information about layout and other details of a building interior, such use of floor plans has some drawbacks, including that floor plans can be difficult to construct and maintain, to accurately scale and populate with information about room interiors, to visualize and otherwise use, etc. Also, while textual descriptions of buildings may sometimes exist, they are often inaccurate and/or incomplete (e.g., lack details about various attributes of the buildings, include incorrect or misleading information, etc.).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A includes diagrams depicting an exemplary building interior environment and computing systems and devices for use in embodiments of the present disclosure, including to generate descriptive information representing a building (e.g., based at least in part on analysis of acquired building images to determine layout and attributes of the building), and to use the generated building descriptive information to generate and present visual data enhancements on camera view images displayed on a mobile device in a building.

FIG. 1B illustrates an example of a type of descriptive building information.

FIGS. 2A-2K illustrate examples of automatically generating descriptive information for a building based at least in part on automated analysis of acquired building images and other building information to determine structural layout, objects and other attributes of the building.

FIGS. 2L-2S illustrate examples of automatically using building descriptive information to generate and present visual data enhancements on camera view images displayed on a mobile device in a building to provide improved navigation and other functionality.

FIGS. 4A-4B illustrate an example embodiment of a flow diagram for a Building Attribute Determination and Presentation Manager (BADPM) system routine in accordance with an embodiment of the present disclosure.

FIG. 7 illustrates an example embodiment of a flow diagram for a Building Information Viewer system routine in accordance with an embodiment of the present disclosure.

DETAILED DESCRIPTION

Figure 2A:
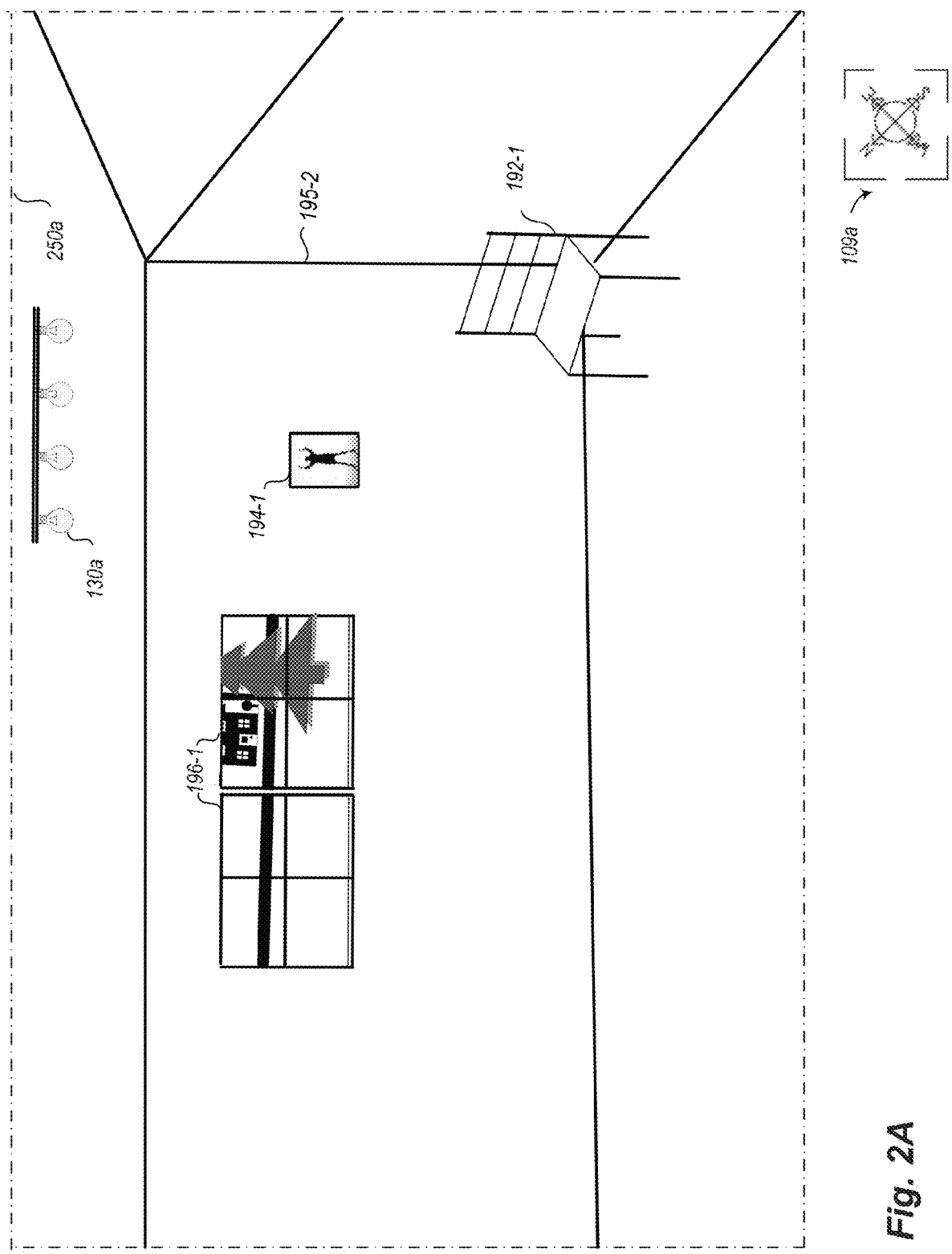

The present disclosure describes techniques for using computing devices to perform automated operations involving using generated descriptive building information to further generate and present visual data enhancements on target images that are displayed on a mobile device in the building (e.g., concurrent with capture of the target images by one or more cameras of the mobile device), such as to improve navigation of the building and provide other functionality as the mobile device moves through the building, and such as by using descriptive information about a building that is generated from analysis of acquired building images and optionally other building information (e.g., floor plans). Generation of descriptive building information may include automatically determining structural elements and other objects and attributes of a building from automated analysis of information about the building (e.g., acquired images for the building, floor plans, etc.), such as by using one or more trained machine learning models (e.g., trained neural networks), and automatically generating textual descriptions about the determined building objects and other attributes, such as by using one or more trained language models—such building information may, in at least some embodiments, be for an as-built multi-room building (e.g., a house, office building, apartment building, etc.) and include panorama images (e.g., with 360° of horizontal video coverage) and/or other images (e.g., rectilinear perspective images) acquired at acquisition locations in and around the building (e.g., without having or using information from any depth sensors or other distance-measuring devices about distances from an image's acquisition location to walls or other objects in the surrounding building). The automated operations involving the generation and presentation of visual data enhancements on target images displayed on a mobile device in the building may include identifying parts of one or more rooms of the building that are visible in a target image from a current camera view of the mobile device, selecting one or more building objects or other building attributes that are present in or otherwise correspond to those parts of the room(s) (e.g., that are visible in the visual data of the target image), retrieving and/or generating descriptive information about those building objects or other building attributes, and using the descriptive information to render visualizations to accompany display of the target image and/or subsequent images from the camera on the mobile device, such as to overlay the rendered visualizations on the displayed image(s) to provide an augmented view of the building in a real-time or near-real-time manner with respect to the image capture. In some cases, the automated techniques may further include using the generated building information and/or presented visual data enhancements in various manners, such as for controlling navigation of mobile devices (e.g., autonomous vehicles) in a building, for assisting navigation of a building by a user via display or other presentation on his/her mobile client device (s) in a corresponding GUI (graphical user interface), etc. Additional details are included below regarding automated generation and presentation of structural and otherwise descriptive building information, and some or all techniques described herein may, in at least some embodiments, be performed via automated operations of a Building Attribute Determination and Presentation Manager ("BADPM") system, as discussed further below.

As noted above, the automated operations of the BADPM system may include using generated descriptive building information to further generate and present visual data enhancements on images that are captured in the building and displayed on a mobile device in the building, such as to improve navigation of the building and provide other functionality as the mobile device moves through the building. In at least some embodiments and situations, the mobile device may include one or more cameras to capture images in an environment surrounding the mobile device, one or more display device components (also referred to herein as "displays") of the mobile device on which the images and the generated visual data enhancements are presented, computing resources (e.g., one or more processors, memory and/or storage, etc.) to perform at least some of the automated operations (e.g., the generation of visual data enhancements and/or presentation of rendered visual data enhancements on captured and displayed images), and optionally other I/O (input/output) components—in other embodiments and situations, the mobile device may include only a subset of such capabilities (e.g., one or more displays, but not the camera(s) and/or computing resources), such as if one or more other associated devices (e.g., other devices in the building) provide and/or perform some or all other of the capabilities. Non-exclusive examples of such a mobile device include the following: a smartphone mobile device (e.g., carried by a user) with computing resources and one or more cameras and one or more displays such as to provide augmented reality ("AR") information and functionality to the user as images are captured by the camera(s) and displayed on the display(s) with associated generated visual enhancement data; a smart glasses mobile device worn over the eye(s) of a user and with one or more cameras and one or more displays (e.g., incorporated into one or two transparent or semi-transparent lens(es) of the glasses in front of the user's eyes) and optionally computing resources, such as to provide augmented reality information and functionality to the user as images are captured by the camera(s) and displayed on the display(s) with associated generated visual enhancement data; a virtual reality ("VR") headset worn over the eyes of a user and with one or more cameras and one or more displays (e.g., two displays, one for each eyes, and with the headset blocking direct views of the surroundings by the user's eyes) and optionally computing resources (e.g., to provide virtual reality information and functionality to the user as images are captured by the camera(s) and displayed on the display(s) with associated generated visual enhancement data, and with the presentation of the generated visual enhancement data for a target image occurring in a real-time or near-real-time manner (e.g., within microseconds or milliseconds or seconds or minutes of the target image capture) in at least some embodiments and situations. In addition, the generation and presentation of visual data enhancements on images that are captured in the building may further in at least some embodiments include transmitting enhanced camera view data (e.g., one or more target images and associated generated visual data enhancements) over one or more networks from one or more computing devices that generate the enhanced camera view data to one or more devices that display or otherwise present the enhanced camera view data, such as one or more of the following: transmitted by one or more computing devices remote from the building to a mobile device in the building from which the target image(s) are obtained; transmitted by the mobile device in the building and/or by one or more computing devices remote from the building to one or more additional devices, such as additional device(s) remote from the building for further presentation to user(s) of those additional device(s), and whether such further presentation occurs concurrent with the presentation of that enhanced camera view data on the mobile device in the building (e.g., as part of a shared video conference or other shared information in which both the mobile device and the additional device(s) participate) or occurs at a later time (e.g., to record some or all of the enhanced camera view data presented on the mobile device and later playback that recorded data on one or more other devices) or occurs instead of presentation on the mobile device (e.g., to present enhanced camera view data on such additional device(s) using images captured by the mobile device in the building but without some or all of that enhanced camera view data being presented on the mobile device). Additional details are included below regarding types of mobile devices and corresponding uses, including with respect to FIGS. 2L-2R and FIG. 3.

The automated operations of the BADPM system involving generating and presenting visual data enhancements may further include generating visual representations of a variety of types of enhancement information in various embodiments and situations, with non-exclusive examples of such visual data enhancements including the following: visual representations of structural parts of a building that are not visible in a current target image captured in a room of the building, such as analogous to an 'x-ray' view of structural building parts located behind walls and/or floors and/or ceilings that are visible in the target image (e.g., a wireframe or 3D point cloud shape of one or more other rooms or other room shape visual representations; information about non-visible structural elements incorporated in the visible walls of floors or ceilings, such as structural framing, ductwork, pipes, wires or cables, etc.; directions toward or other guidance for reaching structural parts in other rooms; etc.) or that are otherwise not visible (e.g., blocked by one or more other intervening objects), and such as displayed on the target image at determined image positions corresponding to actual locations in the building of those structural parts; directions toward or other guidance for reaching objects or other attributes in other parts of the building that are not currently visible, such as in other rooms and/or for objects or other attributes of one or more types determined to be of interest (e.g., the same or similar type of object or other attribute that is currently visible in the target image and is also present elsewhere in the building; one or more types of objects or other attributes and/or particular objects or other attributes based on interests of or other relevance to the user, such as based on user-specified information, automatically determined user-specific information, based on a type of the user and/or activity of the user, based on information supplied by an owner or other representative of the building; etc.), and optionally with some or all such directions or other guidance being displayed and updated through a sequence of target images as the mobile device moves from its current location to a target destination location; information to compare the current building to one or more other buildings (e.g., other buildings selected based on satisfying one or more defined building comparison criteria, such as with respect to geographical location, building type, building size, building use, etc.), such as with respect to one or more building attributes or other building characteristics; information about one or more automatically assessed or otherwise determined utility values associated with a building object or other building attribute, such as based on usefulness, condition, value to create or replace, etc.); descriptive information and visible image position indicators for particular building objects and other attributes selected as satisfying one or more defined criteria (e.g., unusual or otherwise differentiating attributes with respect to other similar or otherwise related buildings; building attributes that have changed, such as due to remodeling, wear, aging, damage, etc.; other attributes of interest or other relevance to the user; etc.), and whether the selected objects or other attributes are highlighted for positive reasons (e.g., to reflect differentiating attributes, whether automatically determined or otherwise identified) and/or negative reasons (e.g., to indicate problems, whether automatically determined or otherwise identified, and such as for further inspection or other review); user-selectable GUI controls and associated visual indicators for display to provide additional functionality upon user selection, such as in a manner specific to other types of visual data enhancements being presented and/or to contents of an underlying target image; etc. Additional details are included below regarding types of visual data enhancements and corresponding uses, including with respect to FIGS. 2L-2R and FIG. 3.

As noted above, automated operations of a BADPM system may in at least some embodiments include automatically determining attributes of interest for a building based at least in part on analyzing visual data of images acquired in and around a building and optionally associated image acquisition metadata, including in at least some situations by using one or more trained machine learning models—in other embodiments, information about some or all of the building attributes may instead be determined in other manners, such as in part from an existing textual building description. Such determined attributes may reflect characteristics of individual rooms or other areas of the building, such as corresponding to structural elements and other objects identified in the rooms and/or visible characteristics or other attributes of the objects and the rooms—in particular, the automated analysis by the BADPM system of building images may, in at least some embodiments and situations, include identifying structural elements or other objects of various types in rooms of the building or otherwise in areas associated with the building (e.g., external areas, additional accessory buildings or other structures, etc.), with non-exclusive examples of such objects including a floor, wall, ceiling, window, doorway, non-doorway wall opening, set of stairs, fixture (e.g., lighting or plumbing), appliance, cabinet, island, fireplace, countertop, other built-in structural element, furniture, etc. The automated analysis by the BADPM system of acquired building images may further include determining particular attributes of each of some or all such identified objects, such as, for example, a color, type of material (e.g., surface material), estimated age, etc., as well as additional types of attributes in some embodiments such as directions that building objects face (e.g., for windows, doorways, etc.), actual and/or simulated lighting at particular positions (e.g., based on the geographical location and orientation of the building and the position of the sun at a specified time, such as a time-of-day, day-of-month, month-of-year, season-of-year, etc., and optionally corresponding to a particular object), views from particular windows or other locations, etc. Attributes determined for a particular room from one or more images acquired in the room (or otherwise from one or more images acquired at positions with a view of at least some of the room) may include, for example, one or more of the following non-exclusive examples: room types, room dimensions, room shape (e.g., two-dimensional, or '2D', such as relative positions of walls; three-dimensional, or '3D', such as a 3D point cloud and/or planar surfaces of walls and a floor and a ceiling; etc.), types of room usage (e.g., public versus private space) and/or functionality (e.g., recreation), locations in a room of windows and doorways and other inter-room openings, types of inter-room connections, dimensions of inter-room connections, etc. In at least some such embodiments, the BADPM system may, for such automated analysis of images, use one or more machine learning models (e.g., classification neural network models) that are trained via supervised learning (e.g., using labeled data that identifies images having each of the possible objects and attributes), while in other embodiments such machine learning models may instead be trained in an unsupervised manner (e.g., using unsupervised clustering). In at least some embodiments, some or all of the images acquired for a building and used in generation of building descriptive information may be panorama images that are each acquired at one of multiple acquisition locations in or around the building, such as to generate a panorama image at each such acquisition location from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous capture of all the image information (e.g., using one or more fisheye lenses), etc. It will be appreciated that such a panorama image may in some situations be represented in a spherical coordinate system and provide up to 360° coverage around horizontal and/or vertical axes, such that a user viewing a starting panorama image may move the viewing direction within the starting panorama image to different orientations to cause different images (or "views") to be rendered within the starting panorama image (including, if the panorama image is represented in a spherical coordinate system, to convert the image being rendered into a planar coordinate system).

Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations. Additional details are included below regarding capturing of images, including with respect to the examples of FIGS. 2A-2D and their associated descriptions, and regarding automated analysis of acquired images and/or other environmental data associated with a building to determine attributes of the building and of its rooms, including with respect to the examples of FIGS. 2D-2K and their associated descriptions.

As noted above, automated operations of a BADPM system may also in at least some embodiments include automatically analyzing types of building information other than acquired building images to determine additional attributes of the building, including in at least some situations by using one or more trained machine learning models (e.g., one or more trained neural networks, and whether the same or different from the machine learning models used to analyze images) to determine attributes that reflect characteristics of some or all of the building (e.g., of two or more rooms of the building), such as corresponding to some or all of a layout of some or all rooms of the building (e.g., based at least in part on inter-connections between rooms and/or other inter-room adjacencies)—such other types of building information may include, for example, one or more of the following: a floor plan; a group of inter-linked images, such as for use in a virtual tour; an existing textual description of a building (e.g., listing information for a building, such as is included on a Multiple Listing Service, or MLS); etc. Such a floor plan of a building may include a 2D (two-dimensional) representation of various information about the building (e.g., the rooms, doorways between rooms and other inter-room connections, exterior doorways, windows, etc.), and may be further associated with various types of supplemental or otherwise additional information about the building (e.g., data for a plurality of other building-related attributes)—such additional building information may, for example, include one or more of the following: a 3D, or three-dimensional, model of the building that includes height information (e.g., for building walls and inter-room openings and other vertical areas); a 2.5D, or two-and-a-half dimensional, model of the building that when rendered includes visual representations of walls and/or other vertical surfaces without explicitly modeling measured heights of those walls and/or other vertical surfaces; images and/or other types of data captured in rooms of the building, including panoramic images (e.g., 360° panorama images); etc., as discussed in greater detail below. In some embodiments and situations, the floor plan and/or its associated information may further represent at least some information external to the building (e.g., for some or all of a property on which the building is located), such as exterior areas adjacent to doorways or other wall openings between the building and the exterior, or more generally some or all external areas of a property that includes one or more buildings or other structures (e.g., a house and one or more outbuildings or other accessory structures, such as a garage, shed, pool house, separate guest quarters, mother-in-law unit or other accessory dwelling unit, pool, patio, deck, sidewalk, etc.).

The automated analysis by the BADPM system of a building floor plan and/or other building information may, in at least some embodiments and situations, include determining building attributes that are based on information about a building as a whole, such as objective attributes that can be independently verified and/or replicated (e.g., number of bedrooms, number of bathrooms, square footage, connectivity between rooms, etc.), and/or subjective attributes that have associated uncertainty (e.g., whether the building has an open floor plan; has a typical/normal layout versus atypical/odd/unusual layout; a standard versus nonstandard floor plan; a floor plan that is accessibility friendly, such as by being accessible with respect to one or more characteristics such as wheelchair or other disability and/or advanced age; etc.). The automated analysis by the BADPM system of a building floor plan may, in at least some embodiments and situations, further include determining building attributes that are based at least in part on information about inter-room adjacencies (e.g., inter-room connections between two or more rooms or other areas), such as based at least in part on a layout of some or all rooms of a building (e.g., all rooms on the same story or that are otherwise part of a grouping of rooms), including some or all such subjective attributes, as well as other types of attributes such as a movement flow pattern of people through rooms. At least some such determined building attributes may be further based on information about a building's location and/or orientation (e.g., about views available from windows or other exterior openings of the building, about directions of windows or other structural elements or other objects of the building, about natural lighting information available at specified days and/or seasons and/or times, etc.). In at least some such embodiments, the BADPM system may, for such automated analysis of building floor plans, use one or more machine learning models (e.g., classification neural network models) that are trained via supervised learning (e.g., using labeled data that identifies floor plans or other groups of rooms or other areas having each of the possible characteristics or other attributes), while in other embodiments such machine learning models may instead be trained in an unsupervised manner (e.g., using unsupervised clustering). Additional details are included below regarding automated analysis of a floor plan for a building to determine attributes of the building, including with respect to the examples of FIGS. 2D-2K and their associated descriptions.

As noted above, automated operations of a BADPM system may also in at least some embodiments include automated generation of descriptions about a building based on automatically determined characteristics and other attributes, including, in at least some embodiments and situations, using one or more trained language models to generate a description for each of some or all such determined attributes. The generated descriptions for individual attributes may be further combined in various manners in various embodiments, such as by grouping attributes and their associated descriptions in various manners (e.g., by room or other area; by type of attribute, such as by object type and/or color and/or surface material; by degree of specificity or generality, such as to group building-wide attributes and include their generated descriptions, followed by generated descriptions for attributes that are grouped by room, followed by generated descriptions for attributes that correspond to individual structural elements and other objects; etc.). After attributes and/or building descriptions are generated or otherwise obtained for a building, such as based on analysis of information for a building (e.g., images of, a floor plan for, and optionally other associated information for a building), that generated building information may be used by the BADPM system in various manners, including in some embodiments as part of visual data enhancements to overlay on or otherwise display in combination with corresponding target images, such as to highlight particular building attributes based at least in part by displaying corresponding generated textual descriptions. Additional details are included below regarding automatically generating descriptions of determined building attributes and of using such generated descriptions as part of visual data enhancements, including with respect to the examples of FIGS. 2D-2S and their associated descriptions.

The described techniques provide various benefits in various embodiments, including to allow information about multi-room buildings and other structures to be identified and used more efficiently and rapidly and in manners not previously available, including to automatically generate and present visual data enhancements on a mobile device in a building (e.g., overlaid on target images captured by the mobile device in the building, such as in a real-time or near-real-time manner with respect to the image capture) based at least in part on automated analysis of various types of building information (e.g., images, floor plans, etc.)—such visual data enhancements may be selected and presented at determined image positions using visual data of target images showing current camera views of a mobile device in the building and further based on, for example, one or more of the following: attributes of particular objects within the building (e.g., in particular rooms or other areas, or more generally attributes of those rooms or other areas), such as determined from analysis of one or more images acquired at the building; similarity to one or more other buildings; adjacency information about which rooms are inter-connected and related inter-room relationship information, such as with respect to overall building layout; similarity to particular building or other area characteristics or other attributes; similarity to subjective attributes regarding a floor plan's characteristics; etc. In addition, such automated techniques include providing navigation functionality and other related functionality for a building by using information acquired from the actual building environment (rather than from plans on how the building should theoretically be constructed), as well as enabling the capture of changes to structural elements and/or visual appearance elements that occur after a building is initially constructed, and further perform such automated operations using significantly reduced computing power and time relative to other attempts to learn a building's layout. In addition, in some embodiments the described techniques may be used to provide an improved GUI in which a user may more accurately and quickly identify obtain information about an indicated building (e.g., using a mobile device of the user in the building, and such as for use in navigating an interior of the building), including in response to search requests, as part of providing personalized information to the user, as part of providing value estimates and/or other information about a building to a user (e.g., after analysis of information about one or more target building floor plans that are similar to one or more initial floor plans or that otherwise match specified criteria), etc. Various other benefits are also provided by the described techniques, some of which are further described elsewhere herein.

In addition, in some embodiments, visual data enhancements are generated and presented to an end-user based at least in part on specified criteria associated with that end-user (e.g., based on one or more initial buildings and/or building attributes that are selected by the end-user and/or are identified as previously being of interest to the end-user, whether based on explicit and/or implicit activities of the end-user to specify such buildings and/or building attributes; based on one or more search criteria specified by the end-user, whether explicitly and/or implicitly; etc.), and are used in further automated activities to personalize interactions with the end-user. Such further automated personalized interactions may be of various types in various embodiments, and in some embodiments may include displaying or otherwise presenting information to the end-user about selected building attributes and/or additional information associated with a building in which the end-user is located or otherwise reviewing from a remote location. Additional details are included below regarding end-user personalization and/or presentation with respect to selected building attributes, including with respect to the examples of FIGS. 2D-2S and their associated descriptions.

As noted above, automated operations of a BADPM system may include using acquired building images and/or other building information, such as a floor plan. In at least some embodiments, such an BADPM system may operate in conjunction with one or more separate ICA (Image Capture and Analysis) systems and/or with one or more separate MIGM (Mapping Information and Generation Manager) systems, such as to obtain and use images and floor plans and other associated information for buildings from the ICA and/or MIGM systems, while in other embodiments such an BADPM system may incorporate some or all functionality of such ICA and/or MIGM systems as part of the BADPM system. In yet other embodiments, the BADPM system may operate without using some or all functionality of the ICA and/or MIGM systems, such as if the BADPM system obtains building images, floor plans and/or other associated information from other sources (e.g., from manual creation or provision of such building images, floor plans and/or associated information by one or more users).

With respect to functionality of such an ICA system, it may perform automated operations in at least some embodiments to acquire images (e.g., panorama images) at various acquisition locations associated with a building (e.g., in the interior of multiple rooms of the building), and optionally further acquire metadata related to the image acquisition process (e.g., image pose information, such as using compass headings and/or GPS-based locations) and/or to movement of a capture device between acquisition locations—in at least some embodiments, such acquisition and subsequent use of acquired information may occur without having or using information from depth sensors or other distance-measuring devices about distances from images' acquisition locations to walls or other objects in a surrounding building or other structure. For example, in at least some such embodiments, such techniques may include using one or more mobile devices (e.g., a camera having one or more fisheye lenses and mounted on a rotatable tripod or otherwise having an automated rotation mechanism; a camera having one or more fisheye lenses sufficient to capture 360° horizontally without rotation; a smartphone held and moved by a user, such as to rotate the user's body and held smartphone in a 360° circle around a vertical axis; a camera held by or mounted on a user or the user's clothing; a camera mounted on an aerial and/or ground-based drone or other robotic device; etc.) to capture visual data from a sequence of multiple acquisition locations within multiple rooms of a house (or other building). Additional details are included elsewhere herein regarding operations of device(s) implementing an ICA system, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images (and optionally other images) that have been acquired for a building interior (and optionally an exterior of the building), and generate a corresponding floor plan for the building, such as by determining room shapes and locations of passages connecting rooms for some or all of those panorama images, as well as by determining structural wall elements and optionally other objects in some or all rooms of the building in at least some embodiments and situations. The types of structural wall elements corresponding to connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular objects and attributes (e.g., a color and/or material type and/or other characteristics of particular structural elements or other objects, such as a floor, wall, ceiling, countertop, furniture, fixture, appliance, cabinet, island, fireplace, etc.; the presence and/or absence of particular objects or other elements; etc.), or to otherwise determine relevant attributes (e.g., directions that building objects face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of data structures (e.g., visual data enhancements, floor plans, virtual tours of inter-linked images, generated building descriptions, etc.) are generated and used in specific manners in some embodiments, it will be appreciated that other types of information to describe buildings may be similarly generated and used in other embodiments, including for buildings (or other structures or layouts) separate from houses, and that generated visual data enhancements may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device, including by one or more camera lenses and/or associated imaging systems (e.g., including one or more image sensors) that capture image data and other visual data. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1A includes an example block diagram of various computing devices and systems that may participate in the described techniques in some embodiments, such as with respect to the illustrated example building 198 (in this example, house 198), and by the Building Attribute Determination and Presentation Manager ("BADPM") system 140 executing at least in part on one or more server computing systems 180 in this example embodiment—in other embodiments and situations, some or all of a BADPM system may execute on each of one or more mobile building information viewer user client devices 175, such as to use target images captured on that device 175 by its one or more cameras (not shown) to generate and/or present visual data enhancements overlaid on those target images while the target images are displayed on one or more displays (not shown) of that device 175, optionally in conjunction with a building information viewer system executing on that device 175 (not shown) to control the display of the presented visual data enhancements and target images and to handle user selections and other interactions with the presented visual data enhancements.

In the illustrated embodiment, the BADPM system 140 analyzes obtained building information (e.g., images, such as images 165 acquired by the ICA system; floor plans, such as floor plans 155 generated by the MIGM system; etc.) in order to generate descriptive building information 142, such as by using one or more trained machine learning and/or language models 144 as part of the analysis of the building information in some embodiments and situations, and optionally further using supporting information supplied by system operator users via computing devices 105 over intervening computer network(s) 170). The BADPM system 140 also receives and analyzes current camera data 145 (e.g., images; location and positioning data, such as from one or more inertial measurement units and/or location sensors; etc.) from each of one or more mobile devices 175, and determines associated current camera building data 146 for that mobile device (e.g., current pose of the mobile device and/or its camera, including location and orientation; current room or other area in which the mobile device/camera is located; current parts of one or more rooms or other building areas visible in a current target image; one or more objects or other building attributes that are visible in or otherwise associated with a current target image and optionally building locations and/or image positions corresponding to those objects or other building attributes, etc.). The BADPM system 140 then subsequently uses the generated building information 142, along with the current camera building data 146 for a mobile device 175, to generate and provide current enhanced view data 141 for presentation on that mobile device and/or on other devices (not shown), such as visual data enhancements to be displayed in a manner overlaid on one or more target images from that mobile device (e.g., target image(s) in the current camera data 145). In some embodiments, the BADPM system 140 further, as part of generating and providing current enhanced view data 141 for presentation on a mobile device 175, optionally also uses user data 143 for one or more users of that mobile device, such as user-specific criteria supplied by or otherwise associated with that user (e.g., objects or other attributes, floor plans or other building information, other buildings, etc., optionally previously or currently indicated by that user or otherwise identified as being of interest to the user), including to select particular types of data to include in the current enhanced camera view data 141. In addition, in at least some embodiments and situations, one or more users of client computing devices 105 may further interact over the network(s) 170 with the BADPM system 140, such as by system operator users that assist with some of the automated operations of the BADPM system. Building information that is analyzed by the BADPM system may be obtained in some embodiments in manners other than via ICA and/or MIGM systems (e.g., if such ICA and/or MIGM systems are not part of the BADPM system), such as to receive building images and/or floor plans from other sources, and/or the BADPM system may receive some or all of the descriptive building information 142 from one or more external sources (e.g., users of computing devices 105; other automated systems, not shown; etc.) rather than generate it. Additional details related to the automated operations of the BADPM system are included elsewhere herein, including with respect to FIGS. 2D-2S and FIGS. 4A-4B.

In this example, an Interior Capture and Analysis ("ICA") system (e.g., an ICA system 160 executing on the one or more server computing systems 180, such as part of or associated with the BADPM system; an ICA system application 154 executing on a mobile image acquisition device 185; etc.) is also illustrated and captures information 165 with respect to one or more buildings or other structures (e.g., by capturing one or more 360° panorama images and/or other images for multiple acquisition locations 210 in example house 198), and a MIGM (Mapping Information Generation Manager) system 160 executing on the one or more server computing systems 180 (e.g., as part of or otherwise associated with the BADPM system) further uses that captured building information and optionally additional supporting information (e.g., supplied by system operator users via computing devices 105 over intervening computer network(s) 170) to generate and provide building floor plans 155 and/or other mapping-related information (not shown) for the building(s) or other structure(s). While the ICA and MIGM systems 160 are illustrated in this example embodiment as executing on the same server computing system(s) 180 as the BADPM system (e.g., with all systems being operated by a single entity or otherwise being executed in coordination with each other, such as with some or all functionality of all the systems integrated together), in other embodiments the ICA system 160 and/or MIGM system 160 and/or BADPM system 140 may operate on one or more other systems separate from the system(s) 180 (e.g., on a mobile device 185; mobile device 175; one or more other computing systems, not shown; etc.), whether instead of or in addition to the copies of those systems executing on the system(s) 180 (e.g., to have a copy of the MIGM system 160 executing on the device 185 to incrementally generate at least partial building floor plans as building images are acquired by the ICA system 160 executing on the device 185 and/or by that copy of the MIGM system, while another copy of the MIGM system optionally executes on one or more server computing systems to generate a final complete building floor plan after all images are acquired; to have a copy of some or all of the BADPM system 140 executing on a mobile device 175, such as a BAPDM Attribute Information Presenter component 344; etc.), and in yet other embodiments the BADPM may instead operate without an ICA system and/or MIGM system and instead obtain panorama images (or other images) and/or building floor plans from one or more external sources. Additional details related to the automated operation of the ICA and MIGM systems are included elsewhere herein, including with respect to FIGS. 2A-2D and with respect to FIGS. 5 and 6A-6B, respectively.

Various components of the mobile image acquisition computing device 185 are also illustrated in FIG. 1A, including one or more hardware processors 132 (e.g., CPUs, GPUs, etc.) that execute software (e.g., ICA application 154, optional browser 153, etc.) using executable instructions stored and/or loaded on one or more memory/storage components 152 of the device 185, and optionally one or more imaging systems 135 of one or more types (e.g., including one or more cameras with one or more lenses and one or more image sensors) to acquire visual data of one or more panorama images 165 and/or other images (not shown, such as rectilinear perspective images)—some or all such images 165 may in some embodiments be supplied by one or more separate associated camera devices 184 (e.g., via a wired/cabled connection, via Bluetooth or other inter-device wireless communications, etc.), whether in addition to or instead of images captured by the mobile device 185. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), one or more control systems 147 managing I/O (input/output) and/or communications and/or networking for the device 185 (e.g., to receive instructions from and present information to the user) such as for other device I/O and communication components 151 (e.g., network interfaces or other connections, keyboards, mice or other pointing devices, microphones, speakers, GPS receivers, etc.), a display system 149 (e.g., including one or more displays, optionally with touch-sensitive screens), optionally one or more depth-sensing sensors or other distance-measuring components 136 of one or more types, optionally a GPS (or Global Positioning System) sensor 134 or other position determination sensor (not shown in this example), optionally other components (e.g., one or more lighting components), etc. Other devices/systems 105, 175 and 180 and/or camera devices 184 may each include various hardware components and stored information in a manner analogous to mobile device 185, which are not shown in this example for the sake of brevity, and as discussed in greater detail below with respect to FIG. 3.

One or more users (e.g., end-users, not shown) of one or more mobile client devices 175 may further interact over one or more computer networks 170 with the BADPM system 140 (and optionally the ICA system 160 and/or MIGM system 160), and/or with some or all of the BADPM system executing on that device 175 (not shown), such as to participate in capturing target images in or around a building using one or more cameras of the device 175, and displaying corresponding received enhanced camera view data 141 based on the target images on one or more displays of the device 175—the provided enhanced camera view data 141 may, for example, one or more combinations each having a target image with overlaid or otherwise accompanying generated visual data enhancements, and/or generated visual data enhancements to be overlaid on or otherwise presented accompanying one or more displayed target images. Such mobile devices 175 may each execute a building information viewer system (not shown) that is used to present information on that mobile device, such as part of a GUI displayed on that mobile device, and further optionally receive and respond to interactions by one or more users with the presented information (e.g., with displayed user-selectable controls, such as part of the generated visual data enhancements), as discussed in greater detail elsewhere herein, including with respect to FIG. 7. Interactions by the user(s) may include, for example, specifying criteria to use in providing building information (e.g., criteria about building attributes of interest to a user), obtaining and optionally requesting information for one or more indicated buildings (e.g., at which the user's mobile device is located, such as by supplying one or more target images captured at a building) and interacting with corresponding provided building information—nonexclusive examples of interactions with displayed or otherwise presented information includes the following: to view generated building information, such as part of presented enhanced camera view data; to select user-selectable controls that are provided with presented enhanced camera view data, such as included in visual data enhancements overlaid on a target image, including to interact with one or more displayed visual indicators and/or generated textual descriptions associated with a particular building object or other building attribute, including to obtain further data related to that building object or other building attribute; to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed; etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc.

Also, while not illustrated in FIG. 1A, in some embodiments the client devices 175 (or other devices, not shown) may receive and use information about buildings (e.g., identified floor plans and/or other mapping-related information) in additional manners, such as to control or assist automated navigation activities by those devices (e.g., by autonomous vehicles or other devices), whether instead of or in addition to display of the identified information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client devices 175 and server computing systems 180 may include various hardware components and stored information, as discussed in greater detail below with respect to FIG. 3.

In the example of FIG. 1A, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 185 and/or associated camera devices 184, and for use in generating and providing a representation of an interior of the building or other structure. For example, in at least some such embodiments, such techniques may include using one or more mobile devices (e.g., a camera having one or more fisheye lenses and mounted on a rotatable tripod or otherwise having an automated rotation mechanism; a camera having sufficient fisheye lenses to capture 360° horizontally without rotation; a camera of a smartphone or separate device held by or mounted on a user or the user's clothing and using one or more non-fisheye lens, such as wide-angle rectilinear lenses and/or telephone lenses and/or macro lenses and/or standard lenses; etc.) to capture data from a sequence of multiple acquisition locations within multiple rooms of a house (or other building), and to optionally further capture data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is captured, the techniques may include producing a 360° panorama image from that acquisition location with 360° of horizontal information around a vertical axis (e.g., a 360° panorama image that shows the surrounding room in an equirectangular format), and then providing the panorama images for subsequent use by the MIGM and/or BADPM systems. Additional details related to embodiments of a system providing at least some such functionality of an ICA system are included in U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Inter-Connected Images"; each of which is incorporated herein by reference in its entirety.

In addition, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model floor plan rendering of the building and/or a 3D model floor plan rendering of the building, etc., and including for a floor plan of a multi-story or otherwise multi-level building to have multiple associated sub-floor plans for different stories or levels that are interlinked (e.g., via connecting stairway passages) or are part of a common 2.5D and/or 3D model. Accordingly, non-exclusive examples of an end-user's interactions with a displayed or otherwise generated 2D floor plan of a building may include one or more of the following: to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D coordinate system to which a current user viewing direction is directed, and to render a corresponding planar image that illustrates that portion of the panorama image without the curvature or other distortions present in the original panorama image; etc. Additional details regarding example embodiments of systems to provide or otherwise support at least some functionality of a building information viewer system and routine as discussed herein, including to display various types of information related to a building of interest and such as by a BHP (Building Information Integrated Presentation) system and/or an ILTM (Image Locations Transition Manager) system and/or a BMLSM (Building Map Lighting Simulation Manager) system, are included in U.S. Non-Provisional patent application Ser. No. 16/681,787, filed Nov. 12, 2019 and entitled "Presenting Integrated Building Information Using Three-Dimensional Building Models," in U.S. Non-Provisional patent application Ser. No. 16/841,581, filed Apr. 6, 2020 and entitled "Providing Simulated Lighting Information For Three-Dimensional Building Models," and in U.S. Non-Provisional patent application Ser. No. 15/950,881, filed Apr. 11, 2018 and entitled "Presenting Image Transition Sequences Between Acquisition Locations," each of which is incorporated herein by reference in its entirety. In addition, while not illustrated in FIG. 1A, in some embodiments the client devices 175 (or other devices, not shown) may receive and use generated floor plans and/or other generated mapping-related information in additional manners, such as to control or assist automated navigation activities by those devices (e.g., by autonomous vehicles or other devices), whether instead of or in addition to display of the generated information.

FIG. 1A further depicts an exemplary building interior environment in which 360° panorama images and/or other images are acquired, such as by the ICA system and for use by the MIGM system (e.g., under control of the BADPM system) to generate and provide one or more corresponding building floor plans (e.g., multiple incremental partial building floor plans) and/or by the BADPM system to further use such building information as part of automated building information generation operations. In particular, FIG. 1A illustrates one story of a multi-story house (or other building) 198 with an interior that was captured at least in part via multiple panorama images, such as by a mobile image acquisition device 185 with image acquisition capabilities and/or one or more associated camera devices 184 as they are moved through the building interior to a sequence of multiple acquisition locations 210 (e.g., starting at acquisition location 210A, moving to acquisition location 210B along travel path 115, etc., and ending at acquisition location 210-O or 210P outside of the building). An embodiment of the ICA system may automatically perform or assist in the capturing of the data representing the building interior (as well as to further analyze the captured data to generate 360° panorama images to provide a visual representation of the building interior), and an embodiment of the MIGM system may analyze the visual data of the acquired images to generate one or more building floor plans for the house 198 (e.g., multiple incremental building floor plans). While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations in such embodiments may be determined in part or in whole based on elements in different images but without using any data from any such depth sensors, while in other embodiments such depth data may be used. In addition, while directional indicator 109 is provided in FIG. 1A for reference of the reader relative to the example house 198, the mobile device and/or ICA system may not use such absolute directional information and/or absolute locations in at least some embodiments, such as to instead determine relative directions and distances between acquisition locations 210 without regard to actual geographical positions or directions in such embodiments, while in other embodiments such absolute directional information and/or absolute locations may be obtained and used.

In operation, the mobile device 185 and/or camera device(s) 184 arrive at a first acquisition location 210A within a first room of the building interior (in this example, in a living room accessible via an external door 190-1), and captures or acquires a view of a portion of the building interior that is visible from that acquisition location 210A (e.g., some or all of the first room, and optionally small portions of one or more other adjacent or nearby rooms, such as through doorway wall openings, non-doorway wall openings, hallways, stairways or other connecting passages from the first room). The view capture may be performed in various manners as discussed herein, and may include a number of structural elements or other objects that may be visible in images captured from the acquisition location—in the example of FIG. 1A, such objects within the building 198 include the walls, floors, ceilings, doorways 190 (including 190-1 through 190-6, such as with swinging and/or sliding doors), windows 196 (including 196-1 through 196-8), borders between walls and other walls/ceilings/floors such as for inter-wall corners or edges 195 (including corner 195-1 in the northwest corner of the building 198, corner 195-2 in the northeast corner of the first room, corner 195-3 in the southwest corner of the first room, corner 195-4 in the southeast corner of the first room, corner 195-5 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1A), various built-in appliances or other fixtures or other structural elements (not shown in FIG. 1A), etc. The user may also optionally provide a textual or auditory label identifier to be associated with an acquisition location and/or a surrounding room, such as "living room" for one of acquisition locations 210A or 210B or for the room including acquisition locations 210A and/or 210B, and/or a descriptive annotation with one or more phrases or sentences about a room and/or one or more objects in the room, while in other embodiments the ICA and/or MIGM system may automatically generate such identifiers and/or annotations (e.g., by automatically analyzing images and/or video and/or other recorded information for a building to perform a corresponding automated determination, such as by using machine learning; based at least in part on input from ICA and/or MIGM system operator users; etc.) or the identifiers may not be used.

After the first acquisition location 210A has been captured, the mobile device 185 and/or camera device(s) 184 may be moved or move under their own power to a next acquisition location (such as acquisition location 210B), optionally recording images and/or video and/or other data from the hardware components (e.g., from one or more IMUs, from the camera, etc.) during movement between the acquisition locations. At the next acquisition location, the mobile 185 and/or camera device(s) 184 may similarly capture a 360° panorama image and/or other type of image from that acquisition location. This process may repeat for some or all rooms of the building and in some cases external to the building, as illustrated for additional acquisition locations 210C-210P in this example, with the images from acquisition locations 210A to 210-O being captured in a single image acquisition session in this example (e.g., in a substantially continuous manner, such as within a total of 5 minutes or 15 minutes), and with the image from acquisition location 210P optionally being acquired at a different time (e.g., from a street adjacent to the building or front yard of the building). In this example, multiple of the acquisition locations 210K-210P are external to but associated with the building 198 on the surrounding property 241, including acquisition locations 210L and 210M in one or more additional structures on the same property (e.g., an ADU, or accessory dwelling unit; a garage; a shed; etc.), acquisition location 210K on an external deck or patio 186, and acquisition locations 210N-210P at multiple yard 187 locations on the property 241 (e.g., backyard 187*a*, side yard 187*b*, front yard 187*c* including acquisition location 210P, etc.). The acquired images for each acquisition location may be further analyzed, including in some embodiments to render or otherwise place each panorama image in an equirectangular format, whether at the time of image acquisition or later, as well as further analyzed by the MIGM and/or BADPM systems in the manners described herein.

FIG. 1A further illustrates examples of one or more mobile devices 175 that may later be in the house 198 after the acquisition of the building information by the mobile image acquisition device(s) 185, such as for a mobile device 175 that captures target images at the house and that receives corresponding enhanced camera view data from the BADPM system and that presents that received enhanced camera view data on a display of that mobile device. In the examples of FIG. 1A, one or more mobile devices 175 are illustrated at various locations in the house, such as in the living room, the kitchen/dining room, and the master bedroom (e.g., as a user of the mobile device carries it through the house), and the mobile device(s) 175 may be of one or more device types, such as a smartphone device, a smart glasses device, a virtual reality headset device, etc. Additional details are included elsewhere herein regarding presenting enhanced camera view data on such mobile devices, including with respect to the examples of FIGS. 2L-2S.

FIG. 1B illustrates examples of types of building information 110 that may be available in some embodiments, such as existing building information that is subsequently analyzed and used by the MIGM and/or BADPM systems. In the example of FIG. 1B, the building description information 110 includes an overview textual description, and well as various attribute data, such as may be used in part or in whole as listing information for an MLS system. In this example, the attribute data is grouped into sections (e.g., overview attributes, further interior detail attributes, further property detail attributes, etc.), but in other embodiments the attribute data may not be grouped or may be grouped in other manners, or more generally the building description information may not be separated into a list of attributes and a separate textual overview description. In this example, the separate textual overview description emphasizes characteristics that may be of interest to viewers, such as a house style type, information of interest about rooms and other building characteristics (e.g., have been recently updated or have other characteristics of interest), information of interest about the property and surrounding neighborhood or other environment, etc. In addition, in this example, the attribute data includes objective attributes of a variety of types about rooms and the building and limited information about appliances, but may lack details of various types shown in italics in this example (e.g., about subjective attributes, about inter-room connectivity and other adjacency, about other particular structural elements or objects and about attributes of such objects, etc.), such as may instead be determined by the MIGM and/or BADPM systems via analysis of building images and/or other building information (e.g., floor plans).

Various details are provided with respect to FIGS. 1A and 1B, but it will be appreciated that the provided details are non-exclusive examples included for illustrative purposes, and other embodiments may be performed in other manners without some or all such details.

Figure 2B:
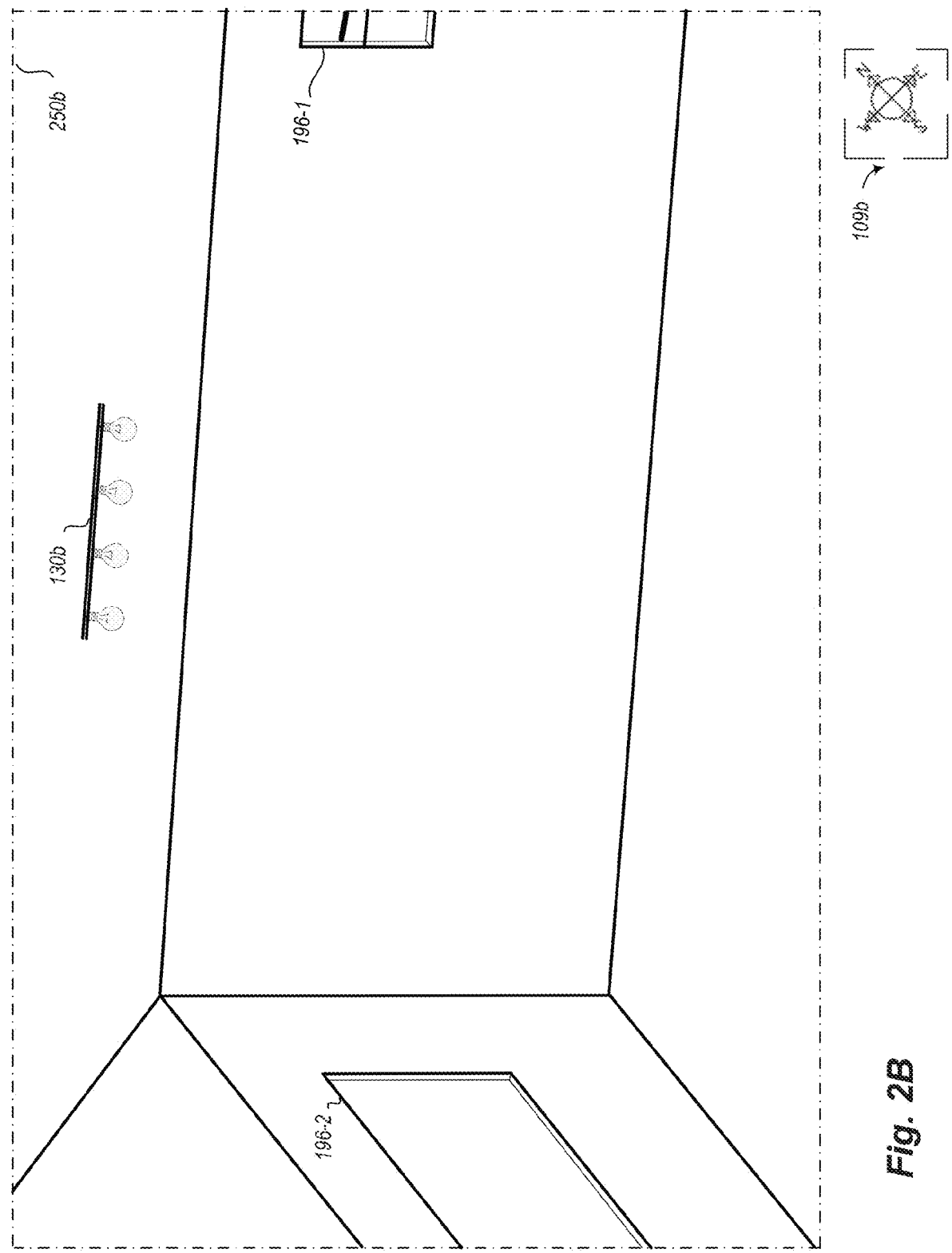
Figure 2C:
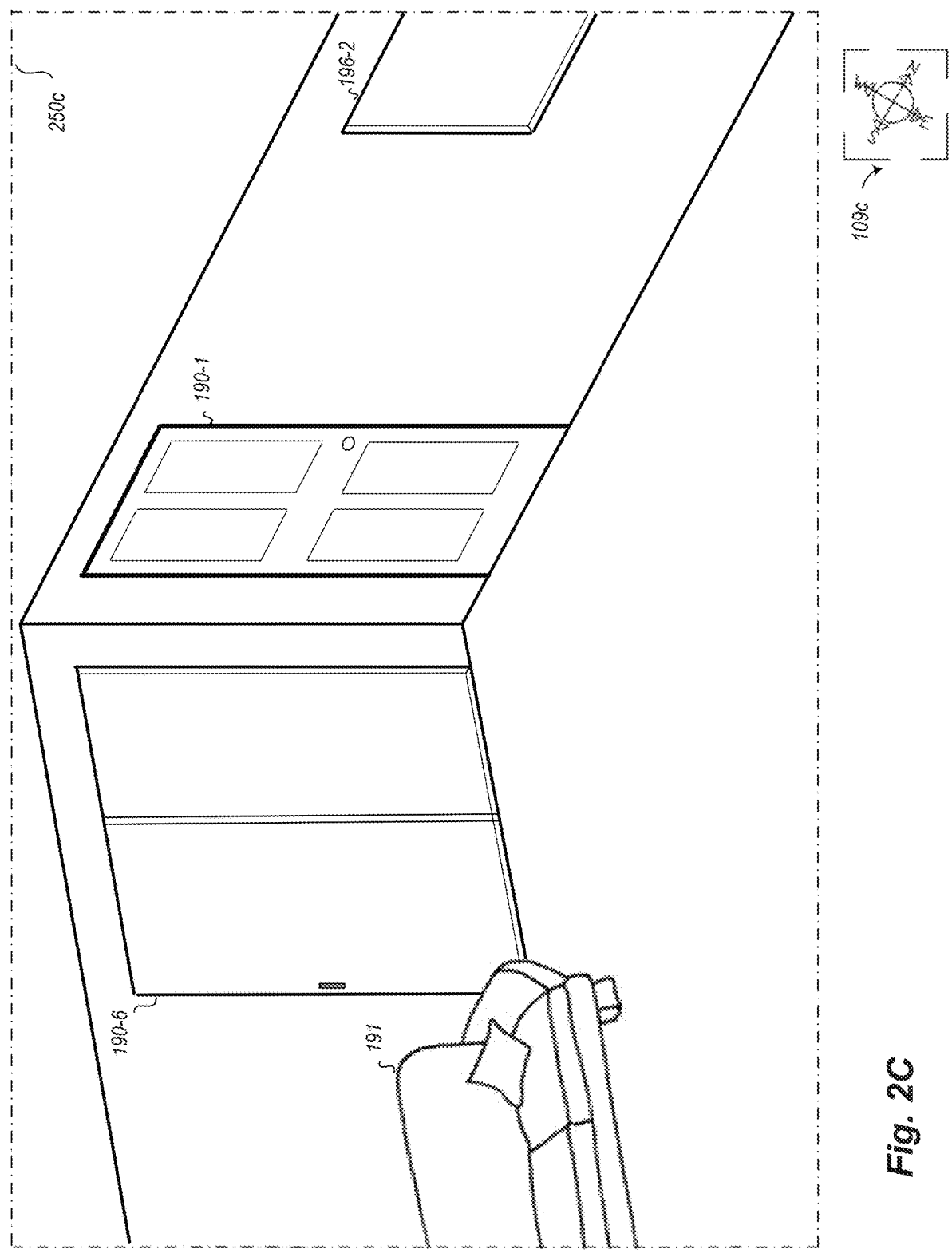
Figure 2H:
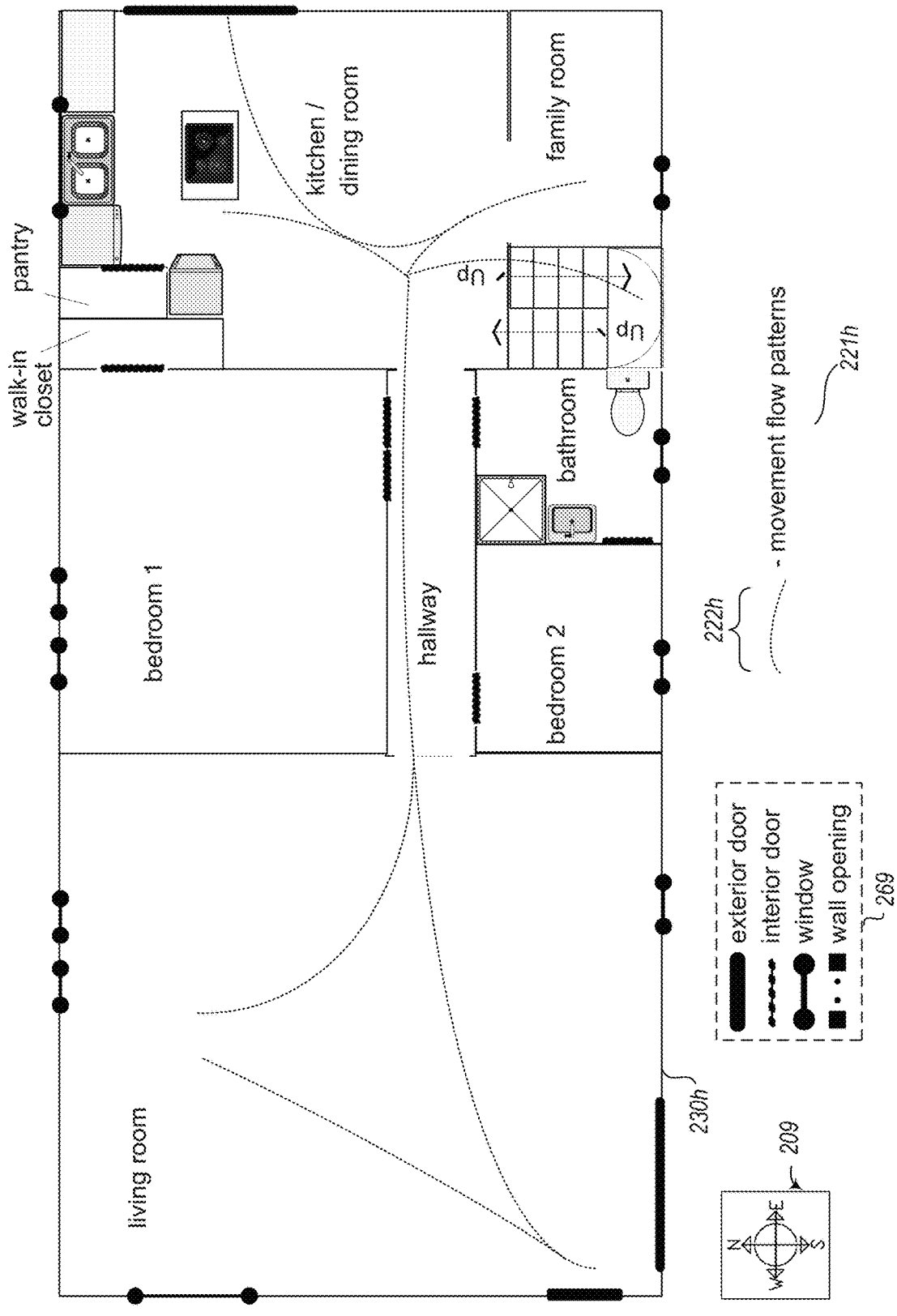
Figure 2I:
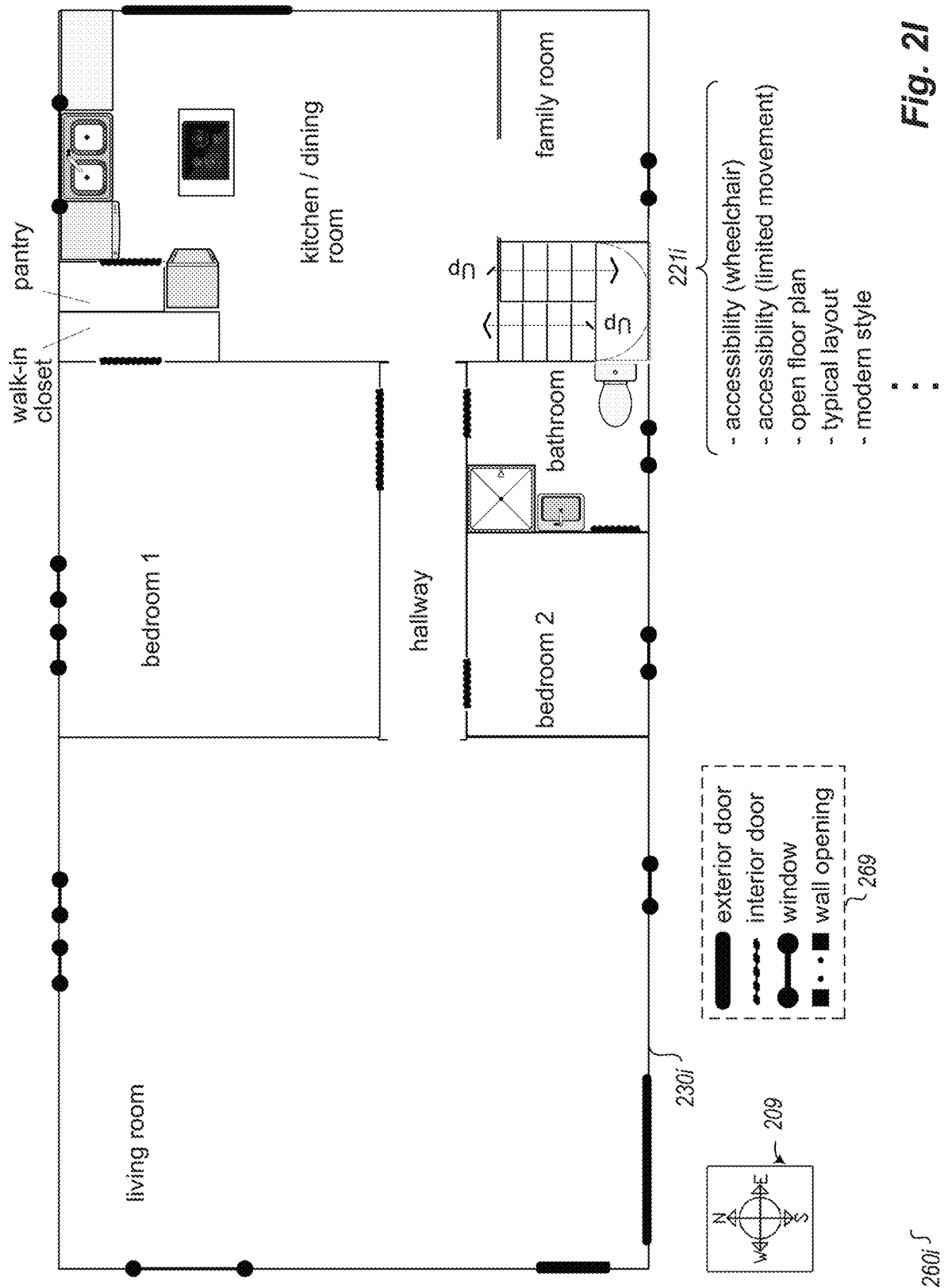
Figure 2J:
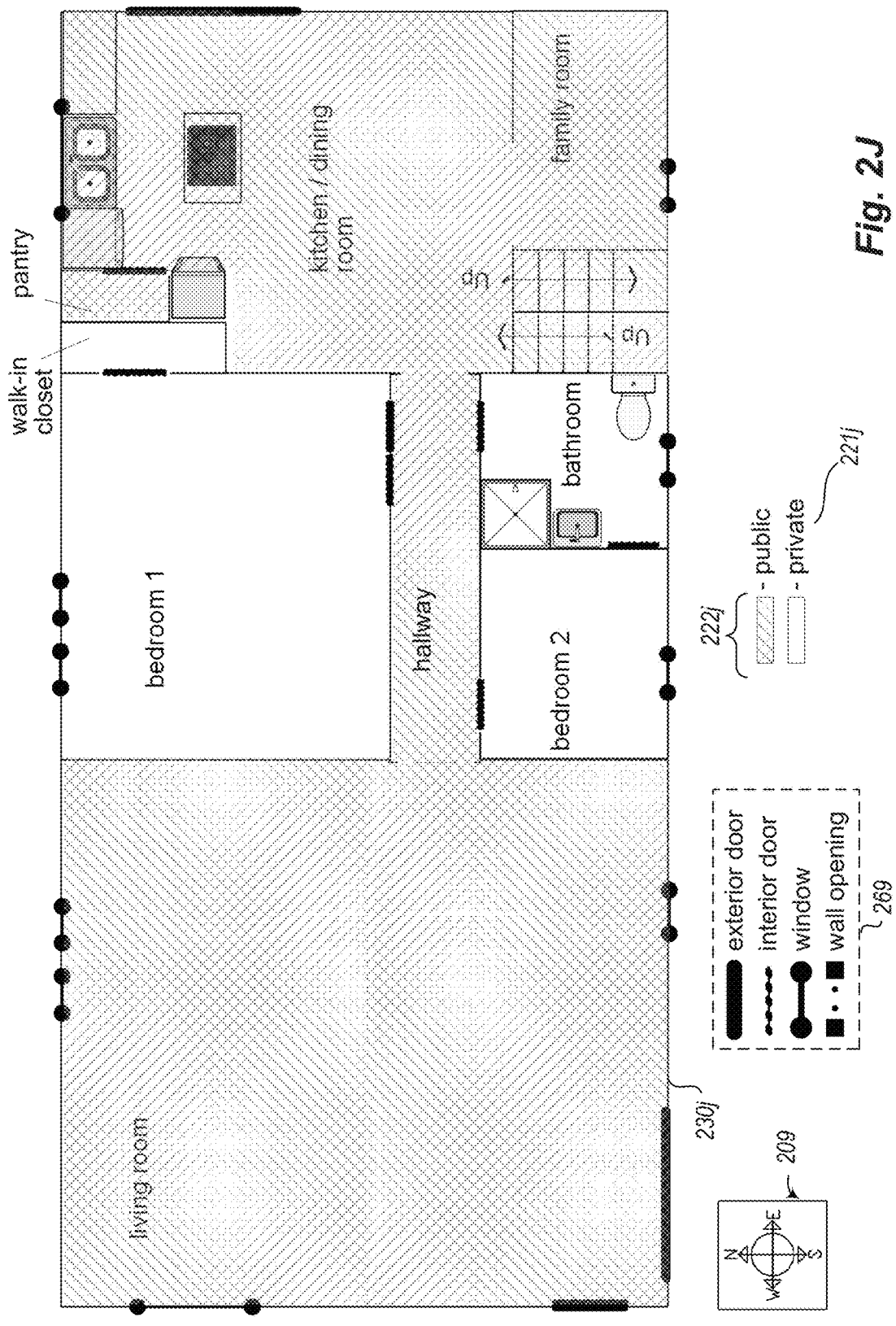
Figure 2K:
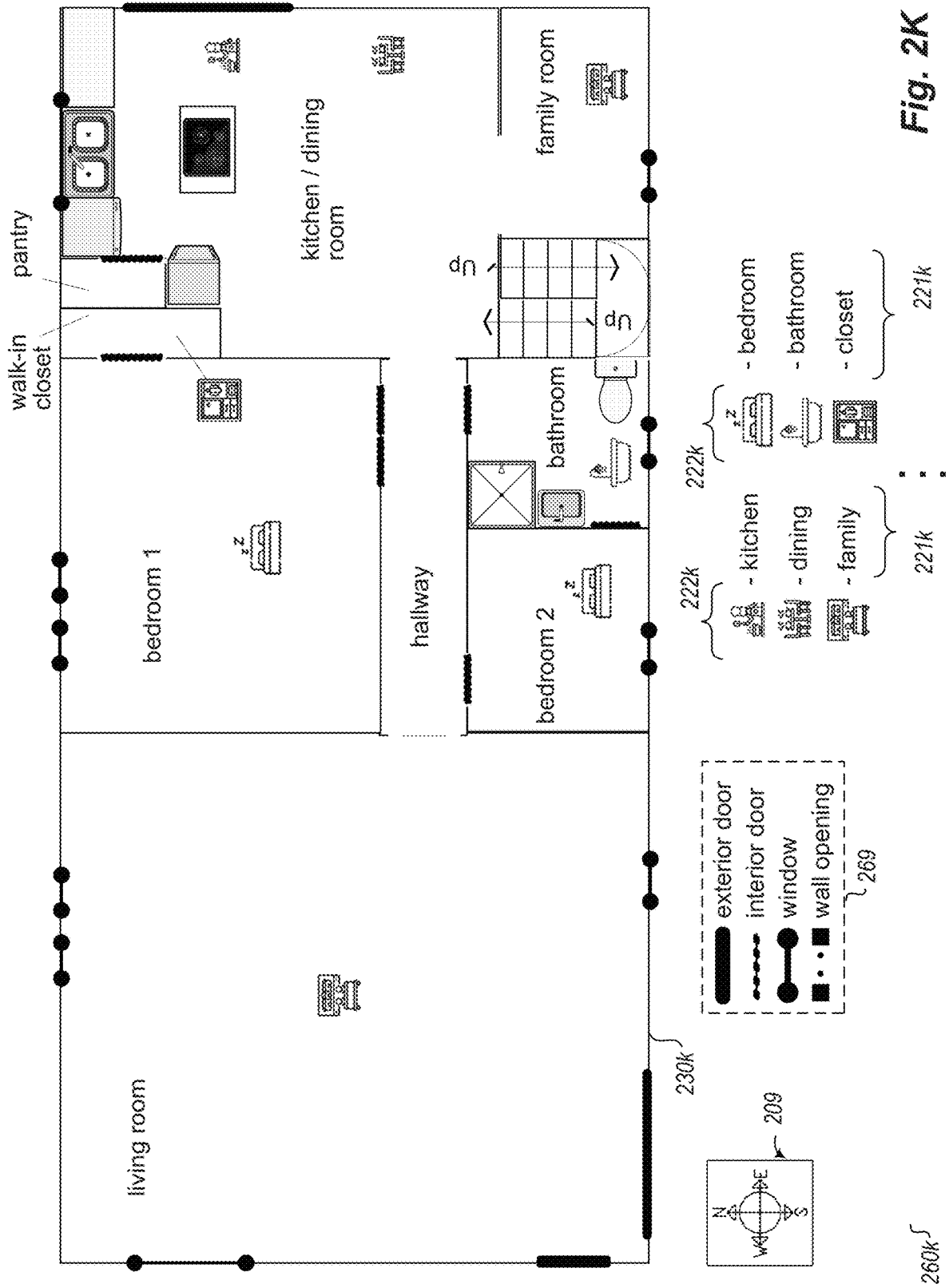
Figure 2L:
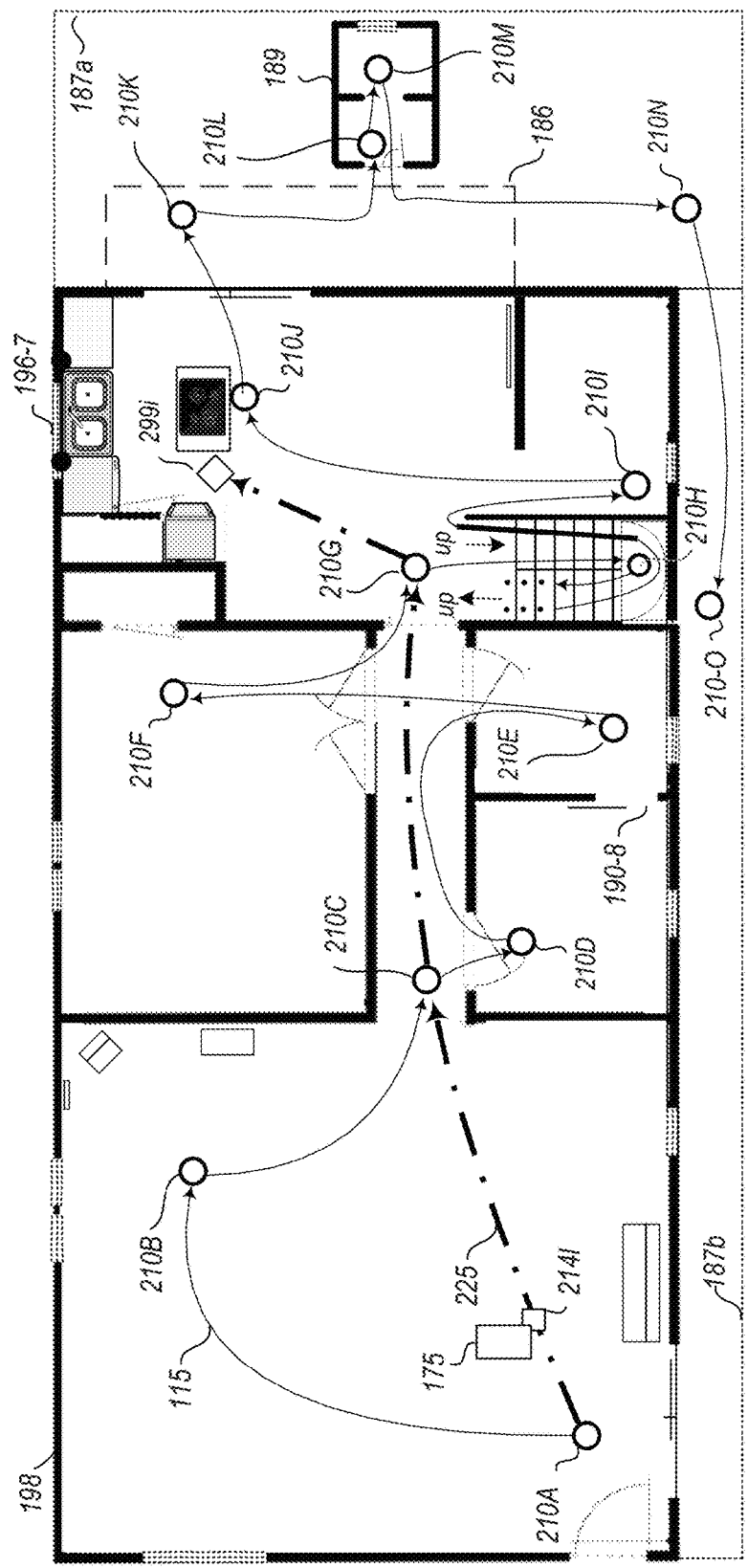
Figure 2M:
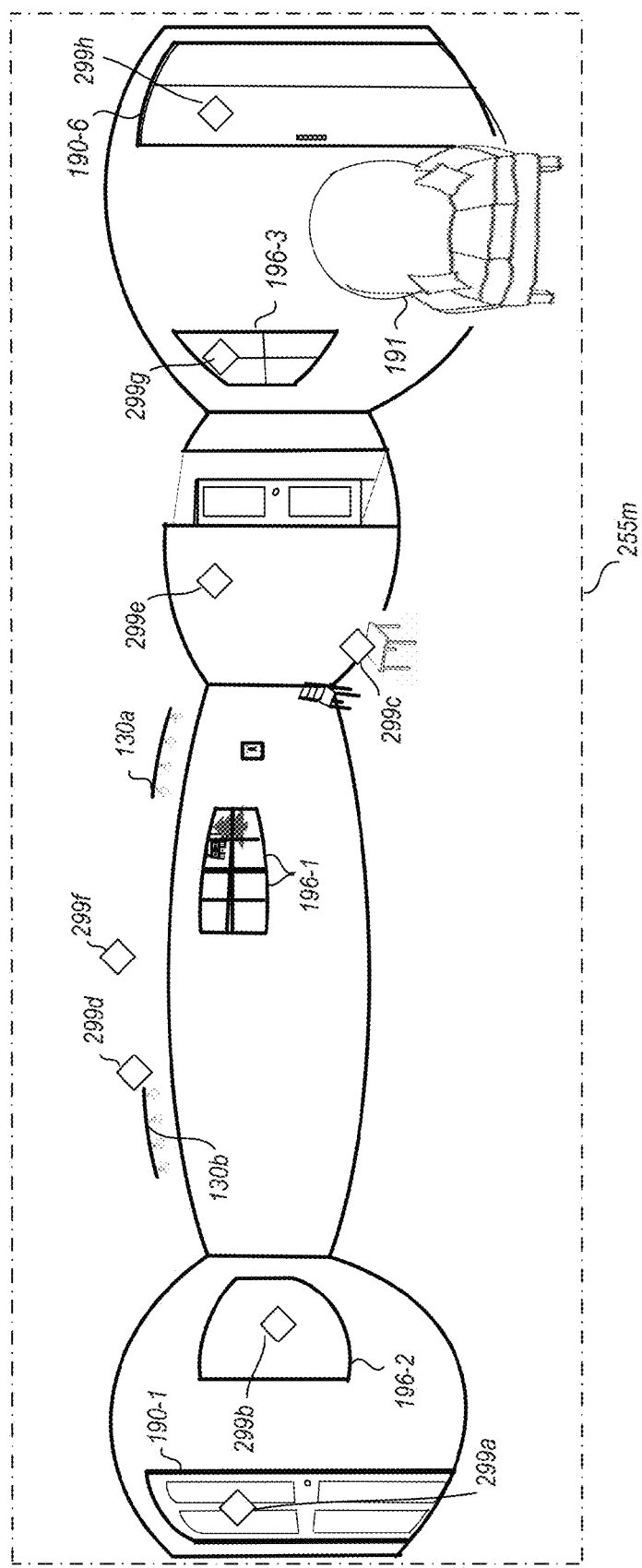
Figure 2P:
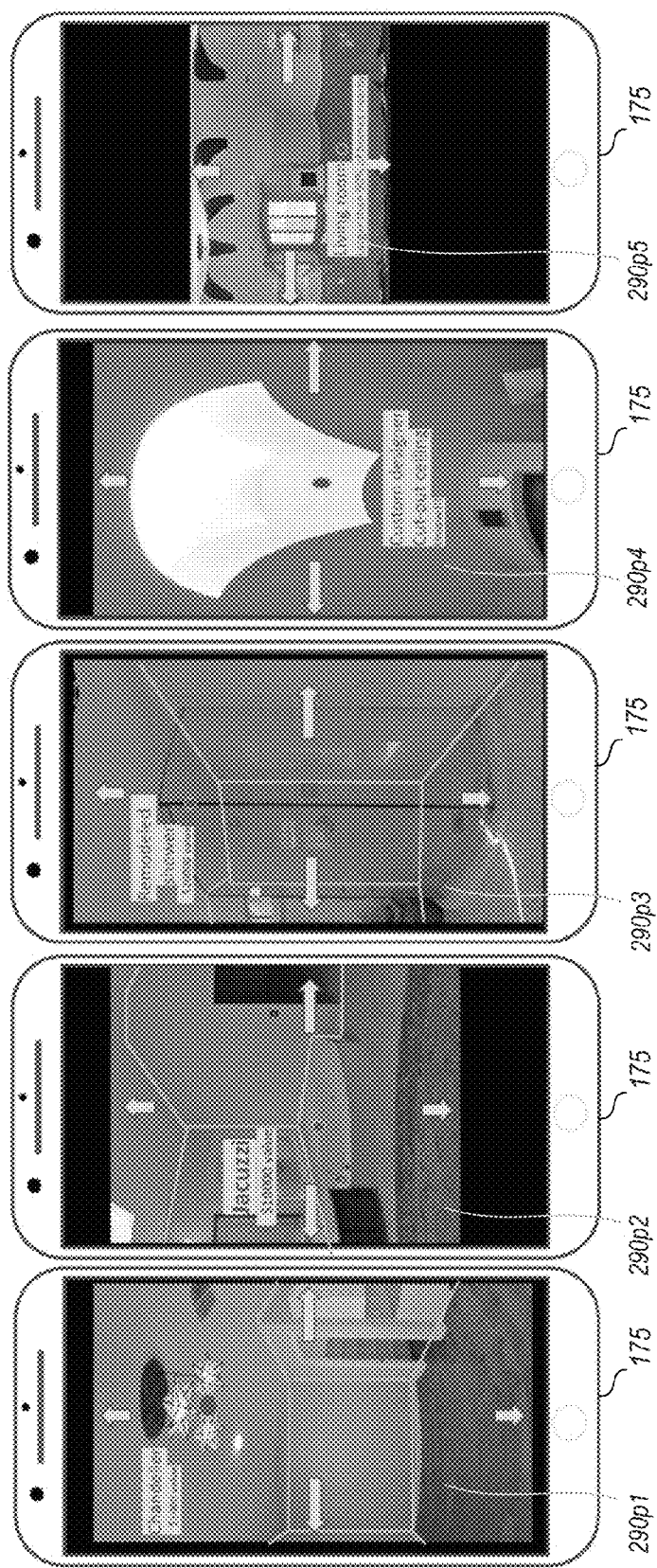
Figure 2Q:
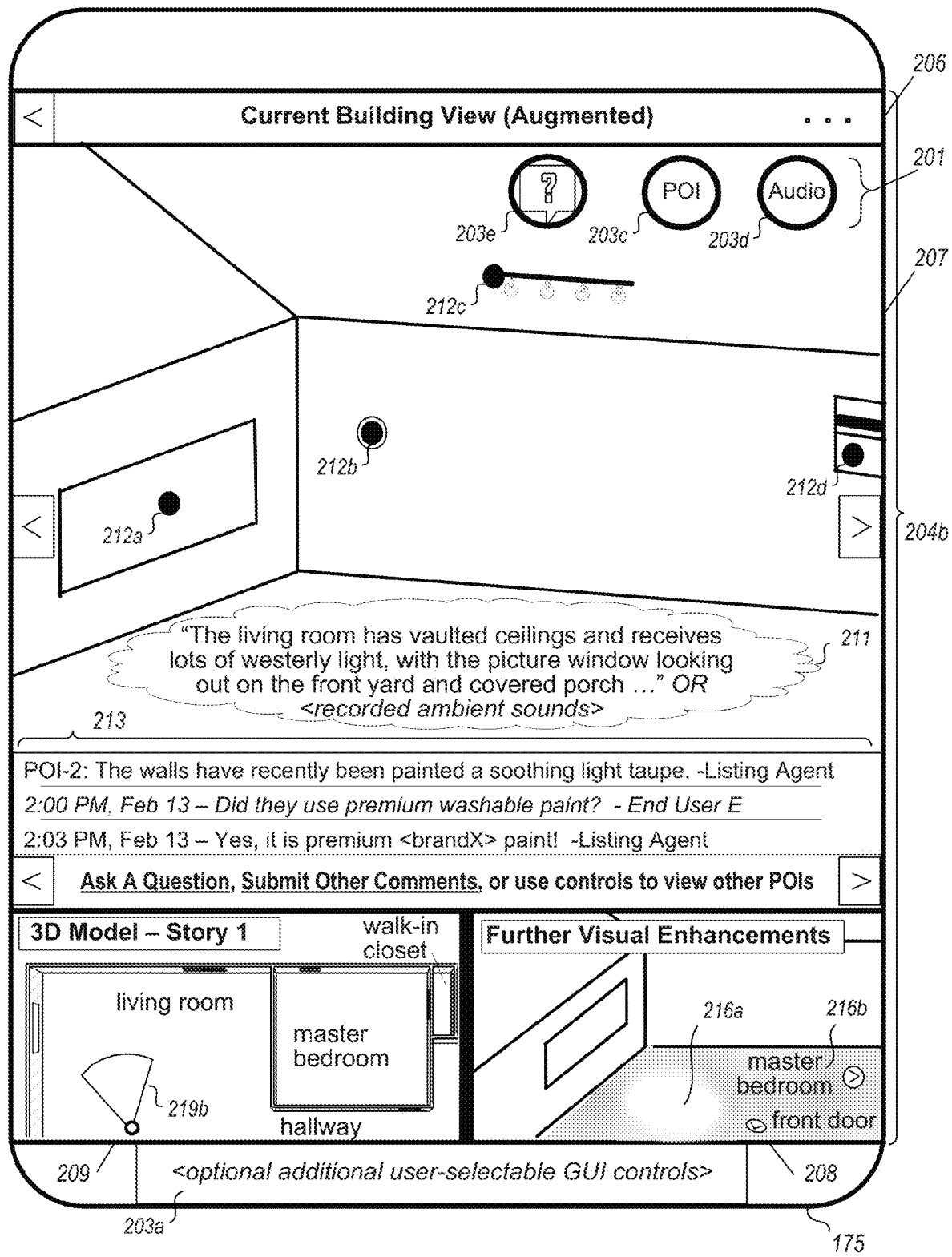
Figure 2R:
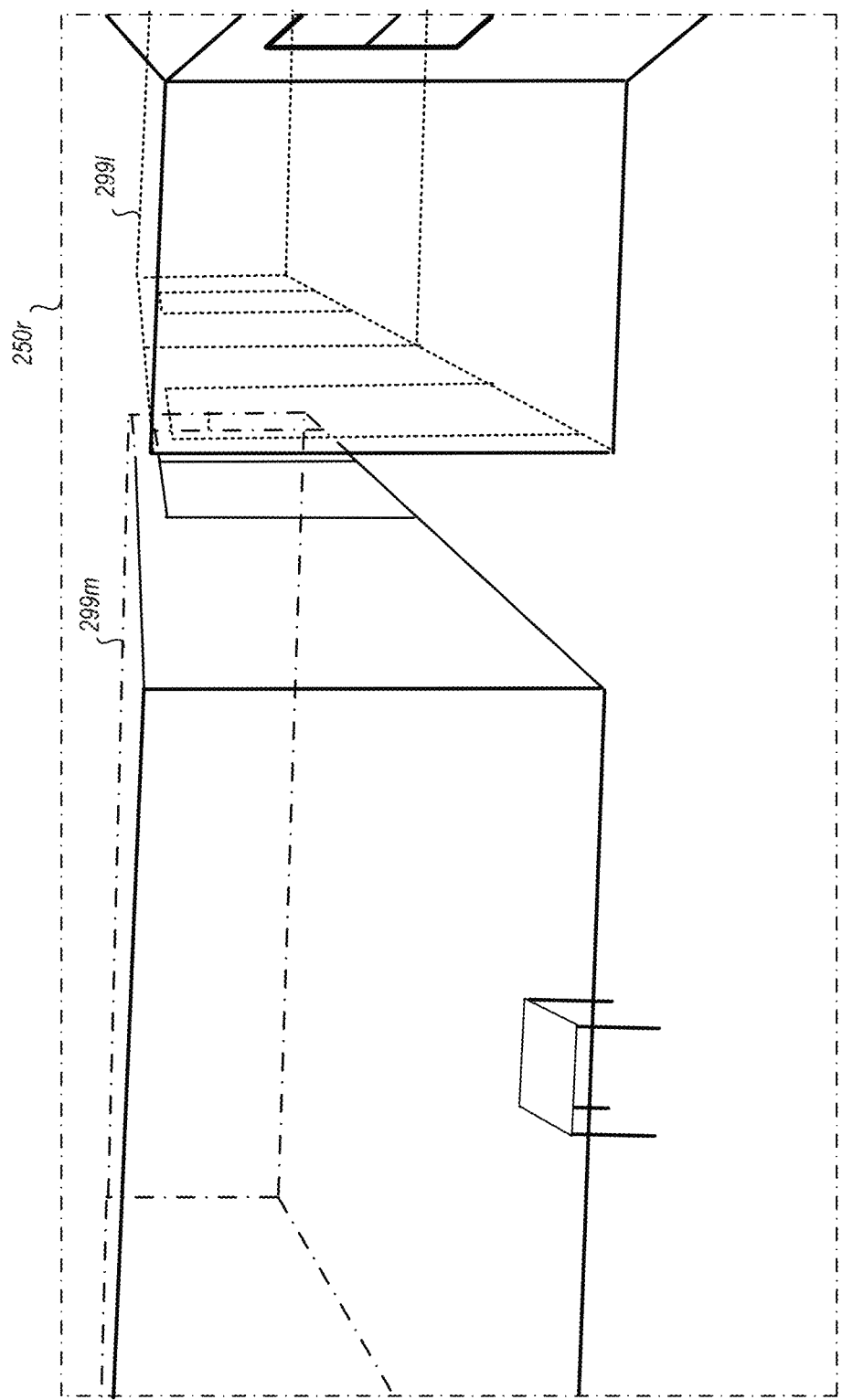
Figure 2S:
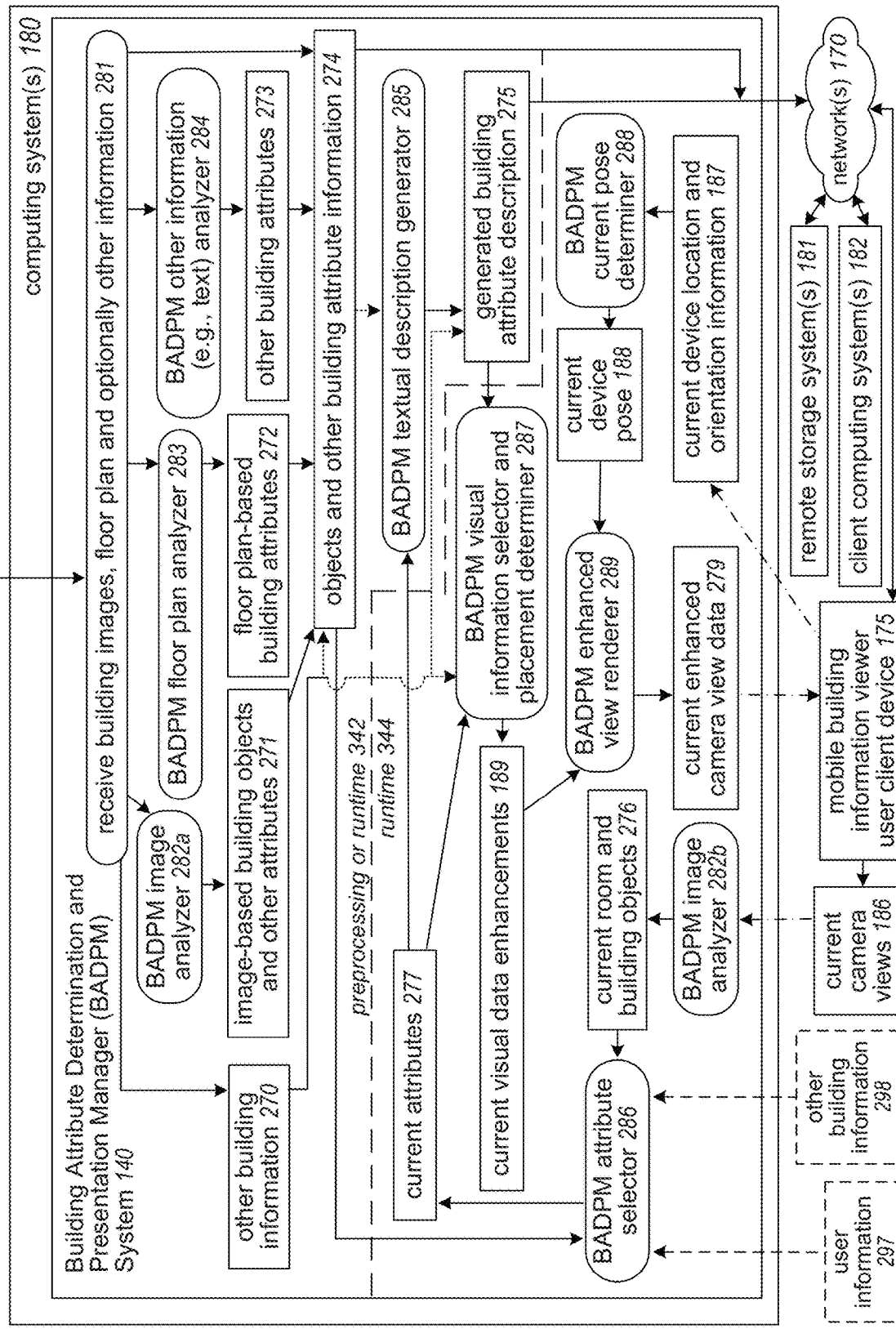

FIGS. 2A-2S illustrate examples of automatically generating descriptive information for a building based at least in part on automated analysis of acquired building images and other building information, and automatically using building descriptive information to generate and present visual data enhancements on camera view images displayed on a mobile device in the building for subsequent use in one or more automated manners, such as for the building 198.

In particular, FIG. 2A illustrates an example image 250*a*, such as a non-panorama perspective image taken in a northeasterly direction from acquisition location 210B in the living room of house 198 of FIG. 1A (or a northeasterly facing subset view of a 360° panorama image taken from that acquisition location and formatted in a rectilinear manner)—the directional indicator 109a is further displayed in this example to illustrate the northeasterly direction in which the image is taken. In the illustrated example, the displayed image includes built-in elements (e.g., light fixture 130a, two windows 196-1, etc.), furniture (e.g., chair 192-1), and a picture 194-1 hanging on the north wall of the living room. No inter-room passages into or out of the living room (e.g., doorways or other wall openings) are visible in this image. However, multiple room borders are visible in the image 250a, including horizontal wall-ceiling and wall-floor borders between a visible portion of the north wall of the living room and the living room's ceiling and floor, horizontal wall-ceiling and wall-floor borders between a visible portion of the east wall of the living room and the living room's ceiling and floor, and the inter-wall vertical border 195-2 between the north and east walls.

FIG. 2B continues the example of FIG. 2A, and illustrates an additional perspective image 250b taken in a northwesterly direction from acquisition location 210B in the living room of house 198 of FIG. 1A (or a northwesterly facing subset view of a 360° panorama image taken from that acquisition location and formatted in a rectilinear manner, such as the same 360° panorama image mentioned with respect to FIG. 2A)—the directional indicator 109b is further displayed to illustrate the northwesterly direction in which the image is taken. In this example image, a small portion of one of the windows 196-1 continues to be visible, along with a portion of window 196-2 and a new lighting fixture 130b. Horizontal and vertical room borders are also visible in image 250b in a manner similar to FIG. 2A.

FIG. 2C continues the examples of FIGS. 2A-2B, and illustrates a third perspective image 250c taken in a southwesterly direction in the living room of house 198 of FIG. 1A, such as from acquisition location 210B (or a southwesterly facing subset view of a 360° panorama image taken from that acquisition location and formatted in a rectilinear manner, such as the same 360° panorama image mentioned with respect to FIGS. 2A and 2B)—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates two inter-room passages for the living room, which in this example include a doorway 190-1 with a swinging door to enter and leave the living room (which FIG. 1A identifies as a door to the exterior of the house, such as the front yard 187c), and a doorway 190-6 with a sliding door to move between the living room and side yard 187b—as is shown in the information in FIG. 1A, an additional non-doorway wall opening 263a exists in the east wall of the living room to move between the living room and hallway, but is not visible in the images 250a-250c. It will be appreciated that a variety of other perspective images may be taken from acquisition location 210B and/or other acquisition locations and displayed in a similar manner.

FIG. 2D continues the examples of FIGS. 2A-2C, and illustrates a 360° panorama image 255d (e.g., taken from acquisition location 210B), which displays the entire living room in an equirectangular format—since the panorama image does not have a direction in the same manner as the perspective images of FIGS. 2A-2C, the directional indicator 109 is not displayed in FIG. 2D, although pose information for the panorama image may include one or more associated directions (e.g., a starting and/or ending direction for the panorama image, such as if acquired via rotation). A portion of the visual data of panorama image 255d corresponds to the first perspective image 250a (shown in approximately the center portion of the image 250d), while the left portion of the image 255d and the far-right portion of the image 255d contain visual data corresponding to those of the perspective images 250b and 250c—thus, for example, starting from image 255d, various perspective images may be rendered that include some or all of images 250a-250c (and optionally a large quantity of other images). This example panorama image 255d includes windows 196-1, 196-2 and 196-3, furniture 191-193, doorways 190-1 and 190-6, and non-doorway wall opening 263a to the hallway room (with the opening showing part of a doorway 190-3 visible in the adjacent hallway). Image 255d further illustrates a variety of room borders in a manner similar to that of the perspective images, but with the horizontal borders being displayed in an increasingly curved manner the farther they are from a horizontal midline of the image—the visible borders include vertical inter-wall borders 195-1 through 195-4, vertical border 195-5 at the north/left side of the hallway opening, vertical borders at the south/right side of the hallway opening, and horizontal borders between the walls and the floor and between the walls and the ceiling.

FIG. 2D further illustrates information that includes one example of part of a 2D floor plan 230d for the house 198 (e.g., corresponding to a first or main story of the house) presented to an end-user in a GUI 260d, such as may be generated by the MIGM system via analysis of images and optionally other data acquired in the house, and with the living room being the most westward room of the house (as reflected by directional indicator 209)—it will be appreciated that a 3D or 2.5D floor plan with rendered wall height information may be similarly generated and displayed in some embodiments, whether in addition to or instead of such a 2D floor plan. Various types of information are illustrated on the 2D floor plan 230d in this example. For example, such types of information may include one or more of the following: room labels added to some or all rooms (e.g., "living room" for the living room); room dimensions added for some or all rooms; visual indications of objects such as installed fixtures or appliances (e.g., kitchen appliances, bathroom items, etc.) or other built-in elements (e.g., a kitchen island) added for some or all rooms, optionally with associated labels and/or descriptive annotations (e.g., dual steel kitchen sink, kitchen island with red Corian surface, LED track lighting, white tile floor, etc.); visual indications added for some or all rooms of positions of additional types of associated and linked information (e.g., of other panorama images and/or perspective images that an end-user may select for further display; of audio or non-audio annotations that an end-user may select for further presentation, such as "the kitchen includes a Brand X refrigerator with features Y, a built-in stove/oven of Brand Z, etc."; of sound recordings that an end-user may select for further presentation, such as to hear the level of street noise from bedroom 1; etc.); visual indications added for some or all rooms of structural elements such as doors and windows; visual indications of visual appearance information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI such as GUI 260*d*, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2D). In addition, in this example a user-selectable control 228 is added to indicate a current story that is displayed for the floor plan, and to allow the end-user to select a different story to be displayed—in some embodiments, a change in stories or other levels may be made directly from the floor plan, whether in addition to or instead of using the control 228, and such as via selection of a corresponding connecting passage in the illustrated floor plan (e.g., the stairs to a second or upper story, to a basement, etc.). It will be appreciated that a variety of other types of information may be added in some embodiments, that some of the illustrated types of information may not be provided in some embodiments, and that visual indications of and user selections of linked and associated information may be displayed and selected in other manners in other embodiments.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or VTFM, system that is generally directed to automated operations for generating a floor map or other floor plan of a building using video data acquired in and around the building); in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); and in U.S. Non-Provisional patent application Ser. No. 17/013,323, filed Sep. 4, 2020 and entitled "Automated Analysis Of Image Contents To Determine The Acquisition Location Of The Image" (which includes disclosure of an example MIGM system that is generally directed to automated operations for generating a floor map or other floor plan of a building using images acquired in and around the building, and an example ILMM system for determining the acquisition location of an image on a floor plan based at least in part on an analysis of the image's contents); each of which is incorporated herein by reference in its entirety.

FIGS. 2E and 2F continue the examples of FIGS. 2A-2D, with FIG. 2E illustrating information 255*e* that includes an image 250*e*1 of the southwest portion of the living room (in a manner similar to a portion of image 250*c* of FIG. 2C), and with additional information overlaid on the image to illustrate information determined about objects and other attributes in that portion of the room from automated analysis of visual data of the image, along with information about locations of those objects. In particular, in this example, the west window (element 196-2 of image 250*c*) has been identified as an object in the room, with the corresponding 'west window' label 246*p*2 having been determined for the object (whether automatically or based at least in part on information provided by one or more associated users), and an automatically determined location 199*b* of the object being shown in the image (which in this example is a bounding box for the object). The information 255*e* further illustrates a list 248*p* of objects and additional attributes of interest that are identified based at least in part on the visual data of image 250*e*1, which indicates that visual characteristics of the west window include its type (e.g., a picture window), type of latch hardware, information about a view through the window, and optionally various other attributes (e.g., size, orientation/direction it faces, etc.). The image 250*e*1 further indicates that the doorway 190-1 has been identified as an object in the room, with a 'front door' label 246*p*1 (whether determined automatically or based at least in part on information provided by one or more associated users) and automatically determined bounding box location 199*a* being shown. In addition, the information 248*p* indicates that further attributes include determined visual characteristics of the door such as a type of the door and information about door's doorknob and door hinges, which are further visually indicated 131*p* on the image 250*p*. FIG. 2F illustrates additional visual data that may be extracted from images 250*e*1 and/or 250*e*2 of FIG. 2E as part of determining objects and other attributes for the room, and in particular includes close-up example images 250*f*1, 250*f*2 and 250*f*3 corresponding to the front door for doorway 190-1 and its hardware 131*p*, such as for use in determining corresponding attributes for the front door—in some embodiments and situations, if visual data corresponding to image 250*e*1 is displayed on a mobile device in the living room of house 198 (e.g., as part of a target image captured by the mobile device) and the front door and its visual characteristics are determined to be of interest, those objects and other attributes may be selected to be highlighted in displayed visual data enhancements overlaid on that target image, such as one or move visual indicators of positions in the target image of those objects and other attributes and textual descriptions of those objects and other attributes. Other objects may similarly be identified, such as one or more ceiling light fixtures, furniture, walls and other surfaces, etc. (e.g., based at least in part on a list of defined types of objects that are expected or typical for rooms of type 'living room'), and optionally described via associated displayed visual data enhancements overlaid on that target image (e.g., in a manner to highlight or otherwise emphasize them). In addition, a 'living room' label 246p3 for the room is also determined (whether automatically or based at least in part on information provided by one or more associated users) and shown. FIG. 2E further provides an alternative or additional image 250e2, which in this example is a panorama image with 360° of visual coverage of the living room (in a manner similar to image 255d of FIG. 2D)—such a panorama image may be used instead of or in addition to a perspective image such as image 250e1 for determining objects and other attributes and additional related information (e.g., locations, labels, annotations, etc.), as well as for assessing an overall layout of items in the room and/or expected traffic flow for the room, with the example panorama image 250e2 similarly showing the location bounding boxes 199a and 199b for the front door and west window objects, as well as additional location bounding boxes 199c for table 193, 199d for ceiling light 130b, and 199e for the east wall—it will be appreciated that a variety of other types of objects and/or other attributes may be determined in other embodiments, including for other walls and surfaces (e.g., the ceiling and floor) and other structural elements (e.g., windows 196-1 and 193, doorway 190-6, non-doorway wall opening 263a, etc.), other furniture (e.g., couch 191, chair 192, etc.), etc.

FIG. 2G continue the examples of FIGS. 2A-2F, and provide examples of additional data that may be determined about objects and other attributes for other rooms of the building based at least in part on analysis of one or more initial room-level images of those other rooms. In particular, FIG. 2G illustrates information 255g that includes an image 250g1, such as for bathroom 1. In a manner analogous to that of the images of FIG. 2E, image 250g1 includes indications 131v of objects in the bathroom that are identified and for which corresponding attribute data is determined (e.g., corresponding to visual characteristics of the objects), which in this example includes a tile floor, a sink countertop, a sink faucet and/or other sink hardware, a bathtub faucet and/or other bathtub hardware, a toilet, etc.—however, location information, labels and provided instructions are not illustrated in this example. In a similar manner, image 250g2 for the kitchen includes indications 131w of objects in the kitchen that are identified and for which corresponding attribute data is determined (e.g., corresponding to visual characteristics of the objects), which in this example includes a refrigerator, a stove on a kitchen island, a sink faucet and/or other sink hardware, a countertop and/or backsplash beside the sink, etc.—however, location information, labels and provided instructions are not illustrated in this example. It will be appreciated that various other types of objects and other attributes may be determined in these and other rooms, and further used to generate corresponding building description information, and that these types of data illustrated in FIGS. 2E-2G are non-exclusive examples provided for the purpose of illustration.

FIGS. 2H-2K continue the examples of FIGS. 2A-2G, and provide additional information related to analyzing floor plan information to determine additional attributes for the building. In particular, FIG. 2H illustrates information 260h that includes an example 2D floor plan 230h of the building, which includes determined information 222h about expected movement flow pattern attributes through the building, as indicated using corresponding labels 221h, and with such information 222h optionally displayed on the floor plan (e.g., overlaid on the floor plan). In a similar manner, FIG. 2I provides additional information 260i related to analyzing floor plan 230i to determine information about various types of subjective attributes for the building (e.g., wheelchair accessibility, accessibility for people with limited walking mobility, open floor plan, a typical layout, a modern style, etc.), as indicated using corresponding labels 221i, but without corresponding locations or other indications being shown on the floor plan in this example, although such corresponding locations may be determined and indicated in other embodiments and situations. FIG. 2J similarly provides additional information 260j related to analyzing floor plan 230j to determine information about areas of the building that correspond to public and private space attributes 222j, as indicated using corresponding labels 221j, and with such information 222j optionally displayed on the floor plan (e.g., overlaid on the floor plan). In addition, FIG. 2K provides additional information 260k related to analyzing floor plan 230k to determine information about room type and/or functionality attributes 222k of the building (e.g., bedroom, bathroom, kitchen, dining, family room, closet, etc.), as indicated using corresponding labels 221k, and with such information 222k optionally displayed on the floor plan (e.g., overlaid on the floor plan). It will be appreciated that particular attributes about rooms and/or the building as a whole may be determined from analysis of such a floor plan in various manners, and that the types of information illustrated in FIGS. 2H-2K are non-exclusive examples provided for the purpose of illustration, such that similar and/or other types of information may be determined in other manners in other embodiments.

FIG. 2L continues the examples of FIGS. 2A-2K, and illustrates information 260l that corresponds to building 198. In particular, while path 115 illustrates a sequence in which images were previously acquired at locations 210A through 210-O for the building by one or more mobile image acquisition devices 185 (e.g., as discussed with respect to FIGS. 1A and 2A-2D), FIG. 2L illustrates additional information about a path 225 that a mobile device 175 may take through the house while receiving enhanced camera view data from the BADPM system 140 and displaying that enhanced camera view data on the mobile device. In some embodiments and situations, the path 225 may be determined solely by the mobile device 175 and/or its user, while in other embodiments the BADPM system may perform automated operations to determine some or all of the path 225, such as if the BADPM system determines, while the mobile device is at location 214l in the living room, one or more attributes corresponding to the kitchen that may be of interest to the user. If so, the BADPM system may perform further automated operations to determine directions to guide the user to the kitchen (e.g., to location 299i), with corresponding visual data enhancements being displayed over current target camera view images from the mobile device as it moves along that portion of the path 225, and optionally with additional visual data enhancements being displayed over one or more current target camera view images after the mobile device arrives at the kitchen, such as to highlight the one or more determined attributes while the mobile device is at location 299i (e.g., with respect to a new refrigerator, designer floor tiles, unusually large pantry, water spots that might indicate a leak problem, etc.). Examples of particular types of enhanced camera views are discussed further with respect to FIGS. 2M-2Q, including with respect to providing directions or other guidance and with respect to highlighting particular attributes. In addition, the determination by the BADPM system that the kitchen and/or one or more attributes associated with the kitchen may be of interest may be made in various manners in various embodiments, such as based at least in part on information specific to house 198 (e.g., the house having new appliances or previously determined problems), and/or on information specific to the user (e.g., the user having previously expressed interest in kitchen appliances and/or kitchens, whether explicitly or implicitly), and/or on other types of information (e.g., due to kitchens being determined to generally be of high interest, based on information supplied by an owner of the house or other associated representative, to correspond to configuration settings or other instructions for a building information viewer system executing on the mobile device, etc.).

FIGS. 2M and 2N continue the examples of FIGS. 2A-2L, and illustrate information about selecting particular building attributes to highlight in the living room of house 198, such as when a target image captured in the living room includes visual data of a corresponding object. In particular, FIG. 2M illustrates image 255m in a manner similar to that of image 255d, but with various objects selected to be highlighted for subsequent corresponding target images. In this example, selected objects include the vaulted ceiling as indicated 299f, track lighting fixture 130b as indicated 299d, front door 190-1 as indicated 299a, west picture window 196-2 as indicated 299b, south window 196-3 as indicated 299g, sliding door 190-6 as indicated 299h, east wall as indicated 299e, table 193 as indicated 299c, etc. Corresponding visual data enhancements that are generated and presented may further include textual information describing the selected objects, as discussed further with respect to FIG. 2N, such as to describe attributes corresponding to objects such as the front door 190-1 (e.g., door type, door hardware, a description of where the door leads, etc.), west picture window 196-2 (e.g., window type, hardware, view, direction, etc.), south window 196-3 (e.g., to present simulated or actual lighting from the track lighting fixture, such as for different times and/or conditions, and optionally as controlled by the user via one or more presented user-selectable controls), sliding door 190-6, east wall (e.g., color, type of surface material, etc.), table 193 (e.g., material, size, etc.), track lighting fixture 299d (e.g., to present simulated or actual lighting from the track lighting fixture, such as for different times and/or conditions, and optionally as controlled by the user via one or more presented user-selectable controls), etc. FIG. 2N further illustrates corresponding visual data subsets 250n0-250n5 that, if included in the visual data of a target image, may cause corresponding visual data enhancements to be generated, which in this example includes possible generated textual descriptions 251n0-251n5 for corresponding visible objects and their attributes.

In at least some embodiments, descriptions of objects and other attributes are generated using one or more trained language models. For example, the BADPM system may in at least some embodiments and situations use one or more trained language models to conduct visual storytelling, image captioning, and text-image retrieval, with the text generated from the images or sequence of images being combined and/or summarized in at least some embodiments and situations (e.g., to manipulate the style, grammar, and/or modality, such as to deliver a rich and impactful recipient experience; to produce multiple generated texts; etc.), whether using multiple discrete models or be a single end-to-end model. In at least some embodiments and situations, the one or more trained language models may include one or more trained Vision and Language (VLM) models, such as large models that are trained to generate a description/caption for an input image using a large corpus of training tuples (e.g., Image, Caption tuples)—some benefits of VLM models include that there is no need to explicitly prompt the model regarding the entities you would like it to describe, which often results in descriptions that are more abstract and compelling. In at least some embodiments and situations, the one or more trained language models may further include at least one of pretrained language models, knowledge-enhanced language models, parsing and/or labeling and/or classification models (e.g., dependency parsers, constituency parsers, sentiments classifiers, semantic role labelers, etc.), algorithms used to control linguistic quality (e.g., tokenizers, lemmatizers, regular expression matching, etc.), multimodal vision and language models capable of auto-regressive or masked decoding, etc.—such labeling and/or classification models may include, for example, semantic role labelers, sentiment classifiers, and semantic classifiers to identify semantic concepts related to the entire sequence of words and tokens or any of its components (e.g., identification of semantic roles of entities in the sequence such as patient or agent as well as classifying the overall sentiment or semantics of a sequence such as how positive or negative it is about the subject, how fluent the sequence is, or how well it encourages the reader to take some action). The one or more trained language models may, for example, perform an iterative generation (decoding) of words, subwords, and tokens conditioned on prompts, prefixes, control codes, and representations of contextual information such as features derived from visual/sensor information, knowledge bases and/or graphs—parsing models may further perform operations including analyzing the internal structure of a sequence of words and tokens to identify its components in accordance with one or more grammars (e.g., dependency, context free grammar, head-driven phrase structure grammar, etc.), such as to identify modifications that can be made to a sequence of words, subwords and/or tokens to further develop a desired linguistic quality. The one or more trained language models may, for example, be organized into a directed acyclic graph providing a structure in which inputs, outputs, data sources, and models interact, with the structure being aligned with the data sources, such as with respect to one or more of the following: spatial, where the context of text generation is related to a specific point in a building such as the location or room that a panorama was taken in so that the generated text will be aligned with this location; temporal, where the context of text generation is a temporal sequence of images (e.g., frames in a video sequence or slideshow) so that the generated text will be aligned with this sequence; etc. Inputs to the one or more trained language models may include, for example, one or more of the following: structured and/or unstructured data sources (e.g., publicly or privately available, such as property records, tax records, MLS records, Wikipedia articles, homeowners association and/or covenant documents, news articles, nearby or visible landmarks, etc.) that provide information regarding the building and/or associated physical space under analysis and its surroundings and/or that provide general and commonsense information about buildings and a real estate market (e.g., housing and associated elements, overall housing market information, information related to fair housing practices, bias associated with terms and phrases that may aid in language generation, etc.); information about objects and/or other attributes (e.g., fixture types and locations, surface material, surface color, surface texture, room size, degree of natural light present in a room, walking score, expected commute times, etc.); captured and/or synthesized visual and/or sensor information along with any derivatives, such as structured and unstructured sequences (including singletons) of images, panoramas, videos, depth maps, point clouds, and segmentation maps; etc. The one or more trained language models may further be designed and/or configured to, for example, implement one or more of the following: modality, to reflect the way in which language can express relationships to reality and truth (e.g., something that is prohibited, such as "you shouldn't go to school"; advice provided through subject auxiliary inversion, such as "shouldn't you go to school?"; etc.); fluency, to reflect a measure of the natural quality of language with respect to a set of grammar rules (e.g., "big smelly brown dog" instead of "smelly brown big dog"); style, to reflect patterns of word and grammatical construction selection (e.g., short descriptions that uses interesting and engaging language; informal style, such as used for texting; formal style, such as used for an English paper or conference submission; voice, to reflect the way in which subjects and objects are organized relative to a verb (e.g., active and passive voice); etc.

As one non-exclusive example of generating text $251n0$-$251n4$ of FIG. 2N, the BADPM system may use a pipeline of language models and algorithms, including one or more language models from a class called "knowledge enhanced natural language generation models" (KENLG)—KENLG models are provided with a source of knowledge, and a prompt regarding the entities within the source of knowledge to which the model should attend, with the KENLG model ingesting these inputs and generating a description of those entities accordingly. There are several sources of knowledge to which KENLG models can attend including knowledge bases (KB), knowledge graphs (KG), and unstructured text like a Wikipedia page, with a knowledge base being a collection of subject-predicate-object tuples that express a predicate relationship between entities (e.g., Living Room, HasA, Fireplace; Fireplace, MadeOf, Stucco; Kitchen Counter, HasProperty, Spacious; etc.), a knowledge graph being the translation of a knowledge base into a graph structure where the nodes of the graph represent entities and the edges of the graph represent predicate relationships, and with a prompt being a sequence of entities for which a description is to be generated. For example, using the example tuples above, if the model was given the prompt (Living Room), an expected output of the model would be "the living room has a lovely stucco fireplace"—in this way, information about a house or other building that is generated by any number of one or more upstream feature extraction models and data collection processes can be aggregated into a knowledge base and then into a knowledge graph over which a KENLG model can attend. Benefits of representing a building in terms of a knowledge graph in this manner include that it represents the building in a natural way, as the composition of interrelated spaces, points of view, and objects with attributes that (when combined with a KENLG model) can be used to generate a large variety of descriptions depending on the prompt provided. In the text $251n0$-$251n4$ is generated as part of a larger multi-sentence description, its generation may include (in part) determining a sequence of prompts to provide to the model for generation of its constituent clauses according to these entities, and then using the KENLG model to generate the text for those prompts. For example, a sequence of prompts can be identified as the entities that are visible within a sequence of points of view (e.g., corresponding to points of interest (POIs) $299a$-$h$ of FIG. 2M), and/or information about rooms and building layout as discussed further with respect to text $265o$ of FIG. 2-0. Following the generation of a sequence of clauses corresponding to a sequence of prompts (e.g., as derived from points of interest $299a$-$h$), one or more types of algorithms may be applied to perform linguistic modifications for the purpose of composing a compelling narrative, such as to include the construction of prepositional phrases to smoothly connect constituent clauses (e.g., "As you enter the living room . . . "), to make changes to each clause's style and modality (e.g., to express ability, such as "you will notice . . . "; to express obligation, such as "you have to see . . . "; etc.).

With respect to selecting objects and attributes to highlight and describe in visual data enhancements being generated, such as to overlay on target images with visual data showing those objects or other attributes, the objects and attributes may be selected in various manners in various embodiments. As one non-exclusive example, a group of objects and other attributes may be predefined, such as based on input from users (e.g., people interested in buying or otherwise acquiring a building or access to some or all of a building, such as renting or leasing; based on tracked activities of users in requesting or viewing information about buildings, such as in viewing images and/or other information about buildings; based on tracked activities of users in purchasing or changing objects in a building, such as during remodels; etc.)—information about such a group of objects and other attributes may be stored in various manners (e.g., in a database), and may be used for training one or more models (e.g., one or more machine learning models used to select objects and other attributes, one or more language models used to generate textual descriptions, etc.). In other embodiments and situations, a group of objects and other attributes may be determined in other manners, whether instead of or in addition to such predefinition, such as to be learned (e.g., based at least in part on analyzing professional photos or other images of buildings to identify objects that are the focus of or otherwise included in those images). In at least some embodiments and situations, the BADPM system may create a graph (e.g., a GCN, or Graph Convolutional Network, that is used to learn a DAG having edges with directions and order) that includes information about one or more of the following: which objects and/or other attributes to describe, and optionally for how long; a sequence of the objects and/or other attributes to describe within an image; etc.

FIG. 2O (referred to herein as "2-O" for clarity purposes) further illustrates information about an example of visual data enhancements corresponding to guiding a user to a target destination (e.g., along path 225 of FIG. 2L from the living room to location $299i$ in the kitchen). In the example of FIG. 2-O, the visual data enhancements may begin while target image $250o1$ is presented and continue through a sequence of additional target images (e.g., with an intermediate target image $250o2$ illustrated that corresponds to one such additional target image that will subsequently be displayed as the mobile device approaches the hallway)—in this example, the directions or other guidance include an arrow $299j$, a visual indicator $299k$ of an intermediate target destination that is currently visible in target image $250o1$ (e.g., since the final target destination location $299i$ is not yet visible), and a generated textual description $265o$, with the positioning on the target images of the arrow and intermediate target destination and optionally the positioning and/or content of some or all of the textual description being updated as the target images in the sequence are presented. It will be appreciated that directions or other guidance may be displayed in various manners in various embodiments, including using additional examples shown in FIG. 2Q.

FIG. 2P continues the examples of FIGS. 2A through 2-O, and illustrates information $290p$ that corresponds to example enhanced camera view data being shown on a display of a smartphone mobile device 175, such as in a GUI. The example enhanced camera view 290p1 illustrates a particular object being highlighted (e.g., in this example a chandelier), along with visual indicators to highlight borders of the current room, and a generated textual description that includes a label for the object and in this example an estimated utility value of the object. The example enhanced camera view 290p2 illustrates an additional object being highlighted (e.g., in this example, a Jacuzzi) along with similar visual indicators to highlight borders of the current room, and a similar generated textual description of the object. Example enhanced camera view 290p3 illustrates an additional object being highlighted (e.g., in this example, a shower) along with similar visual indicators to highlight borders of the current room, and a similar generated textual description of the object that further includes details about an object attribute related to the object having been recently remodeled. Example enhanced camera view 290p4 illustrates an additional object being highlighted (e.g., in this example, a cutout ceiling structural element) along with a similar generated textual description that further includes details about an attribute of the object being that it is a differentiating feature (e.g., being unusual or unique). Example enhanced camera view 290p5 illustrates an additional non-object attribute being highlighted (e.g., in this example, information about an entire room) along with a similar generated textual description that further includes information comparing the attribute for the current building to that of other nearby buildings. It will be appreciated that the information in the examples of FIG. 2P is provided for illustrative purposes, and that the invention is not limited to such details.

FIG. 2Q continues the examples of FIGS. 2A through 2P, and illustrates a further example embodiment of a GUI with multiple types of information 204b, which is displayed in this example on a smartphone mobile device 175 of an end-user. The GUI in this example includes a primary pane 207 and two secondary panes 208 and 209, with each of the panes showing information of a different type about the same area of the example house 198, although other GUIs may include more or less panes (e.g., in the example GUIs of FIG. 2P) and/or display different types of information. The primary pane 207 in this example is showing a target image captured by the mobile device in the living room, with the direction of the image being in the northwest direction, and also includes a header 206 that provides a description of the type of content shown (here, the target image with the mobile device's current camera view of the building as augmented with overlaid visual data enhancements), although in other embodiments such a header may not be used (e.g., in the example GUIs of FIG. 2P). The primary pane 207 may also have one or more user-selectable GUI controls that enable the end-user (not shown) to modify information being displayed in the GUI, such as user-selectable controls 201c-201e overlaid on the primary pane (including a toggle control 203c to show or hide information about object/attribute points of interest that are present in the current image, a toggle control 203d to show or hide a description of the area of the house shown by the image, a toggle control 203e to show or hide information about questions and answers corresponding to the area of the house shown in the image and to optionally allow the end-user to supply one or more additional questions or answers, etc.) and optionally additional user-selectable GUI controls 201a may be shown separate from the primary pane 207—in at least some embodiments and situations, some or all of the displayed user-selectable controls may be contextual based on the content currently shown in the primary pane (in this example, associated with image content, and optionally with the current room being displayed).

In this example, various information has been overlaid on the primary pane 207 using visual data enhancements, such as based on selection by the end-user of the user-selectable controls 203c, 203d and 203e in this example, although it will be appreciated that the end-user may instead select zero, one, or two of those three controls in other situations. In this example, selection of the user-selectable control 203c has caused several additional user-selectable visual indicator GUI controls 212 associated with points of interest in the room to be illustrated, with visual indicator 212b being currently selected and having a corresponding textual comment shown in the area 213 of the primary pane (to comment about paint on the walls of the room). Other visual POI indicators in this example include 212a on the west-facing picture window, 212d on the north-facing window, and 212c on the overhead track lighting fixture on the ceiling. While the selected visual indicator 212b has associated text that is displayed in this example, other visual indicators for POIs may have other types of information associated, such as if the window visual indicators 212a and/or 212d have images and/or video associated with them, such as to show images or videos looking out the window (e.g., a time-lapse video over a 24-hour period of the exterior of the house from a window or door, such as to show road traffic or people traffic outside over that time period). In addition to the activation of the control 203c, the user-selectable control 203d has also been activated to provide an audio description of the area shown in the image, with the visual indicator 211 shown in this example representing audio information that may be audibly presented in response to the selection of that control (e.g., recorded ambient sounds; an audio recitation of corresponding description information, such as instead of having a textual representation of the information as shown in this example, or instead in addition to the textual information, such as if a closed captioning option is further selected). Furthermore, the user-selectable control 203b corresponding to questions and answers is also selected, causing additional information in the area 213 to be shown, such as a question from another end-user and a corresponding answer, as well as further user-selectable controls to allow the end-user to ask a question to be answered, submit a comment for display to others, or to cycle through other existing questions and comments. It will be appreciated that illustrated types of information may be presented in other manners in other embodiments, or may not be shown.

In addition to the image shown in the primary pane, the secondary panes 208 and 209 show other types of content about the same location or area of the example house. In particular, the secondary pane 209 in this example shows a portion of a 3D computer model of the house, and in particular shows a portion of the computer model that includes the northwest corner of the living room, as well as optionally including some or all of other parts of the same floor—the computer model is overlaid in this example with the visual indicator 219b to illustrate where the image shown in the primary pane was captured, and the orientation of the camera that captured the image, and other types of information may be similarly overlaid (e.g., directions or other guidance to a destination location, such as with a path 225 and/or destination target location 299i of FIG. 2L being overlaid on the visual representation of the model, etc.). In addition, the secondary pane 208 in this example shows an example of simulated daylight lighting 216a added to the image, and further shows visual indicators 216 to direct the user to other areas/POIs that are not currently visible (e.g., a different adjacent room, an object in another part of the current room that is not currently visible, etc.). While simulated lighting is illustrated in this example in secondary pane 208, a variety of types of information may be overlaid on the primary and/or secondary panes, such as when selected by corresponding user-selectable GUI controls (e.g., additional user-selectable GUI controls 201a), with non-exclusive examples of such overlaid information and additional functionality including the following: to show measurements or other scale information; to show simulated sunlight for specified conditions (e.g., one or more times of day and/or times of year); to show actual interior lighting (e.g., captured in previous corresponding images), optionally under specified conditions; to show information about a surrounding environment of the building; to allow virtual objects and/or surfaces and/or structural changes to be shown (e.g., to change color, texture etc. of walls, floors, object surfaces, etc.); to present sound recordings from one or more locations of the building (e.g., of ambient sound at specified times); etc. It will be appreciated that the information discussed with respect to the examples of FIG. 2Q are provided for illustrative purposes, and that the invention is not limited to such details.

FIG. 2R continues the examples of FIGS. 2A through 2Q, and illustrates information 290r that includes a target image 250r captured in the living room (e.g., from location 214l) and looking approximately eastward. In the example of FIG. 2R, visual data enhancements have been added to the target image to show structural portions of the building behind the currently visible walls, such as in this example to use wireframe shapes 299m and 299l to show the room borders of the rooms of the house to the east of the living, including the large bedroom on the north side of the hallway and the smaller bedroom and bathroom on the south side of the hallway, respectively. It will be appreciated that a variety of other types of information may be displayed about portions of the building that are not visible in the current target image and may be displayed in various manners, including to provide guidance to a target destination location in another room by showing that target destination location behind one or more walls of the current room and optionally with a path displayed through both the visible a nonvisible portions of the building to reach that target destination location. In addition, in at least some embodiments and situations, visual data enhancements may be rendered in manners to illustrate differences between that data and other visual data of a target image on which the visual data enhancements are overlaid, such as for structural portions of the building that are not currently visible and/or for other types of overlaid data—such differences in the rendering of the visual data enhancements may include, for example, rendering anything located behind walls (or otherwise at locations that are not visible) in a distinguishing color and/or pattern (e.g., in gray, using dashed lines, etc.), modulating the intensity of rendered objects and/or text of the visual data enhancements being overlaid (e.g., as a function of distance from the target image's acquisition location, such as to render the visual data enhancements more faintly as the distance increases), etc. It will also be appreciated that the information discussed with respect to the example of FIG. 2R is provided for illustrative purposes, and that the invention is not limited to such details.

FIG. 2S continues the examples of FIGS. 2A through 2R, and illustrates information 290s showing example data flow interactions for at least some automated operations of the BADPM system. In particular, an embodiment of the BADPM system 140 is illustrated executing on one or more computing systems 180, and in this example embodiment receives information 295 about a building to be analyzed that includes images, a floor plan, and optionally other building description information (e.g., a text listing description; object and/or room labels and/or annotations; etc.; as well as optionally configuration settings or instructions to control the analysis activities). The input information is received in step 281, with received image information being forwarded to a BADPM image analyzer component 282a for analysis (e.g., to identify objects and optionally other attributes, such as local attributes specific to a particular image and/or room), with received floor plan information being forwarded to a BADPM floor plan analyzer component 283 for analysis (e.g., to determine other building attributes, such as global attributes corresponding to some or all of the building as a whole), with other received building information being forwarded to a BADPM other information analyzer component 284 for analysis (e.g., to determine other building attributes, such as from a textual description of the building), with the output of the components 282a, 283 and 284 forming some or all of the determined objects and other building attributes 274 for the building, optionally along some or all optional other building information 270 (e.g., information about additional attributes, such as associated descriptions and building location information; building structural information, such as room shapes and layout; etc.)—in other embodiments, information about some or all such objects and/or other attributes may instead be received (e.g., as part of information 295) and included directly in building attribute information 274 (e.g., via other building information 270), and as discussed in greater detail elsewhere herein, operation of such components 282a, 283 and 284 may include or use one or more trained machine learning models. In addition, the building attribute information 274 may be further forwarded to a BADPM textual description generator component 285 for use in generating corresponding building attribute textual descriptions 275—in other embodiments, information about some or all such textual descriptions may instead be received (e.g., as part of information 295) and included directly in building attribute description information 275 (e.g., via other building information 270), and as discussed in greater detail elsewhere herein, operation of component 285 may include or use one or more trained language models. In at least some embodiments and situations, the operations of components 281, 282a, 283, 284 and optionally 285 are performed before later use of the generated information in providing visual data enhancements for display on mobile devices, such as to correspond to operations of a BADPM Attribute Information Determiner component 342 (not shown in FIG. 2S) of the BADPM system 140.

In the illustrated embodiment, the BADPM system 140 further includes components 286-289 that are used together with component 282b as part of generating and providing visual data enhancements for display on mobile devices, such as by a BADPM Attribute Information Presenter component 344 (not shown in FIG. 2S) of the BADPM system 140—in other embodiments, the component 342 and 344 may be separate from each other and not part of the same overall system 140, and/or the functionality of the BADPM system 140 may be structured and provided in other manners. In the illustrated embodiment, a mobile device 175 is currently located in a building (not shown), and provides current camera view target image data 186 to a copy 282b of the BADPM image analyzer component of the BADPM system 140 (whether the same or different from copy 282a, such as to use different copies if the BADPM Attribute Information Determiner component 342 and BADPM Attribute Information Presenter component 344 are executed at different times and/or on different devices and/or systems), while also providing data 187 about the mobile device's current location and orientation to a BADPM current pose determiner component 288 of the BADPM system 140. The component 288 uses the current location and orientation information 187 to determine the current pose 188 of the mobile device, including the current location and orientation, as well as to optionally further determine additional information (e.g., a current room or other area of the building in which the mobile device is located) in at least some embodiments. The component 282b analyzes the visual data of the one or more target images 186 to determine information 276 that is visible in the target image, such as one or more building objects and a portion of one or more rooms or other areas. The current building data 276 is then provided to a BADPM attribute selector component 286, which uses that data as well as the building attribute information 274 and optionally additional information (e.g., user-specific information 297, other building information 298, etc.) to select zero or more building objects or other attributes 277 to currently highlight in visual data enhancements to be generated and overlaid on the target image(s), such as in a manner described in greater detail elsewhere herein. In the illustrated embodiment, a BADPM visual information selector and placement determiner component 287 then takes the current attributes 277 and corresponding building attribute description information 275 for those attributes and optionally additional building information 270, and uses the data to generate current visual data enhancements 189 for use in presenting on the target image(s), such as to include at least visual indicators of positions of the current attributes 277 and corresponding textual descriptions for those attributes—in the illustrated embodiment, the current attributes 277 may be dynamically forwarded at a time of their determination to the BADPM textual description generator component 285 to cause corresponding attribute description information 275 to be generated at that time before it is forwarded to the component 287, while in other embodiments and situations, predetermined building attribute description information 275 for those attributes is instead used. The current visual data enhancements 189 and current device pose information 188 are then forwarded to a BADPM enhanced view renderer component 289, which renders current enhanced camera view data 279 to be provided to the mobile device 175 for presentation. As previously noted, some or all of the BADPM system 140 (e.g., the runtime 344 components 286-289 and 282b) may execute on the mobile device 175 (e.g., with the computing systems 180 executing those components being the same as the mobile device 175 in that situation), such as to cause the current enhanced camera view data to be displayed directly on one or more displays of the mobile device, while in other embodiments and situations the mobile device 175 may communicate with one or more remote computing systems 180 over one or more networks 170 to provide the data 186 and 187 and to receive the data 279. As discussed in greater detail elsewhere, the enhanced camera view data 279 may include just a rendered visualization of the visual data enhancements that the mobile device receives and overlays on one or more current view images on the mobile device, or instead may include a combination of a target image with the overlaid rendered visualizations that the mobile device receives (e.g., as a composite image) and presents, and the visual data enhancements overlaid on the current camera view on the mobile device may in at least some embodiments and situations further include various user-selectable GUI controls that are displayed and used on the mobile device (e.g., using a building information viewer system on the mobile device, not shown), as discussed in greater detail elsewhere herein.

Various details have been provided with respect to FIGS. 2A-2S, but it will be appreciated that the provided details are non-exclusive examples included for illustrative purposes, and other embodiments may be performed in other manners without some or all such details.

Figure 3:
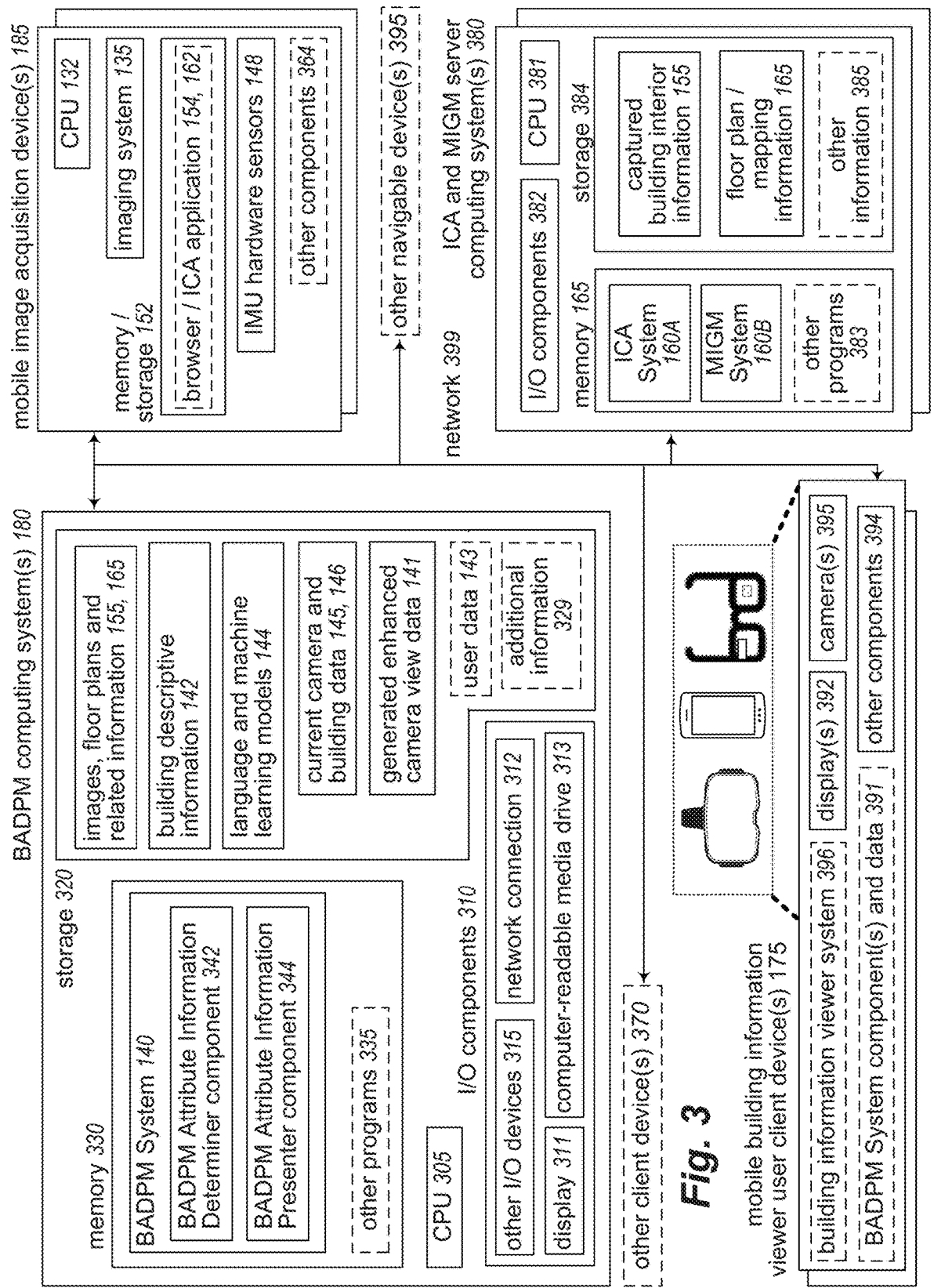
FIG. 3 is a block diagram illustrating computing systems and devices suitable for executing an embodiment of a system that performs at least some of the techniques described in the present disclosure.

FIG. 3 is a block diagram illustrating an embodiment of one or more computing systems 180 executing an implementation of a BADPM system 140 (e.g., in a manner analogous to that of FIG. 1A), and one or more server computing systems 380 executing an implementation of an ICA system 160A and an MIGM system 160B—the computing system(s) 180 and BADPM systems, and/or computing system(s) 380 and/or ICA and MIGM systems, may be implemented using a plurality of hardware components that form electronic circuits suitable for and configured to, when in combined operation, perform at least some of the techniques described herein. One or more computing systems and devices may also optionally be executing a building information viewer system (such as each mobile device 175 optionally executing system 396) and/or optional other programs 335 and 383 (such as server computing system(s) 180 and 380, respectively, in this example). In the illustrated embodiment, each server computing system 180 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 165, storage 384 and I/O components 382 are illustrated in this example for the sake of brevity.

The server computing system(s) 180 and executing BADPM system 140, and server computing system(s) 380 and executing ICA and MIGM systems 160A and 160B, and mobile devices 175 and executing building information viewer system 396 may communicate with each other and with other computing systems and devices in this illustrated embodiment, such as via one or more networks 399 (e.g., the Internet, one or more cellular telephone networks, etc.), including to interact with optional other client computing devices 370 (e.g., devices remote from a building in which a mobile device is presenting enhanced camera view data but concurrently receiving and presenting such enhanced camera view data, and/or viewing other building information such as generated building descriptions, floor plans, images and/or other related information, such as by interacting with or also executing a copy of the building information viewer system), and/or mobile image acquisition devices 185 (e.g., used to acquire images and/or other information for buildings or other environments to be modeled, such as in a manner analogous to FIG. 1A), and/or optionally other navigable devices 395 that receive and use floor plans and optionally other generated information for navigation purposes (e.g., for use by semi-autonomous or fully autonomous vehicles or other devices). The mobile devices 175 in this example embodiment are illustrated as being of one or more types, such as smartphone devices, smart glasses devices, virtual reality headset devices, etc., and to include one or more cameras 395 to capture target images in surrounding buildings (not shown), one or more displays 392 on which to present generated and provided enhanced camera view data from the BADPM system, and other components 394 (e.g., computing resources, I/O components, etc.). In other embodiments, some of the described functionality may be combined in less computing systems, such as to combine a building information viewer system 396 and some or all of the BADPM system 140 in a single system or device (e.g., a mobile device 175), to combine the BADPM system 140 and the image acquisition functionality of device(s) 185 in a single system or device, to combine the ICA and MIGM systems 160A and 160B and the image acquisition functionality of device(s) 185 in a single system or device, to combine the BADPM system 140 and one or both of the ICA and MIGM systems 160A and 160B in a single system or device, to combine the BADPM system 140 and the ICA and MIGM systems 160A and 160B and the image acquisition functionality of device(s) 185 in a single system or device, etc.

In the illustrated embodiment, an embodiment of the BADPM system 140 executes in memory 330 of the server computing system(s) 180 in order to perform at least some of the described techniques, such as by using the processor(s) 305 to execute software instructions of the system 140 in a manner that configures the processor(s) 305 and computing system 180 to perform automated operations that implement those described techniques. The illustrated embodiment of the BADPM system may include one or more components, such as a BADPM Attribute Information Determiner component 342 and a BADPM Attribute Information Presenter component 344, to each perform portions of the functionality of the BADPM system, such as in a manner discussed elsewhere herein, and the memory may further optionally execute one or more other programs 335—as one specific example, a copy of the ICA and/or MIGM systems may execute as one of the other programs 335 in at least some embodiments, such as instead of or in addition to the ICA and/or MIGM systems 160A and 160B on the server computing system(s) 380, and/or a copy of a building information viewer system may execute as one of the other programs 335 (e.g., if the computing systems 180 are the same as a mobile device 175). The BADPM system 140 may further, during its operation, store and/or retrieve various types of data on storage 320 (e.g., in one or more databases or other data structures), such as various types of user data 143, images and floor plans and other associated information 155, 165 (e.g., generated and saved 2.5D and/or 3D models, building and room dimensions for use with associated floor plans, additional images and/or annotation information, etc.), language and/or machine learning models 144, building descriptive information 142 (e.g., determined building attributes, generated attribute descriptions, generated building descriptions, etc.), current camera and building data 145 and 146 (e.g., received from one or more mobile devices 175), generated enhanced camera view data 141 (e.g., to provide to one or more of the mobile devices 175 for presentation from which corresponding camera and building data is received), and/or various types of optional additional information 329 (e.g., various analytical information related to presentation or other use of one or more building interiors or other environments).

In addition, embodiments of the ICA and MIGM systems 160A and 160B execute in memory 165 of the server computing system(s) 380 in the illustrated embodiment in order to perform techniques related to generating panorama images and floor plans for buildings, such as by using the processor(s) 381 to execute software instructions of the systems 160A and/or 160B in a manner that configures the processor(s) 381 and computing system(s) 380 to perform automated operations that implement those techniques. The illustrated embodiment of the ICA and MIGM systems may include one or more components, not shown, to each perform portions of the functionality of the ICA and MIGM systems, respectively, and the memory may further optionally execute one or more other programs 383. The ICA and/or MIGM systems 160A and 160B may further, during operation, store and/or retrieve various types of data on storage 384 (e.g., in one or more databases or other data structures), such as video and/or image information 155 acquired for one or more buildings (e.g., 360° video or images for analysis to generate floor plans, to provide to users of client computing devices 370 for display, etc.), floor plans and/or other generated mapping information 165, and optionally other information 385 (e.g., additional images and/or annotation information for use with associated floor plans, building and room dimensions for use with associated floor plans, various analytical information related to presentation or other use of one or more building interiors or other environments, etc.)—while not illustrated in FIG. 3, the ICA and/or MIGM systems may further store and use additional types of information, such as about other types of building information to be analyzed and/or provided to the BADPM system, about ICA and/or MIGM system operator users and/or end-users, etc.

Some or all of the mobile devices 175, mobile image acquisition devices 185, optional other client devices 370, optional other navigable devices 395 and other computing systems (not shown) may similarly include some or all of the same types of components illustrated for server computing system 180. As one non-limiting example, the mobile image acquisition devices 185 are each shown to include one or more hardware CPU(s) 132, memory and/or storage 152, one or more imaging systems 135, IMU hardware sensors 148 (e.g., for use in acquisition of video and/or images, associated device movement data, etc.), and other components 364. In the illustrated example, zero or one or both of a browser and one or more client applications 154 and 162 (e.g., an application specific to the BADPM system and/or to ICA system and/or to the MIGM system) are executing in memory 152, such as to participate in communication with the BADPM system 140, ICA system 160A, MIGM system 160B and/or other computing systems. While particular components are not illustrated for the other navigable devices 395 or other computing devices/systems 175, it will be appreciated that they may include similar and/or additional components.

It will also be appreciated that computing systems 180 and 380 and 175 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart-phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BADPM system 140 may in some embodiments be distributed in various components, some of the described functionality of the BADPM system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BADPM system 140 executing on server computing systems 180, by a building information viewer system executing on mobile devices 175 or other computing systems/devices, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
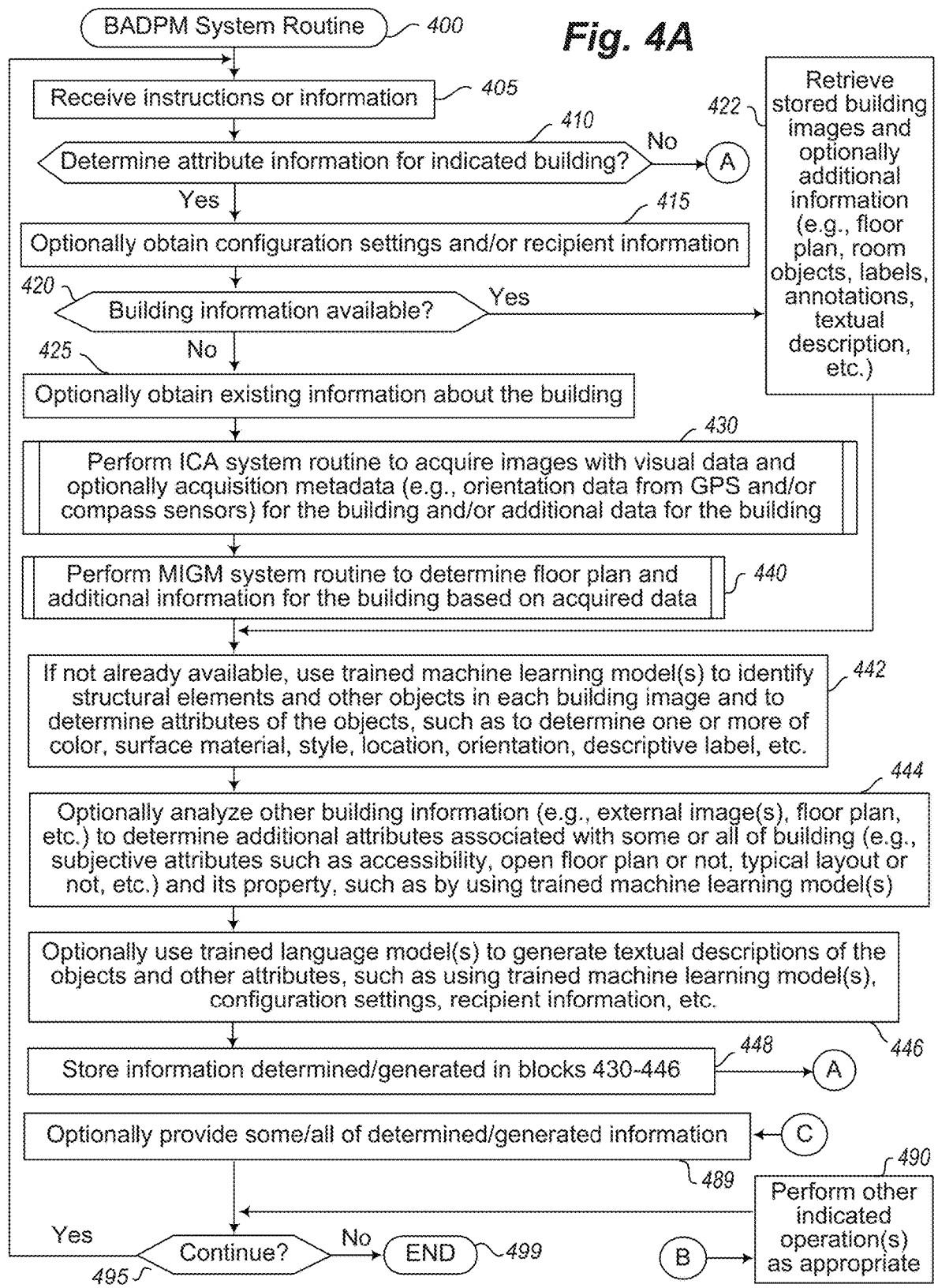

FIGS. 4A-4B illustrate an example embodiment of a flow diagram for a Building Attribute Determination and Presentation Manager (BADPM) System routine 400. The routine may be performed by, for example, execution of the BADPM system 140 of FIGS. 1A, 2S and/or 3, and/or a BADPM system as described with respect to FIGS. 2D-2S and elsewhere herein, such as to perform automated operations related to automatically generating and presenting visual data enhancements on target images that are displayed on a mobile device in the building. In the example embodiment of FIGS. 4A-4B, the indicated buildings may be houses or other buildings, and the generation of visual data enhancements for a building includes generating and using description information for selected building attributes (e.g., based at least in part on analyzing visual data of images acquired for the building) and using them for at least some of the visual data enhancements, but in other embodiments, other types of data structures and analyses may be used for other types of structures or for non-structure locations, and the generated building information may be used in other manners than those discussed with respect to routine 400, as discussed elsewhere herein. In addition, in the example embodiment of FIGS. 4A-4B, the routine 400 may interact with a building information viewer system executing on a mobile device (e.g., as discussed in greater detail with respect to FIG. 7) to cause presentation of the visual data enhancements on that mobile device (e.g., if some or all of the routine 400 executes on one or more computing systems separate from that mobile device), while in other embodiments the routine 400 may directly present some or all such visual data enhancements directly on a mobile device (e.g., if some or all of the routine 400 executes on that mobile device). In addition, in some embodiments, the functionality of the routine 400 may be structured in other manners, such as if operations corresponding to a BADPM Attribute Information Determiner component 342 (e.g., with respect to some or all of blocks 415-448) and operations corresponding to a BADPM Attribute Information Presenter component 344 (e.g., with respect to some or all of blocks 455-468) are executed at different times and/or on different computing systems or devices.

The illustrated embodiment of the routine begins at block 405, where information or instructions are received. The routine continues to block 410 to determine whether the instructions or other information received in block 405 indicate to determine descriptive information about an indicated building (e.g., structural details and other attributes of the building) based at least in part on images of the indicated building, such as in advance of later use of such descriptive information for generating and presenting visual enhancement data for the building, and if so the routine continues to perform at least blocks 415-448 to do so, and otherwise continues to block 450. In block 415, the routine optionally obtains configuration settings and/or information to use in the determination of the descriptive building information (e.g., information received in block 405, stored information, etc.), such as corresponding to a recipient from which the instructions or other information 405 is received (e.g., a building information viewer system executing on a mobile device, such as configuration settings and/or information specific to that mobile device and/or its one or more users). In block 420, the routine then determines whether existing building information (e.g., images, a floor plan with at least room shapes positioned relative to each other, a textual building description, lists or other indications of building objects and/or other building attributes, labels and/or descriptive annotations associated with images and/or rooms and/or objects, etc.) is available for the building, and if so proceeds to block 422 to retrieve such existing building information. If it is instead determined in block 420 that the building information is not available, the routine instead proceeds to perform blocks 425-440 to generate such images and a floor plan and associated information, including to optionally obtain available information about the building in block 425 (e.g., building dimensions and/or other information about the size and/or structure of the building; external images of the building, such as from overhead and/or from a nearby street; etc., such as from public sources), to initiate execution of an ICA system routine in block 430 to acquire images and optionally additional data for the building (with one example of such a routine illustrated in FIG. 5), and to initiate execution of a MIGM system routine in block 440 to use the acquired images from block 430 to generate a floor plan and optionally additional mapping-related building data (with one example of such a routine illustrated in FIGS. 6A-6B). It will be appreciated that operations of the routine may proceed in an asynchronous manner, such as to perform other operations (e.g., interactions with other mobile devices) while waiting for information from blocks 430 and/or 440.

In blocks 442-448, the routine performs several activities as part of using the images and optionally other building information from blocks 430 and 440 or from block 422 to generate descriptive information for the building. In particular, the routine in block 442 analyzes each image using one or more trained machine learning models (e.g., one or more trained classification neural networks) to identify structural elements and other objects, and to determine further attributes associated with such objects (e.g., color, surface material, style, locations, orientations, descriptive labels, etc.), if such information is not already available from blocks 422 and/or 430. In block 444, the routine then optionally analyzes other building information (e.g., a floor plan, textual descriptions, etc.) to determine further attributes for the building using one or more trained machine learning models (e.g., one or more trained classification neural networks), such as based at least in part on room layout information (e.g., inter-connectedness and other adjacency information for groups of two or more rooms), if such information is not already available from blocks 422 and/or 430—the determined attributes may, for example, include attributes that each classify the building floor plan according to one or more subjective factors (e.g., accessibility friendly, an open floor plan, an atypical floor plan, etc.), a type of room for some or all rooms in the building, types of inter-room connections and other adjacencies between some or all rooms (e.g., connected by a door or other opening, adjacent with an intervening wall but not otherwise connected, not adjacent, etc.), one or more objective attributes, etc. In block 446, the routine then generates textual descriptions for some or all of the determined objects and other attributes if such information is not already available from blocks 422 and/or 430, such as in accordance with any configuration settings and/or recipient information from block 415, and optionally using one or more trained language models (e.g., one or more trained transformer-based machine learning models), and further optionally combines the generated descriptions to generate an overall building textual description. After block 446, the routine continues to block 488 to store the generated and determined building information from blocks 420-486, and optionally provides at least some of the generated building information to one or more corresponding recipients (e.g., to a user or other entity recipient from which the information and/or instructions are received in block 405 or that is otherwise designated in such information and/or instructions).

After block 448, or it is instead determined in block 410 that the instructions or other information received in block 405 are not to determine descriptive building information, the routine continues instead to block 450 to determine if the instructions or other information received in block 405 indicate to use descriptive information for a building as part of determining and presenting visual enhancement data with respect to one or more received target images from a mobile device in that building. If not, the routine proceeds to block 490, and otherwise proceeds to block 455, where it obtains descriptive information for that building (e.g., descriptive information previously or concurrently determined in blocks 420-448), such as about objects and other attributes of the building, textual descriptions of the attributes, other data about the building, etc., and optionally information about one or more users of the mobile device (e.g., as received in block 405 and/or previously determined and stored for the user) and/or about one or more other related buildings (e.g., as received in block 405 and/or previously or concurrently determined, such as using one or more building matching criteria). In block 460, the routine then receives current data from the mobile device, such as one or more current camera view target images, data about a current pose of the mobile device, etc. In block 462, the routine then determines a current mobile device pose (e.g., location and orientation/direction), and information about the building related to the current view from the mobile device, such as by analyzing the current target image(s) and/or using the current pose information (e.g., to determine parts of one or more rooms that are visible in the current view(s), to determine one or more objects or other attributes that are visible or otherwise associated with the current view(s), etc.). In block 464, the routine then selects zero or more building attributes and/or other building information to use as part of visual data enhancements to overlay or otherwise combine with the target image(s), and generates corresponding visual enhancement data (e.g., visual indicators of objects or other attributes to present at particular positions on the target image(s); corresponding textual descriptions for such objects or other attributes; user-selectable GUI controls, whether as user-selectable visual indicators and/or textual descriptions, and/or as separate controls; etc.), along with determined image positions at which to present the visual enhancement data (e.g., to correspond to actual locations of objects in the building, and the corresponding parts of the target image(s) for those actual locations). In block 466, the routine then uses the generated visual enhancement data and the determined image position data to render one or more current enhanced camera views for presentation on the mobile device (e.g., to be overlaid on the target image(s) and/or on subsequent camera view images, optionally with updated image positions on such subsequent camera view images corresponding to changes in those camera view images from the target image(s)), and in block 468 provides the rendered current enhanced camera view(s) to the mobile device (e.g., to a building information viewer system executing on the mobile device that supplied the instructions or other information received in block 405). In block 475, the routine then determines if there are additional target images being supplied by that mobile device for the building (e.g., in an immediate or substantially immediate manner, such as one or more target images per second as part of an ongoing interaction session with the mobile device while it is moving through the indicated building), and if so returns to block 460 to receive additional current data from the mobile device, and otherwise proceeds to block 489 to optionally store and/or provide some or all of the information determined and generated in blocks 455-468 to one or more corresponding recipients (e.g., to a user or other entity recipient from which the information and/or instructions are received in block 405 or that is otherwise designated in such information and/or instructions). It will be appreciated that the routine 400 may be simultaneously supporting multiple mobile devices in a concurrent manner (e.g., using asynchronous operations), such as if the routine 400 executes in part or in whole on one or more computing systems separate from those mobile devices, while in other embodiments the routine may support only a single mobile device (e.g., if some or all of the routine 400 executes on that mobile device) and/or may support multiple devices in a serial manner.

If it is instead determined in block 450 that the instructions or other information received in block 405 are not to determine and present visual enhancement data with respect to target image(s), the routine instead proceed to block 490 to perform one or more other indicated operations as appropriate. Such other operations may include, for example, receiving and responding to requests for previously generated visual enhancement data and/or other building information (e.g., requests for such information for display or other presentation on one or more client devices, requests for such information to provide it to one or more other devices for use in automated navigation, etc.), training one or more neural networks or other machine learning models (e.g., classification neural networks) to determine objects and associated attributes from analysis of visual data of images and/or other acquired environmental data, training one or more neural networks (e.g., classification neural networks) or other machine learning models to determine building attributes from analysis of building floor plans (e.g., according to one or more subjective factors, such as accessibility friendly, an open floor plan, an atypical floor plan, a non-standard floor plan, etc.), training one or more machine learning models (e.g., language models) to generate attribute description information for determined objects and optionally other indicated building attributes and/or to generate building description information for a building having multiple such objects and optionally other indicated building attributes, obtaining and storing information about users of the routine (e.g., search and/or selection preferences of a current user), etc.

After blocks 489 or 490, the routine continues to block 495 to determine whether to continue, such as until an explicit indication to terminate is received, or instead only if an explicit indication to continue is received. If it is determined to continue, the routine returns to block 405 to wait for additional instructions or information, and otherwise continues to block 499 and ends.

While not illustrated with respect to the automated operations shown in the example embodiment of FIGS. 4A-4B, in some embodiments human users may further assist in facilitating some of the operations of the BADPM system, such as for operator users and/or end-users of the BADPM system to provide input of one or more types that is further used in subsequent automated operations. As non-exclusive examples, such human users may provide input of one or more types as follows: to provide input to assist with the identification of objects and/or other attributes from analysis images, floor plans and/or other building information, such as to provide input in blocks 442 and/or 444 that is used as part of the automated operations for the block(s); to provide input in block 446 that is used as part of subsequent automated operations, such as to assist in generating textual descriptions of objects and/or other attributes, and/or to assist in generating a textual description for a building based at least in part on generated textual descriptions of objects and/or other attributes; etc. Additional details are included elsewhere herein regarding embodiments in which human user(s) provide input used in additional automated operations of the BADPM system.

Figure 5:
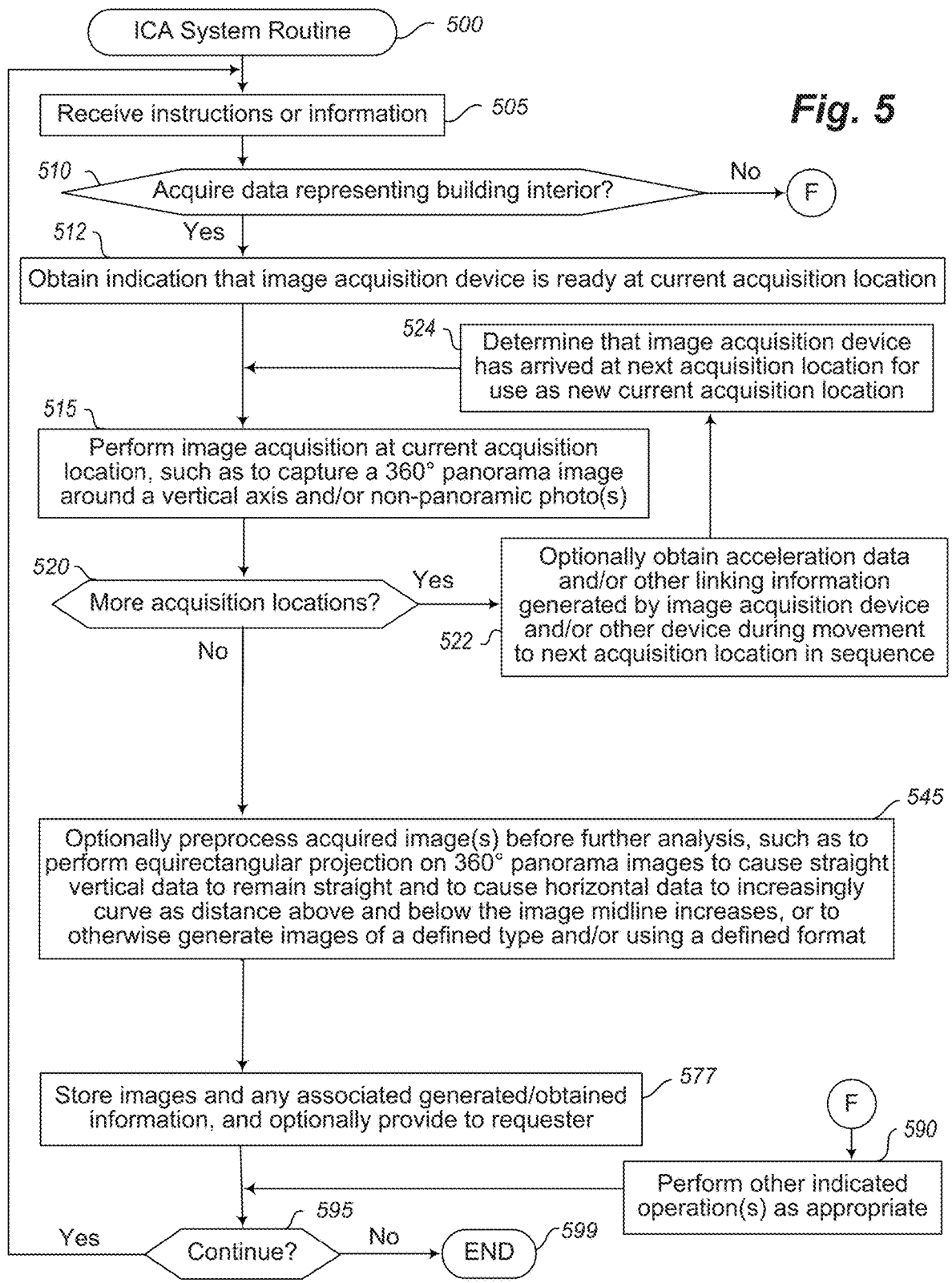
FIG. 5 illustrates an example embodiment of a flow diagram for an Image Capture and Analysis (ICA) system routine in accordance with an embodiment of the present disclosure.

FIG. 5 illustrates an example flow diagram of an embodiment of an ICA (Image Capture & Analysis) system routine 500. The routine may be performed by, for example, the ICA system 160/160A of FIGS. 1A and 3, and/or an ICA system as described with respect to FIGS. 2A-2S and elsewhere herein, such as to acquire 360° panorama images and/or other images at acquisition locations within buildings or other structures, such as for use in subsequent generation of related floor plans and/or other mapping information. While portions of the example routine 500 are discussed with respect to acquiring particular types of images at particular acquisition locations, it will be appreciated that this or a similar routine may be used to acquire video (with video frame images) and/or other data (e.g., audio), whether instead of or in addition to such panorama images or other perspective images. In addition, while the illustrated embodiment acquires and uses information from the interior of a target building, it will be appreciated that other embodiments may perform similar techniques for other types of data, including for non-building structures and/or for information external to one or more target buildings of interest (e.g., on a property on which a target building is located, such as to show yards, decks, patios, accessory structures, etc.). Furthermore, some or all of the routine may be executed on a mobile device used by a user to acquire image information, and/or by a system remote from such a mobile device. In at least some embodiments, the routine 500 may be invoked from block 430 of routine 400 of FIGS. 4A-4B, with corresponding information from routine 500 provided to routine 400 as part of implementation of that block 430, and with processing control returned to routine 400 after blocks 577 and/or 599 in such situations—in other embodiments, the routine 400 may proceed with additional operations in an asynchronous manner without waiting for such processing control to be returned (e.g., to proceed with other processing activities while waiting for the corresponding information from the routine 500 to be provided to routine 400).

The illustrated embodiment of the routine begins at block 505, where instructions or information are received. At block 510, the routine determines whether the received instructions or information indicate to acquire visual data and/or other data representing a building interior (optionally in accordance with supplied information about one or more additional acquisition locations and/or other guidance acquisition instructions), and if not continues to block 590. Otherwise, the routine proceeds to block 512 to receive an indication to begin the image acquisition process at a first acquisition location (e.g., from a user of a mobile image acquisition device that will perform the acquisition process). After block 512, the routine proceeds to block 515 in order to perform acquisition location image acquisition activities for acquiring a 360° panorama image for the acquisition location in the interior of the target building of interest, such as via one or more fisheye lenses and/or non-fisheye rectilinear lenses on the mobile device and to provide horizontal coverage of at least 360° around a vertical axis, although in other embodiments other types of images and/or other types of data may be acquired. As one non-exclusive example, the mobile image acquisition device may be a rotating (scanning) panorama camera equipped with a fisheye lens (e.g., with 180° of horizontal coverage) and/or other lens (e.g., with less than 180° of horizontal coverage, such as a regular lens or wide-angle lens or ultrawide lens or macro lens). The routine may also optionally obtain annotation and/or other information from the user regarding the acquisition location and/or the surrounding environment, such as for later use in presentation of information regarding that acquisition location and/or surrounding environment.

After block 515 is completed, the routine continues to block 520 to determine if there are more acquisition locations at which to acquire images, such as based on corresponding information provided by the user of the mobile device and/or received in block 505—in some embodiments, the ICA routine will acquire only a single image and then proceed to block 577 to provide that image and corresponding information (e.g., to return the image and corresponding information to the BADPM system and/or MIGM system for further use before receiving additional instructions or information to acquire one or more next images at one or more next acquisition locations). If there are more acquisition locations at which to acquire additional images at the current time, the routine continues to block 522 to optionally initiate the capture of linking information (e.g., acceleration data) during movement of the mobile device along a travel path away from the current acquisition location and towards a next acquisition location within the building interior. The captured linking information may include additional sensor data (e.g., from one or more IMU, or inertial measurement units, on the mobile device or otherwise carried by the user) and/or additional visual information (e.g., images, video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues (e.g., to the user) regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 524, the routine determines that the mobile device has arrived at the next acquisition location (e.g., based on an indication from the user, based on forward movement of the mobile device stopping for at least a predefined amount of time, etc.), for use as the new current acquisition location, and returns to block 515 to perform the acquisition location image acquisition activities for the new current acquisition location.

Figure 6A:
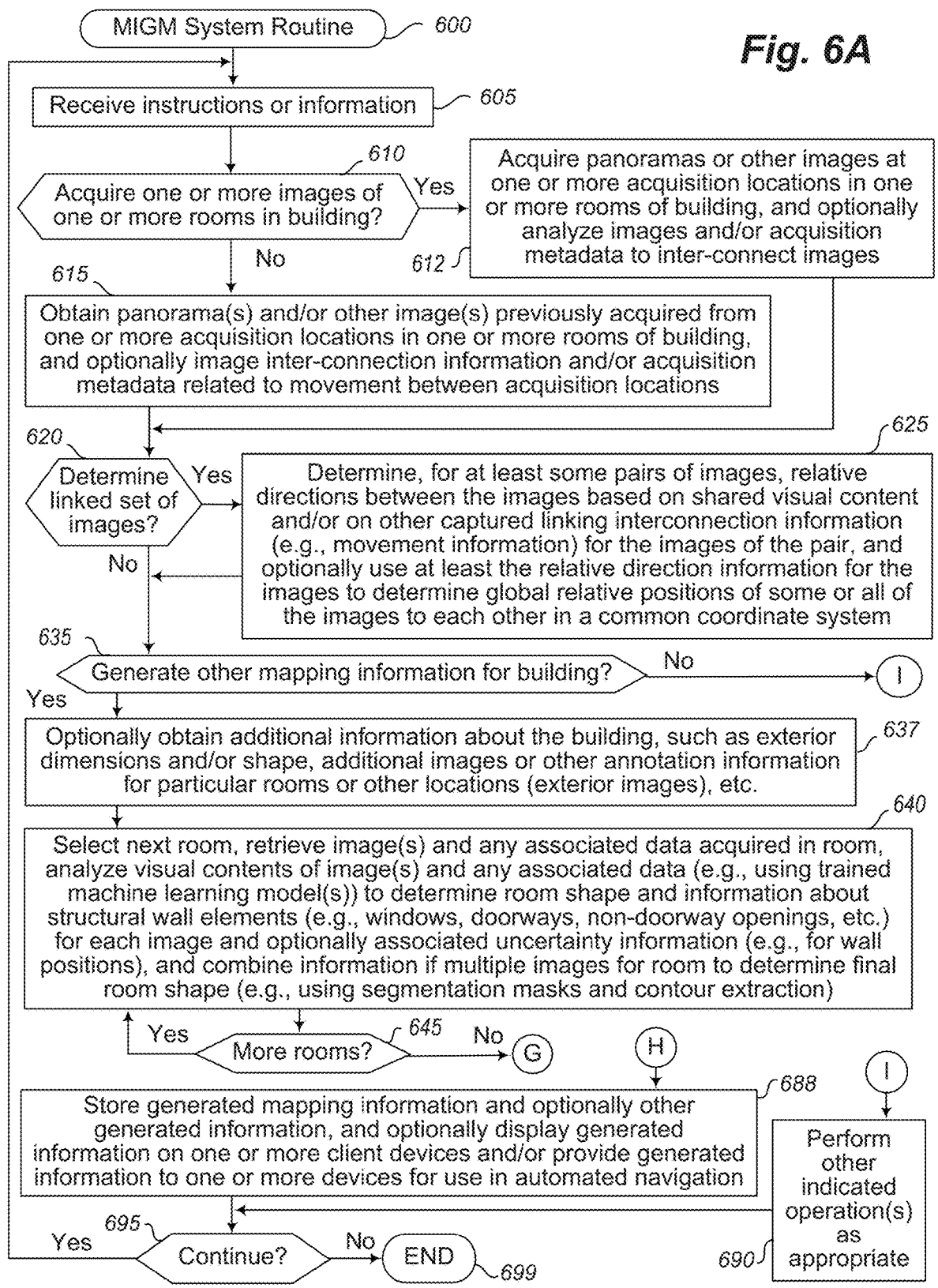
FIGS. 6A-6B illustrate an example embodiment of a flow diagram for a Mapping Information Generation Manager (MIGM) system routine in accordance with an embodiment of the present disclosure.
Figure 6B:
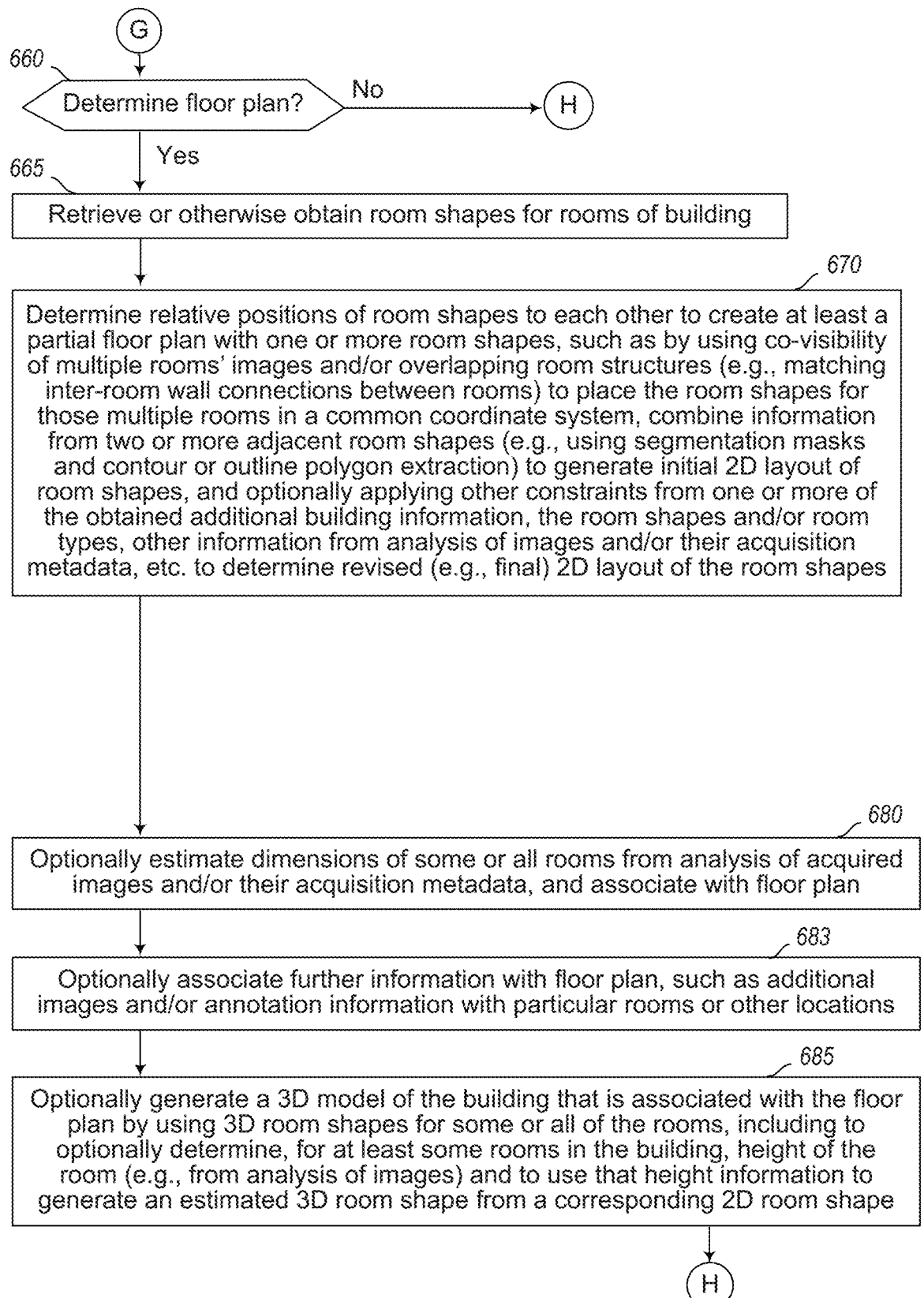

If it is instead determined in block 520 that there are not any more acquisition locations at which to acquire image information for the current building or other structure at the current time, the routine proceeds to block 545 to optionally preprocess the acquired 360° panorama images before their subsequent use (e.g., for generating related mapping information, for providing information about structural elements or other objects of rooms or other enclosing areas, etc.), such as to produce images of a particular type and/or in a particular format (e.g., to perform an equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline). In block 577, the images and any associated generated or obtained information is stored for later use, and optionally provided to one or more recipients (e.g., to block 430 of routine 400 if invoked from that block). FIGS. 6A-6B illustrate one example of a routine for generating a floor plan representation of a building interior from the generated panorama information.

If it is instead determined in block 510 that the instructions or other information received in block 505 are not to acquire images and other data representing a building interior, the routine continues instead to block 590 to perform any other indicated operations as appropriate, such as to configure parameters to be used in various operations of the system (e.g., based at least in part on information specified by a user of the system, such as a user of a mobile device who captures one or more building interiors, an operator user of the ICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to generate and store inter-panorama image connections between panorama images for a building or other structure (e.g., for each panorama image, to determine directions within that panorama image toward one or more other acquisition locations of one or more other panorama images, such as to enable later display of an arrow or other visual representation with a panorama image for each such determined direction from the panorama image to enable an end-user to select one of the displayed visual representations to switch to a display of the other panorama image at the other acquisition location to which the selected visual representation corresponds), to obtain and store other information about users of the system, to perform any housekeeping tasks, etc.

Following blocks 577 or 590, the routine proceeds to block 595 to determine whether to continue, such as until an explicit indication to terminate is received, or instead only if an explicit indication to continue is received. If it is determined to continue, the routine returns to block 505 to await additional instructions or information, and if not proceeds to step 599 and ends.

While not illustrated with respect to the automated operations shown in the example embodiment of FIG. 5, in some embodiments human users may further assist in facilitating some of the operations of the ICA system, such as for operator users and/or end-users of the ICA system to provide input of one or more types that is further used in subsequent automated operations. As non-exclusive examples, such human users may provide input of one or more types as follows: to provide input to assist with determination of acquisition locations, such as to provide input in blocks 512 and/or 524 that is used as part of the automated operations for that block; to perform activities in block 515 related to image acquisition (e.g., to participate in the image acquisition, such as to activate the shutter, implement settings on a camera and/or associated sensor or component, rotate a camera as part of capturing a panorama image, etc.; to set the location and/or orientation of one or more camera devices and/or associated sensors or components; etc.); to provide input in blocks 515 and/or 522 that is used as part of subsequent automated operations, such as labels, annotations or other descriptive information with respect to particular images, surrounding rooms and/or objects in the rooms; etc. Additional details are included elsewhere herein regarding embodiments in which one or more human users provide input that is further used in additional automated operations of the ICA system.

FIGS. 6A-6B illustrate an example embodiment of a flow diagram for a MIGM (Mapping Information Generation Manager) system routine 600. The routine may be performed by, for example, execution of the MIGM system 160/160B of FIGS. 1 and 3, and/or a MIGM system as described with respect to FIGS. 2A-2S and elsewhere herein, such as to determine a room shape for a room (or other defined area) by analyzing information from one or more images acquired in the room (e.g., one or more 360° panorama images), to generate a partial or complete floor plan for a building or other defined area based at least in part on one or more images of the area and optionally additional data captured by a mobile computing device and using determined room shapes, and/or to generate other mapping information for a building or other defined area based at least in part on one or more images of the area and optionally additional data captured by a mobile computing device. In the example of FIGS. 6A-6B, the determined room shape for a room may be a 2D room shape to represent the locations of the walls of the room or a 3D fully closed combination of planar surfaces to represent the locations of walls and ceiling and floor of the room, and the generated mapping information for a building (e.g., a house) may include a 2D floor plan and/or 3D computer model floor plan, but in other embodiments, other types of room shapes and/or mapping information may be generated and used in other manners, including for other types of structures and defined areas, as discussed elsewhere herein. In at least some embodiments, the routine 600 may be invoked from block 440 of routine 400 of FIGS. 4A-4B, with corresponding information from routine 600 provided to routine 400 as part of implementation of that block 440, and with processing control returned to routine 400 after blocks 688 and/or 699 in such situations—in other embodiments, the routine 400 may proceed with additional operations in an asynchronous manner without waiting for such processing control to be returned (e.g., to proceed to block 445 once the corresponding information from routine 600 is provided to routine 400, to proceed with other processing activities while waiting for the corresponding information from the routine 600 to be provided to routine 400, etc.).

The illustrated embodiment of the routine begins at block 605, where information or instructions are received. The routine continues to block 610 to determine whether image information is already available to be analyzed for one or more rooms (e.g., for some or all of an indicated building, such as based on one or more such images received in block 605 as previously generated by the ICA routine), or if such image information instead is to be currently acquired. If it is determined in block 610 to currently acquire some or all of the image information, the routine continues to block 612 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein—implementation of block 612 may, for example, include invoking an ICA system routine to perform such activities, with FIG. 5 providing one example embodiment of an ICA system routine for performing such image acquisition. If it is instead determined in block 610 not to currently acquire the images, the routine continues instead to block 615 to obtain one or more existing panoramas or other images from one or more acquisition locations in one or more rooms (e.g., multiple images acquired at multiple acquisition locations that include at least one image and acquisition location in each room of a building), optionally along with metadata information regarding the acquisition and/or interconnection information related to movement between the acquisition locations, such as may in some situations have been supplied in block 605 along with the corresponding instructions.

After blocks 612 or 615, the routine continues to block 620, where it determines whether to generate mapping information that includes an inter-linked set of target panorama images (or other images) for a building or other group of rooms (referred to at times as a 'virtual tour', such as to enable an end-user to move from any one of the images of the linked set to one or more other images to which that starting current image is linked, including in some embodiments via selection of a user-selectable control for each such other linked image that is displayed along with a current image, optionally by overlaying visual representations of such user-selectable controls and corresponding inter-image directions on the visual data of the current image, and to similarly move from that next image to one or more additional images to which that next image is linked, etc.), and if so continues to block 625. The routine in block 625 selects pairs of at least some of the images (e.g., based on the images of a pair having overlapping visual content), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 625 may further optionally use at least the relative direction information for the pairs of images to determine global relative positions of some or all of the images to each other in a common coordinate system, and/or generate the inter-image links and corresponding user-selectable controls as noted above. Additional details are included elsewhere herein regarding creating such a linked set of images.

After block 625, or if it is instead determined in block 620 that the instructions or other information received in block 605 are not to determine a linked set of images, the routine continues to block 635 to determine whether the instructions received in block 605 indicate to generate other mapping information for an indicated building (e.g., a floor plan), and if so the routine continues to perform some or all of blocks 637-685 to do so, and otherwise continues to block 690. In block 637, the routine optionally obtains additional information about the building, such as from activities performed during acquisition and optionally analysis of the images, and/or from one or more external sources (e.g., online databases, information provided by one or more end-users, etc.)—such additional information may include, for example, exterior dimensions and/or shape of the building, additional images and/or annotation information acquired corresponding to particular locations external to the building (e.g., surrounding the building and/or for other structures on the same property, from one or more overhead locations, etc.), additional images and/or annotation information acquired corresponding to particular locations within the building (optionally for locations different from acquisition locations of the acquired panorama images or other images), etc.

After block 637, the routine continues to block 640 to select the next room (beginning with the first) for which one or more images (e.g., 360° panorama images) acquired in the room are available, and to analyze the visual data of the image(s) for the room to determine a room shape (e.g., by determining at least wall locations), optionally along with determining uncertainty information about walls and/or other parts of the room shape, and optionally including identifying other wall and floor and ceiling elements (e.g., wall structural elements/objects, such as windows, doorways and stairways and other inter-room wall openings and connecting passages, wall borders between a wall and another wall and/or ceiling and/or floor, etc.) and their positions within the determined room shape of the room. In some embodiments, the room shape determination may include using boundaries of the walls with each other and at least one of the floor or ceiling to determine a 2D room shape (e.g., using one or trained machine learning models), while in other embodiments the room shape determination may be performed in other manners (e.g., by generating a 3D point cloud of some or all of the room walls and optionally the ceiling and/or floor, such as by analyzing at least visual data of the panorama image and optionally additional data captured by an image acquisition device or associated mobile computing device, optionally using one or more of SfM (Structure from Motion) or SLAM (Simultaneous Location And Mapping) or MVS (Multi-View Stereo) analysis). In addition, the activities of block 645 may further optionally determine and use initial pose information for each of those panorama images (e.g., as supplied with acquisition metadata for the panorama image), and/or obtain and use additional metadata for each panorama image (e.g., acquisition height information of the camera device or other image acquisition device used to acquire a panorama image relative to the floor and/or the ceiling). Additional details are included elsewhere herein regarding determining room shapes and identifying additional information for the rooms. After block 640, the routine continues to block 645, where it determines whether there are more rooms for which to determine room shapes based on images acquired in those rooms, and if so returns to block 640 to select the next such room for which to determine a room shape.

If it is instead determined in block 645 that there are not more rooms for which to generate room shapes, the routine continues to block 660 to determine whether to further generate at least a partial floor plan for the building (e.g., based at least in part on the determined room shape(s) from block 640, and optionally further information regarding how to position the determined room shapes relative to each other). If not, such as when determining only one or more room shapes without generating further mapping information for a building (e.g., to determine the room shape for a single room based on one or more images acquired in the room by the ICA system), the routine continues to block 688. Otherwise, the routine continues to block 665 to retrieve one or more room shapes (e.g., room shapes generated in block 645) or otherwise obtain one or more room shapes (e.g., based on human-supplied input) for rooms of the building, whether 2D or 3D room shapes, and then continues to block 670. In block 670, the routine uses the one or more room shapes to create an initial floor plan (e.g., an initial 2D floor plan using 2D room shapes and/or an initial 3D floor plan using 3D room shapes), such as a partial floor plan that includes one or more room shapes but less than all room shapes for the building, or a complete floor plan that includes all room shapes for the building. If there are multiple room shapes, the routine in block 670 further determines positioning of the room shapes relative to each other, such as by using visual overlap between images from multiple acquisition locations to determine relative positions of those acquisition locations and of the room shapes surrounding those acquisition locations, and/or by using other types of information (e.g., using connecting inter-room passages between rooms, optionally applying one or more constraints or optimizations, etc.). In at least some embodiments, the routine in block 670 further refines some or all of the room shapes by generating a binary segmentation mask that covers the relatively positioned room shape(s), extracting a polygon representing the outline or contour of the segmentation mask, and separating the polygon into the refined room shape(s). Such a floor plan may include, for example, relative position and shape information for the various rooms without providing any actual dimension information for the individual rooms or building as a whole, and may further include multiple linked or associated submaps (e.g., to reflect different stories, levels, sections, etc.) of the building. The routine further optionally associates positions of the doors, wall openings and other identified wall elements on the floor plan.

After block 670, the routine optionally performs one or more steps 680-685 to determine and associate additional information with the floor plan. In block 680, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blueprints, etc. may be generated from the floor plan. After block 680, the routine continues to block 683 to optionally associate further information with the floor plan (e.g., with particular rooms or other locations within the building), such as additional existing images with specified positions and/or annotation information. In block 685, if the room shapes from block 645 are not 3D room shapes, the routine further optionally estimates heights of walls in some or all rooms, such as from analysis of images and optionally sizes of known objects in the images, as well as height information about a camera when the images were acquired, and uses that height information to generate 3D room shapes for the rooms. The routine further optionally uses the 3D room shapes (whether from block 640 or block 685) to generate a 3D computer model floor plan of the building, with the 2D and 3D floor plans being associated with each other—in other embodiments, only a 3D computer model floor plan may be generated and used (including to provide a visual representation of a 2D floor plan if so desired by using a horizontal slice of the 3D computer model floor plan).

After block 685, or if it is instead determined in block 660 not to determine a floor plan, the routine continues to block 688 to store the determined room shape(s) and/or generated mapping information and/or other generated information, to optionally provide some or all of that information to one or more recipients (e.g., to block 440 of routine 400 if invoked from that block), and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of images and/or about additional information determined about contents of rooms and/or passages between rooms, etc.

If it is instead determined in block 635 that the information or instructions received in block 605 are not to generate mapping information for an indicated building, the routine continues instead to block 690 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

While not illustrated with respect to the automated operations shown in the example embodiment of FIGS. 6A-6B, in some embodiments human users may further assist in facilitating some of the operations of the MIGM system, such as for operator users and/or end-users of the MIGM system to provide input of one or more types that is further used in subsequent automated operations. As non-exclusive examples, such human users may provide input of one or more types as follows: to provide input to assist with the linking of a set of images, such as to provide input in block 625 that is used as part of the automated operations for that block (e.g., to specify or adjust initial automatically determined directions between one or more pairs of images, to specify or adjust initial automatically determined final global positions of some or all of the images relative to each other, etc.); to provide input in block 637 that is used as part of subsequent automated operations, such as one or more of the illustrated types of information about the building; to provide input with respect to block 640 that is used as part of subsequent automated operations, such as to specify or adjust initial automatically determined element locations and/or estimated room shapes and/or to manually combine information from multiple estimated room shapes for a room (e.g., separate room shape estimates from different images acquired in the room) to create a final room shape for the room and/or to specify or adjust initial automatically determined information about a final room shape, etc.; to provide input with respect to block 670, that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 680 and 683 and 685 that is used as part of subsequent operations, such as to specify or adjust initial automatically determined information of one or more types discussed with respect to those blocks; and/or to specify or adjust initial automatically determined pose information (whether initial pose information or subsequent updated pose information) for one or more of the panorama images; etc. Additional details are included elsewhere herein regarding embodiments in which human user(s) provide input that is further used in additional automated operations of the MIGM system.

FIG. 7 illustrates an example embodiment of a flow diagram for a Building Information Viewer system routine 700. The routine may be performed by, for example, execution of a building information viewer system 396 of mobile device 175 of FIG. 3 and/or of such a building information viewer system otherwise executing on a mobile device 175 and/or other computing system or device as described elsewhere herein, such as to receive and present enhanced camera view data that includes generated visual data enhancements supplied for target images and/or to receive and present other types of building information (e.g., individual images; floor plans and/or other mapping-related information, such as determined room structural layouts/shapes, a virtual tour of inter-linked images, etc.; generated building description information; videos; etc.). In the example of FIG. 7, the presented information is for one or more buildings (such as an interior of a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information in block 705 are to present enhanced camera view data for a current building, and if not continues to block 780. Otherwise, the routine continues to block 715 to obtain information for the current target building and optionally one or more current users, such as from current user input and/or an automated determination using current building-related information. In block 720, the routine then optionally retrieves building information such as a floor plan, room and object information, attributes and locations, etc. for the current building, such as for use in presentations in association with enhanced camera view data (e.g., in additional panes or portions of a GUI that also shows the enhanced camera view data). In block 730, the routine then obtains one or more current camera view target images from the mobile device, and in block 735 proceeds to provide the current target image(s) and indication of the current building to the BADPM system to obtain current enhanced camera view data, optionally along with other building and user information. In block 740, the routine then receives and presents the current enhanced camera view data on the mobile device, optionally as part of a GUI that includes user-selectable controls to modify the presentation (whether as part of visual enhancement data overlaid on a current image and/or other separate GUI controls), and optionally with other types of presented building information. In some embodiments, the routine 700 and/or routine 400 further transmits the same enhanced camera view data to one or more other remote devices for concurrent display (e.g., as part of a shared video conference). The routine then proceeds to perform blocks 745-755 to correspond to optional user interactions with the current presented enhanced camera view data and/or other user activities (e.g., movement of the mobile device to cause new target image(s) to be acquired), such as to wait in block 745 for a user selection or an indication of a new target image, and to then determine in block 750 if a user selection or other interaction with the current enhanced camera view has occurred, and if so to proceed to block 755 to adjust the current enhanced camera view in accordance with the user selection and display a corresponding adjusted view, before returning to block 745. If it is instead determined in block 750 that a new camera view target image is received, the routine returns to block 730 to obtain and present new enhanced camera view data based on the new target image, and otherwise continues to block 770 to respond to another user selection (e.g., to suspend or end a current presentation session at the current building; to switch to a presentation of a different type of building information, such as a floor plan and/or other previously acquired images; etc.).

If it is determined in block 710 that the instructions or other information received in block 705 do not indicate to present enhanced camera view data for a current building, the routine continues to block 780 to determine whether the instructions or other information received in block 705 indicate to present one or more other types of information about one or more buildings of interest. If so, the routine continues to block 785 to determine the one or more buildings of interest (e.g., based on information supplied in block 705, such as identifications of those buildings and/or by using one or more criteria to identify the buildings) and to retrieve corresponding information for the building(s) (e.g., of a default type, such as a floor plan for a single building, comparison information of one or more types for multiple buildings, etc.; of one or more types indicated in block 705; etc., and optionally by interacting with a MIGM system and/or an BADPM system to obtain that information), and presents the information on the mobile device. If the presented information includes one or more user-selectable GUI controls or other interaction mechanisms, the routine may further receive and respond to user selections or other interactions with the presentation information as appropriate, including to retrieve and present additional information as selected by the user. Additional details are included elsewhere herein regarding presentation of various types of building information.

If it is instead determined in block 780 that the instructions or other information received in block 705 do not indicate to present one or more other types of information about one or more buildings of interest, the routine continues instead to block 790 to perform one or more other indicated operations as appropriate, such as to configure parameters to be used in various operations of the system (e.g., based at least in part on information specified by a user of the system, such as a user of a mobile device who acquires one or more building interiors, an operator user of the BADPM and/or MIGM systems, etc., including for use in personalizing information display for a particular recipient user in accordance with his/her preferences or other information specific to that recipient), to obtain and store other information about users of the system (e.g., preferences or other information specific to that user), to respond to requests for generated and stored information, to perform any housekeeping tasks, etc.

Following blocks 770 or 785 or 790, the routine proceeds to block 795 to determine whether to continue, such as until an explicit indication to terminate is received, or instead only if an explicit indication to continue is received. If it is determined to continue, the routine returns to block 705 to await additional instructions or information, and if not proceeds to step 799 and ends.

Aspects of the present disclosure are described herein with reference to flowchart illustrations and/or block diagrams of methods, apparatus (systems), and computer programs products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A system comprising:
   one or more hardware processors of one or more computing devices; and
   one or more memories with stored instructions that, when executed by at least one of the one or more hardware processors, cause at least one of the one or more computing devices to perform automated operations including at least:
   obtaining data for a building with multiple rooms, including information about multiple objects at the building, and including information about respective positions at the building associated with the multiple objects, wherein the multiple objects in the building include at least appliances, fixtures, and structural elements, and wherein the multiple objects in the building further have colors and types of surface materials;
   receiving a target image showing a current view from a camera of a mobile device at the building;
   determining a subset of the building visible in the target image;
   selecting one or more objects of the multiple objects that have respective positions in the subset of the building;

generating visual enhancement data that includes, for each of the selected objects, at least one visual indicator for that selected object for presentation at the respective position of that selected object, and information indicating the determined one or more utility values associated with that selected object; and providing information to the mobile device, including providing the visual enhancement data for presentation on the mobile device overlaid on the current view from the camera, wherein the visual enhancement data for presentation includes at least one of a color or a type of surface material for one of the selected objects.

2. The system of claim 1 wherein the stored instructions include software instructions that, when executed, cause the one or more computing devices to perform the obtaining of the data for the building by performing at least one of:

determining, based at least in part on analyzing visual data of a plurality of images acquired in the multiple rooms of the building, the multiple objects and the respective positions of the multiple objects; or generating, for each of the selected one or more objects, a textual description of the object, and wherein the generating of the visual enhancement data further includes, for each of the selected one or more objects, the generated textual description for that object.

3. The system of claim 2 wherein the one or more computing devices include the mobile device, and wherein the providing of the information to the mobile device is performed by the mobile device and includes overlaying the visual enhancement data on the target image.

4. The system of claim 2 wherein the one or more computing devices include at least one computing device remote from the building, wherein the obtaining of the data for the building is performed by the at least one computing device remote from the building and includes performing the determining of the multiple objects and the respective positions of the multiple objects, including:

capturing the plurality of the images in the multiple rooms of the building using one or more mobile image acquisition devices separate from the mobile device; and performing the analyzing of the visual data of the plurality of images using one or more trained machine learning models; and wherein the providing of the visual enhancement data includes presenting the target image overlaid with the visual enhancement data including, for each of the selected one or more objects, displaying the at least one visual indicator for that selected object at a determined position in the target image that is based on the respective position for that selected object.

5. The system of claim 2 wherein the obtaining of the data for the building includes analyzing, for a floor plan showing a room layout for the building with at least two-dimensional room shapes and relative positions of the multiple rooms, the floor plan to determine one or more attributes of the building that each corresponds to a characteristic of the room layout, and wherein the providing of the information to the mobile device at the building further includes selecting one of the attributes corresponding to a characteristic of the room layout to include in the generated visual enhancement data; and wherein the providing of the visual enhancement data includes displaying overlaid information about the selected one attribute at a position in the current view from the camera that is determined for the selected one attribute.

6. The system of claim 1 wherein the providing of the visual enhancement data includes presenting on the mobile device the visual enhancement data overlaid on the current view from the camera as part of a graphical user interface (GUI) displayed on at least one display of the mobile device, and wherein the providing of the information to the mobile device further includes:

determining, by the mobile device and before the providing of the visual enhancement data, one or more GUI controls for which to include one or more respective user-selectable visual representations in the generated visual enhancement data;

receiving, by the mobile device and after the presenting of the visual enhancement data overlaid on the current view from the camera, a selection by the user of one of the respective user-selectable visual representations for one of the GUI controls; and updating, by the mobile device and in response to the selection by the user, the at least one display of the mobile device to display at least one type of additional data.

7. The system of claim 1 wherein the target image shows a portion of a first room of the multiple rooms in which the mobile device is located, and wherein the automated operations further include:

determining additional information to present to a user in a second room of the multiple rooms that is different from the first room;

generating guidance instructions to direct the user from the first room to the second room;

displaying at least some of the generated guidance instructions overlaid on that target image to direct the user to the second room; and displaying, after the mobile device reaches the second room, at least some of the determined additional information.

8. The system of claim 1 wherein the providing of the visual enhancement data further includes obtaining information about a user of the mobile device that includes one or more preferences of the user, wherein the selecting of the one or more objects is performed based on the one or more preferences of the user, and wherein the providing of the visual enhancement data includes presenting to the user the visual enhancement data in combination with the current view from the camera.

9. The system of claim 1 wherein the providing of the visual enhancement data includes presenting, on at least one display of the mobile device, the visual enhancement data overlaid on the target image, and further includes transmitting, to one or more additional devices separate from the mobile device and remote from the building, the enhancement data overlaid on the target image for concurrent presentation on the one or more additional devices.

10. A system comprising:

one or more hardware processors of one or more computing devices; and one or more memories with stored instructions that, when executed by at least one of the one or more hardware processors, cause at least one of the one or more computing devices to perform automated operations including at least:

obtaining data for a building with multiple rooms, including information about multiple objects at the building, and including information about respective positions at the building associated with the multiple objects, wherein the obtaining of the data for the building includes generating, for each of the selected one or more objects, a textual description of that object by using one or more language models that are trained to use, as input, information about that object and about a room of the multiple rooms in the building in which that object is located, wherein the one or more language models include at least one of a Vision and Language Model (VLM) that is trained using image/caption tuples, or a Knowledge Enhanced Natural Language Generation (VENLG) model that is trained using one or more defined knowledge sources;

receiving a target image showing a current view from a camera of a mobile device at the building;

determining a subset of the building visible in the target image;

selecting one or more objects of the multiple objects that have respective positions in the subset of the building;

generating visual enhancement data that includes, for each of the selected objects, at least one visual indicator for that selected object for presentation at the respective position of that selected object, and information indicating the determined one or more utility values associated with that selected object, wherein the generating of the visual enhancement data further includes, for each of the selected one or more objects, the generated textual description for that object; and providing information to the mobile device, including providing the visual enhancement data for presentation on the mobile device overlaid on the current view from the camera.

11. A system comprising:

one or more hardware processors of one or more computing devices; and one or more memories with stored instructions that, when executed by at least one of the one or more hardware processors, cause at least one of the one or more computing devices to perform automated operations including at least:

obtaining data for a building with multiple rooms, including information about multiple objects at the building, and including information about respective positions at the building associated with the multiple objects, wherein the obtaining of the data further includes obtaining information about both objective attributes about the building that are able to be independently verified and subjective attributes for the building that are predicted by the one or more trained neural network models;

receiving a target image showing a current view from a camera of a mobile device at the building;

determining a subset of the building visible in the target image;

selecting one or more objects of the multiple objects that have respective positions in the subset of the building;

generating visual enhancement data that includes, for each of the selected objects, at least one visual indicator for that selected object for presentation at the respective position of that selected object, and information indicating the determined one or more utility values associated with that selected object; and providing information to the mobile device, including providing the visual enhancement data for presentation on the mobile device overlaid on the current view from the camera, wherein the providing of the visual enhancement data includes presenting information about at least one objective attribute and at least one subjective attribute.

12. A system comprising:

one or more hardware processors of one or more computing devices; and one or more memories with stored instructions that, when executed by at least one of the one or more hardware processors, cause at least one of the one or more computing devices to perform automated operations including at least:

obtaining data for a building with multiple rooms, including information about multiple objects at the building, and including information about respective positions at the building associated with the multiple objects, wherein the obtaining of the data further includes obtaining information about one or more comparison attributes that each includes a comparison of at least one type of information about the building to that at least one type of information about one or more other buildings;

receiving a target image showing a current view from a camera of a mobile device at the building;

determining a subset of the building visible in the target image;

selecting one or more objects of the multiple objects that have respective positions in the subset of the building;

generating visual enhancement data that includes, for each of the selected objects, at least one visual indicator for that selected object for presentation at the respective position of that selected object, and information indicating the determined one or more utility values associated with that selected object; and providing information to the mobile device, including providing the visual enhancement data for presentation on the mobile device overlaid on the current view from the camera, wherein the providing of the visual enhancement data includes presenting information that describes at least one of the comparison attributes.

13. A system comprising:

one or more hardware processors of one or more computing devices; and one or more memories with stored instructions that, when executed by at least one of the one or more hardware processors, cause at least one of the one or more computing devices to perform automated operations including at least:

obtaining data for a building with multiple rooms, including information about multiple objects at the building, and including information about respective positions at the building associated with the multiple objects;

receiving a target image showing a current view from a camera of a mobile device at the building;

determining a subset of the building visible in the target image, wherein the determined subset of the building visible in the target image includes a portion of a first room of the multiple rooms, and wherein the target image shows at least some of one or more walls of the first room;
selecting one or more objects of the multiple objects that have respective positions in the subset of the building;
generating visual enhancement data that includes, for each of the selected objects, at least one visual indicator for that selected object for presentation at the respective position of that selected object, and information indicating the determined one or more utility values associated with that selected object, and wherein the generating of the visual enhancement data includes:
   determining one or more second rooms of the multiple rooms that are behind the at least some of the one or more walls and that are not visible in the target image; and
   generating visual representations of the determined one or more second rooms for use as part of the generated visual enhancement data; and
providing information to the mobile device, including providing the visual enhancement data for presentation on the mobile device overlaid on the current view from the camera, and presenting, as part of the providing of the visual enhancement data, the generated visual representations of the determined one or more second rooms at locations on the current view from the camera that correspond to positions of the determined one or more second rooms behind the at least some of the one or more walls.

14. A system comprising:
one or more hardware processors of one or more computing devices; and
one or more memories with stored instructions that, when executed by at least one of the one or more hardware processors, cause at least one of the one or more computing devices to perform automated operations including at least:
   obtaining data for a building with multiple rooms, including information about multiple objects at the building, and including information about respective positions at the building associated with the multiple objects;
   receiving a target image showing a current view from a camera of a mobile device at the building;
   determining a subset of the building visible in the target image;
   selecting one or more objects of the multiple objects that have respective positions in the subset of the building;
   generating visual enhancement data that includes, for each of the selected objects, at least one visual indicator for that selected object for presentation at the respective position of that selected object, and information indicating the determined one or more utility values associated with that selected object, wherein the generating of the visual enhancement data includes determining, for each of the selected one or more objects, one or more utility values associated with the object, each utility value indicating one of a condition of that object or a monetary value associated with that object; and
   providing information to the mobile device, including providing the visual enhancement data for presentation on the mobile device overlaid on the current view from the camera, and presenting, as part of the providing of the visual enhancement data, the visual enhancement data overlaid on the current view from the camera, including presenting information indicating the determined one or more utility values associated with each of the selected one or more objects.

15. A computer-implemented method comprising:
obtaining, by one or more computing devices, data for a building with multiple rooms, including information about multiple objects at the building, and including information about respective positions at the building associated with the multiple objects, wherein the multiple objects in the building include at least appliances, fixtures, and structural elements, and wherein the multiple objects in the building further have colors and types of surface materials;
receiving, by the one or more computing devices, a target image showing a current view from a camera of a mobile device at the building;
determining, by the one or more computing devices, a subset of the building visible in the target image;
selecting, by the one or more computing devices, one or more objects of the multiple objects that have respective positions in the subset of the building;
generating, by the one or more computing devices, visual enhancement data that includes, for each of the selected objects, at least one visual indicator for that selected object for presentation at the respective position of that selected object, and information indicating the determined one or more utility values associated with that selected object; and
providing, by the one or more computing devices, information to the mobile device, including providing the visual enhancement data for presentation on the mobile device overlaid on the current view from the camera, wherein the visual enhancement data for presentation includes at least one of a color or a type of surface material for one of the selected objects.

16. The computer-implemented method of claim 15 wherein the obtaining of the data for the building includes at least one of:
   determining, based at least in part on analyzing visual data of a plurality of images acquired in the multiple rooms of the building, the multiple objects and the respective positions of the multiple objects; or
   generating, for each of the selected one or more objects, a textual description of the object, and wherein the generating of the visual enhancement data further includes, for each of the selected one or more objects, the generated textual description for that object.

17. The computer-implemented method of claim 16 wherein the one or more computing devices include the mobile device, and wherein the providing of the information to the mobile device is performed by the mobile device and includes overlaying the visual enhancement data on the target image.

18. The computer-implemented method of claim 16 wherein the one or more computing devices include at least one computing device remote from the building,
   wherein the obtaining of the data for the building is performed by the at least one computing device remote from the building and includes performing the determining of the multiple objects and the respective positions of the multiple objects, including:

capturing the plurality of the images in the multiple rooms of the building using one or more mobile image acquisition devices separate from the mobile device; and performing the analyzing of the visual data of the plurality of images using one or more trained machine learning models; and wherein the providing of the visual enhancement data includes presenting the target image overlaid with the visual enhancement data including, for each of the selected one or more objects, displaying the at least one visual indicator for that selected object at a determined position in the target image that is based on the respective position for that selected object.

19. The computer-implemented method of claim 16 wherein the obtaining of the data for the building includes the generating of the textual description of each of the selected one or more objects by using one or more language models that are trained to use, as input and for each of the selected one or more objects, information about that selected object and about a room in the building in which that selected object is located, and wherein the one or more language models include at least one of a Vision and Language Model (VLM) that is trained using image/caption tuples, or a Knowledge Enhanced Natural Language Generation (VENLG) model that is trained using one or more defined knowledge sources.

20. The computer-implemented method of claim 16 wherein the obtaining of the data for the building includes analyzing, for a floor plan showing a room layout for the building with at least two-dimensional room shapes and relative positions of the multiple rooms, the floor plan to determine one or more attributes of the building that each corresponds to a characteristic of the room layout, and
wherein the providing of the information to the mobile device at the building further includes selecting one of the attributes corresponding to a characteristic of the room layout to include in the generated visual enhancement data; and
wherein the providing of the visual enhancement data includes displaying overlaid information about the selected one attribute at a position in the current view from the camera that is determined for the selected one attribute.

21. The computer-implemented method of claim 15 wherein the providing of the visual enhancement data includes presenting on the mobile device the visual enhancement data overlaid on the current view from the camera as part of a graphical user interface (GUI) displayed on at least one display of the mobile device, and wherein the providing of the information to the mobile device further includes:
determining, by the mobile device and before the providing of the visual enhancement data, one or more GUI controls for which to include one or more respective user-selectable visual representations in the generated visual enhancement data;
receiving, by the mobile device and after the presenting of the visual enhancement data overlaid on the current view from the camera, a selection by the user of one of the respective user-selectable visual representations for one of the GUI controls; and
updating, by the mobile device and in response to the selection by the user, the at least one display of the mobile device to display at least one type of additional data.

22. The computer-implemented method of claim 15 wherein the obtaining of the data further includes obtaining information about both objective attributes about the building that are able to be independently verified and subjective attributes for the building that are predicted by the one or more trained neural network models, and wherein the providing of the visual enhancement data includes presenting information about at least one objective attribute and at least one subjective attribute.

23. The computer-implemented method of claim 15 wherein the target image shows a portion of a first room of the multiple rooms in which the mobile device is located, and wherein the automated operations further include:
determining additional information to present to a user in a second room of the multiple rooms that is different from the first room;
generating guidance instructions to direct the user from the first room to the second room;
displaying at least some of the generated guidance instructions overlaid on that target image to direct the user to the second room; and
displaying, after the mobile device reaches the second room, at least some of the determined additional information.

24. The computer-implemented method of claim 15 wherein the obtaining of the data further includes obtaining information about one or more comparison attributes that each includes a comparison of at least one type of information about the building to that at least one type of information about one or more other buildings, and wherein the providing of the visual enhancement data includes presenting information that describes at least one of the comparison attributes.

25. The computer-implemented method of claim 15 wherein the providing of the visual enhancement data further includes obtaining information about a user of the mobile device that includes one or more preferences of the user, wherein the selecting of the one or more objects is performed based on the one or more preferences of the user, and wherein the providing of the visual enhancement data includes presenting to the user the visual enhancement data in combination with the current view from the camera.

26. The computer-implemented method of claim 15 wherein the determined subset of the building visible in the target image includes a portion of a first room of the multiple rooms, wherein the target image shows at least some of one or more walls of the first room, and wherein the providing of the visual enhancement data includes:
determining one or more second rooms of the multiple rooms that are behind the at least some of the one or more walls and that are not visible in the target image;
generating visual representations of the determined one or more second rooms for use as part of the generated visual enhancement data; and
presenting, as part of the providing of the visual enhancement data, the generated visual representations of the determined one or more second rooms at locations on the current view from the camera that correspond to positions of the determined one or more second rooms behind the at least some of the one or more walls.

27. The computer-implemented method of claim 15 wherein the providing of the visual enhancement data includes:
determining, for each of the selected one or more objects, one or more utility values associated with the object, each utility value indicating one of a condition of that object or a value associated with that object; and
presenting, as part of the providing of the visual enhancement data, the visual enhancement data overlaid on the current view from the camera, including presenting information indicating the determined one or more utility values associated with each of the selected one or more objects.

28. The computer-implemented method of claim 15 wherein the providing of the visual enhancement data includes presenting, on at least one display of the mobile device, the visual enhancement data overlaid on the target image, and further includes transmitting, to one or more additional devices separate from the mobile device and remote from the building, the enhancement data overlaid on the target image for concurrent presentation on the one or more additional devices.

29. A non-transitory computer-readable medium having stored contents that cause one or more computing devices to perform automated operations, the automated operations including at least:
  obtaining, by the one or more computing devices, data for a building with multiple rooms, including information about multiple objects at the building, and including information about respective positions at the building associated with the multiple objects, wherein the multiple objects in the building include at least appliances, fixtures, and structural elements, and wherein the multiple objects in the building further have colors and types of surface materials;
  receiving, by the one or more computing devices, a target image showing a current view from a camera of a mobile device at the building;
  determining, by the one or more computing devices, a subset of the building visible in the target image;
  selecting, by the one or more computing devices, one or more objects of the multiple objects that have respective positions in the subset of the building;
  generating, by the one or more computing devices, visual enhancement data that includes, for each of the selected objects, at least one visual indicator for that selected object for presentation at the respective position of that selected object, and information indicating the determined one or more utility values associated with that selected object; and
  providing, by the one or more computing devices, information to the mobile device, including providing the visual enhancement data for presentation on the mobile device overlaid on the current view from the camera, wherein the visual enhancement data for presentation includes at least one of a color or a type of surface material for one of the selected objects.

30. The non-transitory computer-readable medium of claim 29 wherein the stored contents include software instructions that, when executed, cause the one or more computing devices to perform the obtaining of the data for the building by performing at least one of:
  determining, based at least in part on analyzing visual data of a plurality of images acquired in the multiple rooms of the building, the multiple objects and the respective positions of the multiple objects; or
  generating, for each of the selected one or more objects, a textual description of the object, and wherein the generating of the visual enhancement data further includes, for each of the selected one or more objects, the generated textual description for that object.

* * * * *